United States Patent
Masuda et al.

(10) Patent No.: US 11,884,813 B2
(45) Date of Patent: Jan. 30, 2024

(54) MACROMONOMER COPOLYMER, EPOXY RESIN COMPOSITION, ADHESIVE, MOLDING MATERIAL, AND CURED PRODUCT

(71) Applicant: Mitsubishi Chemical Corporation, Chiyoda-ku (JP)

(72) Inventors: Eri Masuda, Tokyo (JP); Junichi Nakamura, Tokyo (JP); Kazuyoshi Odaka, Tokyo (JP); Sora Tomita, Tokyo (JP); Go Otani, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 16/805,894

(22) Filed: Mar. 2, 2020

(65) Prior Publication Data

US 2020/0199352 A1 Jun. 25, 2020

Related U.S. Application Data

(63) Continuation of application No. PCT/JP2018/033099, filed on Sep. 6, 2018.

(30) Foreign Application Priority Data

| Sep. 6, 2017 | (JP) | 2017-170771 |
| Jun. 19, 2018 | (JP) | 2018-116280 |
| Jul. 6, 2018 | (JP) | 2018-129045 |

(51) Int. Cl.

| C08L 63/00 | (2006.01) |
| C08F 220/06 | (2006.01) |
| C08G 59/42 | (2006.01) |
| C08G 59/50 | (2006.01) |
| C08G 59/62 | (2006.01) |
| C08L 33/10 | (2006.01) |
| C08F 290/04 | (2006.01) |
| C08G 59/68 | (2006.01) |
| C08L 55/00 | (2006.01) |
| C08G 59/40 | (2006.01) |
| C09J 133/00 | (2006.01) |
| C09J 155/00 | (2006.01) |
| C08F 283/10 | (2006.01) |
| C08L 33/06 | (2006.01) |
| C08L 33/04 | (2006.01) |
| C09J 163/00 | (2006.01) |

(52) U.S. Cl.
CPC ........... C08L 63/00 (2013.01); C08F 220/06 (2013.01); C08G 59/42 (2013.01); C08G 59/50 (2013.01); C08G 59/621 (2013.01); C08L 33/10 (2013.01); C09J 163/00 (2013.01)

(58) Field of Classification Search
None
See application file for complete search history.

(56) References Cited

U.S. PATENT DOCUMENTS

| 5,290,857 | A | 3/1994 | Ashida et al. | |
| 5,578,683 | A * | 11/1996 | Koch | C08F 290/046 |
| | | | | 525/286 |
| 2007/0027233 | A1 | 2/2007 | Yamaguchi et al. | |
| 2008/0234433 | A1 * | 9/2008 | Asandei | C08F 265/04 |
| | | | | 525/74 |
| 2010/0227949 | A1 | 9/2010 | Tamai et al. | |
| 2011/0003947 | A1 | 1/2011 | Kishi et al. | |
| 2012/0123023 | A1 | 5/2012 | Wakita et al. | |
| 2013/0289211 | A1 | 10/2013 | Nishii et al. | |
| 2016/0002460 | A1 * | 1/2016 | Nomura | C08L 63/00 |
| | | | | 524/558 |
| 2016/0251510 | A1 | 9/2016 | Furukawa et al. | |
| 2017/0029548 | A1 * | 2/2017 | Kawai | C09J 4/00 |

FOREIGN PATENT DOCUMENTS

| CN | 105612215 A | 5/2016 |
| EP | 3 342 819 A1 | 7/2018 |
| EP | 3 680 294 A1 | 7/2020 |
| JP | 5-65391 A | 3/1993 |
| JP | 2000-298340 A | 10/2000 |
| JP | 2000-514845 A | 11/2000 |
| JP | 2005-97435 A | 4/2005 |
| JP | 2005097435 A * | 4/2005 |
| JP | 2008-115239 A | 5/2008 |
| JP | 2008115239 A * | 5/2008 |
| JP | 2010-243604 A | 10/2010 |
| JP | 2010-275354 A | 12/2010 |
| JP | 2012-92356 A | 5/2012 |
| JP | 2014-141604 A | 8/2014 |
| WO | WO 97/31030 A1 | 8/1997 |
| WO | WO 2004/108825 A1 | 12/2004 |
| WO | WO 2007/077888 A1 | 7/2007 |
| WO | WO 2009/101961 A1 | 8/2009 |
| WO | WO 2010/104055 A1 | 9/2010 |
| WO | WO 2012/096256 A1 | 7/2012 |

(Continued)

OTHER PUBLICATIONS https://www.sigmaaldrich.com/US/en/technical-documents/technical-article/materials-science-and-engineering/polymer-synthesis/thermal-transitions-of-homopolymers, pp. 1-7, copyright 2021. (Year: 2021).*

(Continued)

*Primary Examiner* — Randy P Gulakowski
*Assistant Examiner* — Ha S Nguyen
(74) *Attorney, Agent, or Firm* — Oblon, McClelland, Maier & Neustadt, L.L.P.

(57) ABSTRACT

There is provided an epoxy resin composition comprising a (meth)acrylic copolymer (A), an epoxy resin (B), and a curing agent (C), wherein the (meth)acrylic copolymer (A) has a constituent unit derived from a macromonomer (a) and a constituent unit derived from a vinyl monomer (b), and wherein a glass transition temperature (TgB) of a polymer obtained by polymerizing only the vinyl monomer (b) is 25° C. or less.

18 Claims, No Drawings

(56) References Cited

FOREIGN PATENT DOCUMENTS

| WO | WO 2014/142024 A1 | 9/2014 | | |
| WO | WO-2014142024 A1 * | 9/2014 | ................ | C08J 5/24 |
| WO | WO 2015/053289 A1 | 4/2015 | | |
| WO | WO-2015080244 A1 * | 6/2015 | ................ | C09J 4/06 |
| WO | WO 2017/057719 A1 | 4/2017 | | |
| WO | WO 2019/049951 A1 | 3/2019 | | |

OTHER PUBLICATIONS

Extended European Search dated Jul. 9, 2020 in corresponding European Patent Application No. 18854245.0, 7 pages.
Database WPI Week 200851 Thomson Scientific, London, GB: AN 2008-H99549, XP002799522, May 22, 2008, 2 pages.
International Search Report dated Oct. 30, 2018 in PCT/JP2018/033099 dated Sep. 6, 2018 (with English Translation), 3 pages.
Korean Office Action dated Feb. 9, 2021 in Korean Patent Application No. 10-2020-7005114 (with unedited computer generated English translation), 14 pages.
Japanese Office Action dated Feb. 22, 2022 in Japanese Patent Application No. 2018-177587 (with unedited computer generated English translation), 6 pages.
Japanese Office Action dated Mar. 15, 2022 in Japanese Patent Application No. 2018-167110 A (with unedited computer generated English translation), 8 pages.
Notice of Reasons for Refusal dated Aug. 23, 2022, in Japanese Patent Application No. 2018-167110 (with machine generated English translation).
Office Action dated Apr. 29, 2022, in Chinese Patent Application No. 201880055318.6 filed Sep. 6, 2018 (with English translation).
Lizidong, et al. "Handbook of modern adhesive technololgy", New Times Press, Jan. 31, 2002, pp. 535-536 (with English translation).
International Search Report dated Jun. 30, 2020 in PCT/JP2020/016566 (with English translation), 6 pages.
Foreign Office Action dated Jun. 26, 2023, in Chinese Patent Application No. 202080029218.3 (with English Machine Translation).
Office Action dated Aug. 8, 2023, in Japanese Patent Application No. 2021-514196 with Machine Translation obtained by Global Dossier.
Office Action dated Sep. 5, 2023, in European Patent Application No. 18854245.0.

* cited by examiner

MACROMONOMER COPOLYMER, EPOXY RESIN COMPOSITION, ADHESIVE, MOLDING MATERIAL, AND CURED PRODUCT

This application is a continuation application of International Application No. PCT/JP2018/033099 filed on Sep. 6, 2018, which claims the benefit of priority of the prior Japanese Patent Application No. 2017-170771 filed on Sep. 6, 2017, Japanese Patent Application No. 2018-116280 filed on Jun. 19, 2018, and Japanese Patent Application No. 2018-129045 filed on Jul. 6, 2018, the contents of which are incorporated herein by reference.

TECHNICAL FIELD

The present invention relates to an epoxy resin composition, an adhesive and a molding material obtained by using the epoxy resin composition, and a cured product thereof. In addition, the present invention relates to a macromonomer copolymer suitable for the epoxy resin composition, particularly to a macromonomer copolymer containing a cyclic ether group manufactured by catalytic chain transfer polymerization (abbreviated as CCTP).

BACKGROUND ART

Most monomers having an unsaturated bond with reaction activity can produce a polymer by being reacted under an appropriate condition using a catalyst causing chain transfer. In a case where the polymer is industrially used, since a homopolymer using one kind of monomer cannot meet various requirements of a material, a method of mixing different kinds of polymers is used. However, by simply mixing different kinds of polymers, the polymers are not compatible with each other and a phase separation structure having a relatively large-sized domain (referred to as macro phase separation) is obtained, and there are many cases where it is difficult for a mixture of different kinds of polymers to express characteristics of each polymer together.

As a method of resolving the problem, there is a known method of using a block copolymer chemically bonding to two or more kinds of polymers. A mixture of different kinds of polymers has low compatibility with polymers as described above, and thus phase separation is caused. On the other hand, in the block polymer, since polymer segments are connected to each other by chemical bond, the phase separation structure is in a nanometer size (referred to as micro phase separation). For this reason, it is possible to express characteristics of each polymer segment together. In the block copolymer as well, it is attempted to apply a (meth)acrylic block copolymer to various usage.

In addition, there is known a manufacturing method of an acrylic macromonomer in advance using a little amount of cobalt complex having extremely high chain transfer constant referred to as catalytic chain transfer polymerization, and manufacturing a (meth)acrylic graft copolymer by copolymerizing the acrylic macromonomer and other acrylic monomers (for example, PTL 1).

On the other hand, a cured product of an epoxy resin is excellent in heat resistance, electrical properties, durability, and the like. For this reason, an epoxy resin composition including the epoxy resin and a curing agent thereof is used in various usages such as a structural adhesive of an automobile, an adhesive for civil engineering/construction, an adhesive for electronic materials, an industrial adhesive, and the like.

Since the cured product of the epoxy resin is brittle, there is a problem that the cured product of the epoxy resin has poor impact resistance and adhesion strength. In the related art, in order to impart toughness to the cured product, a thermoplastic resin and the like are mixed with an epoxy resin composition.

As an epoxy resin composition in which the cured product exhibits excellent toughness, an epoxy resin composition containing an epoxy resin, a curing agent, and a specific block copolymer is suggested (PTLs 2 and 3). The epoxy resin composition disclosed in PTLs 2 and 3 forms a cured product having a micro phase separation structure, and thereby exhibits excellent toughness and the like. As the block copolymer disclosed in PTLs 2 and 3, an ABA type triblock copolymer is used.

CITATION LIST

Patent Literature

[PTL 1] Published Japanese Translation No. 2000-514845 of the PCT International Publication

[PTL 2] PCT International Publication No. WO2009/101961

[PTL 3] PCT International Publication No. WO2014/142024

DISCLOSURE OF INVENTION

Technical Problem

However, since the epoxy resin composition disclosed in PTLs 2 and 3 has high viscosity at normal temperature, if the viscosity of a mixture of an epoxy resin and a thermoplastic resin is high, there is a tendency that the process suitability (processability) deteriorates, for example, there is difficulty in mixing and coating when mixing a curing agent or a filler. When it is attempted to lower the viscosity, the kind or the content of the mixture components is limited, and thus flexibility of the mixture is lowered.

In addition, in PTLs 2 and 3, a block copolymer synthesized by control polymerization such as ATRP and living anionic polymerization is used. A method of obtaining a block copolymer by control polymerization such as ATRP or RAFT, NMP, living anionic polymerization, and the like had problems with catalyst costs, catalyst residues, equipment costs due to special polymerization conditions, long polymerization time, and the like. In addition, since the number of polymer chains capable of being introduced as a compatible segment was limited, there was a disadvantageous case in a point of micro phase separation control. In addition, in living anionic polymerization, since a cyclic ether group simultaneously reacted, there was a problem that it was difficult to introduce a cyclic ether group into the polymer while it was not reacted.

An object of a first aspect of the present invention is to provide an epoxy resin composition that is excellent in process suitability and flexibility of mixing and obtains a cured product excellent in adhesion strength, an adhesive and a molding material using the epoxy resin composition, and a cured product thereof.

An object of a second aspect of the present invention is to provide a macromonomer copolymer that controls a low Tg main chain micro phase separation structure in an epoxy resin composition and/or the cured product and obtains a cured product excellent in toughness and adhesion strength, when being mixed with the epoxy resin.

Solution to Problem

The first aspect of the present invention is an epoxy resin composition including a (meth)acrylic copolymer (A), an epoxy resin (B), and a curing agent (C), in which the (meth)acrylic copolymer (A) has a constituent unit derived from a macromonomer (a) and a constituent unit derived from a vinyl monomer (b), and a glass transition temperature (TgB) of a polymer obtained by polymerizing only the vinyl monomer (b) is 25° C. or less.

A viscosity of premix obtained by mixing the (meth) acrylic copolymer (A) and the epoxy resin (B) is preferably 1,500 Pa·s or less.

A number average molecular weight of the macromonomer (a) is preferably 500 to 100,000.

A content of a constituent unit derived from the macromonomer (a) in the (meth)acrylic copolymer (A) is preferably 10% to 80% by mass with respect to a total mass of all constituent units of the (meth)acrylic copolymer (A).

The macromonomer (a) preferably has a radical polymerizable group, and the macromonomer (a) preferably has two or more constituent units represented by the following formula (aa).

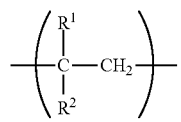

(aa)

(In the formula, $R^1$ represents a hydrogen atom, a methyl group, or $CH_2OH$, $R^2$ represents $OR^3$, a halogen atom, $COR^4$, $COOR^5$, CN, $CONR^6R^7$, $NHCOR^8$, or $R^9$, $R^3$ to $R^8$ each independently represent a hydrogen atom, a substituted or non-substituted alkyl group, a substituted or non-substituted alicyclic group, a substituted or non-substituted aryl group, a substituted or non-substituted heteroaryl group, a substituted or non-substituted non-aromatic heterocyclic group, a substituted or non-substituted aralkyl group, a substituted or non-substituted alkaryl group, a substituted or non-substituted organosilyl group, or a substituted or non-substituted (poly)organosiloxane group, a substituent substituting these groups is at least one selected from the group consisting of an alkyl group, an aryl group, a heteroaryl group, a non-aromatic heterocyclic group, an aralkyl group, an alkaryl group, a carboxylic acid group, a carboxylic acid ester group, an epoxy group, a hydroxy group, an alkoxy group, a primary amino group, a secondary amino group, a tertiary amino group, an isocyanate group, a sulfonic acid group, and a halogen atom, and $R^9$ represents a substituted or non-substituted aryl group, a substituted or non-substituted heteroaryl group, or a substituted or non-substituted non-aromatic heterocyclic group, a substituent substituting these groups is at least one selected from the group consisting of an alkyl group, an aryl group, a heteroaryl group, a non-aromatic heterocyclic group, an aralkyl group, an alkaryl group, a carboxylic acid group, a carboxylic acid ester group, an epoxy group, a hydroxy group, an alkoxy group, a primary amino group, a secondary amino group, a tertiary amino group, an isocyanate group, a sulfonic acid group, a substituted or non-substituted olefin group, and a halogen atom.)

The macromonomer (a) preferably contains a (meth) acrylic copolymer which is a macromonomer represented by the following formula (1).

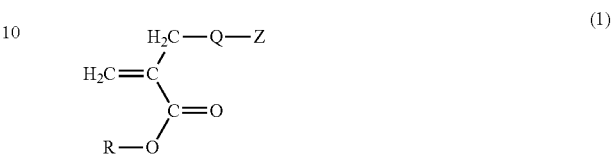

(1)

(In the formula, R represents a hydrogen atom, a substituted or non-substituted alkyl group, a substituted or non-substituted alicyclic group, a substituted or non-substituted aryl group, a substituted or non-substituted heteroaryl group, a substituted or non-substituted non-aromatic heterocyclic group, a substituted or non-substituted aralkyl group, a substituted or non-substituted alkaryl group, a substituted or non-substituted organo silyl group, or a substituted or non-substituted (poly)organosiloxane group, Q represents a main chain portion including two or more constituent units represented by the following formula (aa), and Z represents a terminal group.)

The macromonomer (a) preferably includes a constituent unit having a cyclic ether group.

The constituent unit having a cyclic ether group is preferably included by 10% by mass to 100% by mass with respect to a total mass of the constituent unit derived from the macromonomer (a).

The cyclic ether group is preferably one or more kinds selected from the group consisting of an oxiranyl group, an oxetanyl group, an oxolanyl group, a dioxolanyl group, and a dioxanyl group.

The macromonomer (a) preferably includes a constituent unit derived from one or more monomers selected from the group consisting of glycidyl (meth)acrylate, (3,4-epoxycyclohexyl)methyl (meth)acrylate, 3-methylglycidyl (meth) acrylate, (3-ethyloxetane-3-yl)methyl (meth)acrylate, tetrahydrofurfuryl (meth)acrylate, (2-methyl-2-ethyl-1,3-dioxolane-4-yl) (meth)acrylate, and (5-ethyl-1,3-dioxane-5-yl)methyl (meth)acrylate.

Another aspect of the present invention is an adhesive including an epoxy resin composition of the first aspect.

Another aspect of the present invention is a molding material including the epoxy resin composition of the first aspect.

Another aspect of the present invention is a cured product obtained by curing the epoxy resin composition of the first aspect.

A second aspect of the present invention is a macromonomer copolymer including a unit derived from a macromonomer (a') including a repeating unit represented by the following general formula (1') and a unit derived from a vinyl monomer (b') capable of being copolymerized with the macromonomer (a'), in which the macromonomer (a') includes 10% by mass or more of the repeating unit represented by the general formula (1'), and a glass transition temperature (Tgb") of a polymer obtained by polymerizing only the vinyl monomer (b') is 25° C. or less.

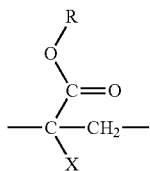

(1')

(In the formula, R is a group having a cyclic ether group, and X is a hydrogen atom or a methyl group.)

The unit derived from the macromonomer (a') is preferably represented by the following general formula (2').

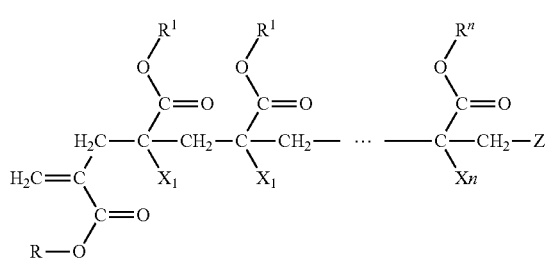

(2')

(In the formula, R and $R^1$ to $R^n$ each independently are any one of a hydrogen atom, an alkyl group, a cycloalkyl group, an aryl group, or a heterocyclic group, and at least one of R and $R^1$ to $R^n$ is a group having a cyclic ether group, $X_1$ to $X_n$ each independently represent a hydrogen atom or a methyl group, Z is a terminal group, and n is a natural number of 2 to 10,000.)

The cyclic ether group is preferably one or more kinds selected from the group consisting of an oxiranyl group, an oxetanyl group, an oxolanyl group, a dioxolanyl group, and a dioxanyl group.

The macromonomer (a') preferably includes glycidyl (meth)acrylate, (3,4-epoxycyclohexyl)methyl (meth)acrylate, β-methylglycidyl (meth)acrylate, (3-ethyloxetane-3-yl) methyl (meth)acrylate, tetrahydrofurfuryl (meth)acrylate, (2-methyl-2-ethyl-1,3-dioxolane-4-yl) (meth)acrylate, and (5-ethyl-1,3-dioxane-5-yl)methyl (meth)acrylate as a monomer unit.

The macromonomer (a') preferably includes 20% by mass or more of repeating unit represented by the following general formula (1').

Another aspect of the present invention is an epoxy resin composition including the macromonomer copolymer of the second aspect and an epoxy resin having a different structure from that of the macromonomer copolymer.

Another aspect of the present invention is an adhesive including the epoxy resin composition.

Another aspect of the present invention is a cured product obtained by curing the epoxy resin composition.

Advantageous Effects of Invention

According to a first aspect of the present invention, it is possible to provide an epoxy resin composition that is excellent in process suitability and flexibility of mixing and obtains a cured product excellent in adhesion strength and impact strength, an adhesive obtained by using the epoxy resin composition, a molding material, and a cured product thereof.

According to a second aspect of the present invention, it is possible to provide a macromonomer copolymer that obtains a cured product excellent in toughness and adhesion strength, when being mixed with an epoxy resin and used as an epoxy resin composition.

BEST MODE FOR CARRYING OUT THE INVENTION

Definitions of the following terms are applied throughout the present specification and claims.

The "macromonomer" means a high molecular monomer having a radical polymerizable functional group or an addition reactive functional group. The functional group is preferably included at the terminal. The molecular weight thereof is generally 1,000 to 1,000,000.

The "vinyl monomer" means a monomer having an ethylenic unsaturated bond, which is not a macromonomer.

The "(meth)acrylic copolymer" means a copolymer in which at least a portion of the constituent unit is a constituent unit derived from (meth)acrylic monomer.

The (meth)acrylic polymer may further include a constituent unit derived from a monomer (for example, styrene and the like) other than a (meth)acrylic monomer.

The "(meth)acrylic monomer" means a monomer having a (meth)acryloyl group.

The "(meth)acryloyl group" is a collective term of acryloyl group and methacryloyl group. The "(meth)acrylate" is a collective term of acrylate and methacrylate. The "(meth) acrylic acid" is a collective term of acrylic acid and methacrylic acid. The "(meth)acrylonitrile" is a collective term of acrylonitrile and methacrylonitrile. The "(meth)acrylamide" is a collective term of acrylamide and methacrylamide.

The "block copolymer" means a copolymer having a plurality of blocks in a polymer, in which the blocks adjacent to each other have different constitution (chemical structure). For example, the adjacent blocks are constituted of constituent units derived from different monomers.

First Embodiment (Epoxy Resin Composition)

An epoxy resin composition of the present embodiment includes a (meth)acrylic copolymer (A), an epoxy resin (B), and a curing agent (C). The copolymer (A), the epoxy resin (B), and the curing agent (C) included in the epoxy resin composition each independently may be one kind, or may be two or more kinds.

The epoxy resin composition of the present embodiment can further include a curing accelerator (D) depending on the necessity.

The epoxy resin composition of the present embodiment can further include other components than the (meth)acrylic copolymer (A), the epoxy resin (B), the curing agent (C), and the curing accelerator (D) within a range not impairing the effect of the present invention depending on the necessity.

[(Meth)Acrylic Copolymer (A)]

The (meth)acrylic copolymer (A) (hereinafter, referred to as "copolymer (A)") has a constituent unit derived from a macromonomer (a) and a constituent unit derived from a vinyl monomer (b).

In the present embodiment, by the copolymer (A) having the constituent unit derived from a macromonomer (a), the epoxy resin composition including the copolymer (A) has low viscosity and excellent process suitability and flexibility of mixing.

The copolymer (A) has a structure of a graft copolymer or a block copolymer in which a polymer chain derived from the macromonomer (a) and a polymer chain constituted of a constituent unit derived from the vinyl monomer (b) binds to each other.

In the copolymer (A), composition of a monomer constituting the macromonomer (a) and composition of the vinyl monomer (b) are different from each other. The compositions indicate the kind and the content proportion of the monomers.

The constituent unit included in the macromonomer (a) and the constituent unit derived from the vinyl monomer (b) are preferably a constituent unit derived from a (meth) acrylic monomer.

The content of the constituent unit derived from the (meth)acrylic monomer in the copolymer (A) is preferably 20% by mass to 100% by mass, and more preferably 40% by mass to 100% by mass to a total mass (100% by mass) of all constituent units constituting the copolymer (A).

<Macromonomer (a)>

The macromonomer (a) has a radical polymerizable group or an addition reactive functional group.

In a case where the macromonomer (a) has a radical polymerizable group, it is possible to obtain a copolymer (A) by copolymerizing by radical polymerization of the macromonomer (a) and the vinyl monomer (b).

In a case where the macromonomer (a) has an addition reactive functional group, it is possible to obtain the copolymer (A) by reacting a functional group of a polymer constituted of a constituent unit derived from a vinyl monomer (b) and a macromonomer having the addition reactive functional group with each other.

Examples of the addition reactive functional group include a hydroxyl group, an isocyanate group, an epoxy group, a carboxyl group, an acid anhydride group, an amino group, an amide group, a thiol group, a carbodiimide group, and the like.

Examples of combination of the addition reactive functional group and a functional group capable of reacting with the functional group include the following combination.

Combination of a hydroxyl group and a carboxyl group or an acid anhydride group.

Combination of an isocyanate group and a hydroxyl group or a thiol group or a carboxyl group.

Combination of an epoxy group and an amino group.

Combination of a carboxyl group and an epoxy group or a carbodiimide group.

Combination of an amino group and a carboxyl group.

Combination of an amide group and a carboxyl group.

Combination of a thiol group and an epoxy group.

The macromonomer (a) may have any one of a radical polymerizable group and an addition reactive functional group, or may have both.

In a case where the macromonomer (a) has a radical polymerizable group, the radical polymerizable group in the macromonomer (a) may be one or two or more, but is preferably one. In a case where the macromonomer (a) has an addition reactive functional group, the addition reactive functional group in the macromonomer (a) may be one or two or more, but is preferably one. In a case where the macromonomer (a) has both of the radical polymerizable group and the addition reactive functional group, each of the radical polymerizable group included the macromonomer (a) and the addition reactive functional group is preferably one, but may be two or more.

The macromonomer (a) preferably has a radical polymerizable group from a viewpoint of capable of being copolymerized with the vinyl monomer (b). If the copolymer (A) is a copolymerized product between the macromonomer (a) and the vinyl monomer (b), there is a tendency that viscosity of an epoxy resin composition is lowered when being mixed to the epoxy resin composition, compared to a case where the copolymer (A) is a reaction product between a functional group of a polymer constituted of a constituent unit derived from the vinyl monomer (b) and a macromonomer having the addition reactive functional group. In addition, it is excellent from a viewpoint of easily controlling an introduction amount of the macromonomer (a).

As the radical polymerizable group included in the macromonomer (a), a group having an ethylenic unsaturated bond is preferable. Examples of the ethylenic unsaturated bond include $CH_2=C(COOR)-CH_2-$, a (meth)acryloyl group, a 2-(hydroxymethyl) acryloyl group, a vinyl group, and the like, for example. Here, R represents a hydrogen atom, a substituted or non-substituted alkyl group, a substituted or non-substituted alicyclic group, a substituted or non-substituted aryl group, a substituted or non-substituted heteroaryl group, a substituted or non-substituted non-aromatic heterocyclic group, a substituted or non-substituted aralkyl group, a substituted or non-substituted alkaryl group, a substituted or non-substituted organosilyl group, or a substituted or non-substituted (poly)organosiloxane group.

The substituted alkyl group represents an alkyl group having a substituent. The same applies to other groups.

Specific examples of the non-substituted alkyl group include a branched or straight alkyl group having 1 to 22 carbon atoms. Examples of the branched or straight alkyl group having 1 to 22 carbon atoms include a methyl group, an ethyl group, an n-propyl group, an i-propyl group, an n-butyl group, a t-butyl group, an i-butyl group, a pentyl group (amyl group), an i-pentyl group, a hexyl group, a heptyl group, a 2-ethylhexyl group, an octyl group, an i-octyl group, a nonyl group, an i-nonyl group, a decyl group, an i-decyl group, an undecyl group, a dodecyl group (lauryl group), a tridecyl group, a tetradecyl group, a pentadecyl group, an hexadecyl group, a heptadecyl group, an octadecyl group (stearyl group), an i-octadecyl group, a nonadecyl group, an icosyl group, a docosyl group, and the like.

The non-substituted alicyclic group may be a monocyclic group, or may be a polycyclic group, and an example thereof include an alicyclic group having 3 to 20 carbon atoms. As the alicyclic group, a saturated alicyclic group is preferable, and specific examples thereof include a cyclopropyl group, a cyclobutyl group, a cyclopentyl group, a cyclohexyl group, a cycloheptyl group, a bicyclo[2.2.1]heptyl group, a cyclooctyl group, an adamantyl group, and the like.

Examples of the non-substituted aryl group include an aryl group having 6 to 18 carbon atoms. Specific examples of the aryl group having 6 to 18 carbon atoms include a phenyl group, a naphthyl group, and the like.

Examples of the non-substituted heteroaryl group include a pyridyl group, a carbazolyl group, and the like.

Examples of the non-substituted non-aromatic heterocyclic group include a pyrrolidinyl group, a pyrrolidone group, a lactam group, and the like.

Examples of the non-substituted aralkyl group include a benzyl group, a phenylethyl group, and the like.

Examples of the substituted or non-substituted organosilyl group include $-SiR^{17}R^{18}R^{19}$ (here, $R^{17}$ to $R^{19}$ each independently represent a substituted or non-substituted alkyl group, a substituted or non-substituted alicyclic group, or a substituted or non-substituted aryl group.).

The substituted or non-substituted alkyl group in $R^{17}$ to $R^{19}$ is the same as the substituted or non-substituted alkyl group in R, and examples thereof include a methyl group, an ethyl group, an n-propyl group, an n-butyl group, an n-amyl group, an n-hexyl group, an n-octyl group, an n-dodecyl group, a stearyl group, a lauryl group, an isopropyl group, an isobutyl group, an s-butyl group, a 2-methylisopropyl group, a benzyl group, and the like. The substituted or non-substituted alicyclic group is the same as the substituted or non-substituted alicyclic group in R, and examples thereof include a cyclohexyl group, and the like. The substituted or non-substituted aryl group is the same as the substituted or non-substituted aryl group in R, and examples thereof include a phenyl group, a p-methylphenyl, and the like. $R^{17}$ to $R^{19}$ may be the same as one another, or may be different from one another.

Examples of the substituted or non-substituted (poly) organosiloxane group include $-SiR^{30}R^{31}-OR^{32}$ and $-(SiR^{33}R^{34}-O-)_m-R^{35}$ (here, $R^{30}$ to $R^{35}$ each independently represent a substituted or non-substituted alkyl group, a substituted or non-substituted alicyclic group, or a substituted or non-substituted aryl group, and m represents an integer of 1 to 100).

The alkyl group, the alicyclic group, and the aryl group in $R^{30}$ to $R^{35}$ each are the same as those exemplified in $R^{17}$ to $R^{19}$.

Examples of the substituent in R (substituent in substituted alkyl group, substituted alicyclic group, substituted aryl group, substituted heteroaryl group, substituted non-aromatic heterocyclic group, substituted aralkyl group, substituted alkaryl group, substituted organosilyl group, substituted (poly)organosiloxane group, and the like) include at least one selected from the group consisting of an alkyl group (here, excluding a case where R is a substituted alkyl group), an aryl group, $-COOR^{11}$, a cyano group, $-OR^{12}$, $-NR^{13}R^{14}$, $CONR^{15}R^{16}$, a halogen atom, an allyl group, an epoxy group, a siloxy group, and a group representing hydrophilic or ionic properties. Here, $R^{11}$ to $R^{16}$ each independently represent a hydrogen atom, a substituted or non-substituted alkyl group, a substituted or non-substituted alicyclic group, or a substituted or non-substituted aryl group.

The alkyl group, the alicyclic group, and the aryl group in $R^{11}$ to $R^{16}$ each are the same as those exemplified in $R^{17}$ to $R^{19}$.

The alkyl group and the aryl group in the substituent each are the same as the non-substituted alkyl group and the non-substituted aryl group.

As $R^{11}$ of $-COOR^{11}$, a hydrogen atom or a non-substituted alkyl group is preferable. That is, $-COOR^{11}$ is preferably a carboxy group or an alkoxy carbonyl group. As the alkoxy carbonyl group, a methoxy carbonyl group is exemplified.

As $R^{12}$ of $-OR^{12}$, a hydrogen atom or a non-substituted alkyl group is preferable. That is, $-OR^{12}$ is preferably a hydroxy group or an alkoxy group. Examples of the alkoxy group include an alkoxy group having 1 to 12 carbon atoms, and a specific example thereof include a methoxy group.

Examples of $-NR^{13}R^{14}$ include an amino group, a monomethyl amino group, a dimethyl amino group, and the like. Examples of $-CONR^{15}R^{16}$ include a carbamoyl group ($-CONH_2$), N-methyl carbamoyl group ($-CONHCH_3$), N,N-dimethyl carbamoyl group (dimethyl amide group: $-CON(CH_3)_2$), and the like.

Examples of the halogen atom include a fluorine atom, a chlorine atom, a bromine atom, an iodine atom, and the like.

Examples of the group representing hydrophilic or ionic properties include an alkali salt of a carboxy group or an alkali salt of a sulfoxy group, a poly(alkylene oxide) such as a polyethylene oxide group, a polypropylene oxide group, and the like, and a cationic substituent such as a quaternary ammonium base.

As R, a substituted or non-substituted alkyl group, or a substituted or non-substituted alicyclic group is preferable, and a non-substituted alkyl group, or as a non-substituted or substituent, an alicyclic group having an alkyl group is more preferable. Among these, from a viewpoint of easy availability, a methyl group, an ethyl group, an n-propyl group, an i-propyl group, an n-butyl group, a t-butyl group, a pentyl group, a hexyl group, a heptyl group, an octyl group, a cyclopropyl group, a cyclobutyl group, an isobornyl group, and an adamantyl group are preferable, and a methyl group, an ethyl group, a n-propyl group, an i-propyl group, an n-butyl group, a t-butyl group, a cyclopropyl group, a cyclobutyl group, an isobornyl group, and an adamantyl group are more preferable.

The macromonomer (a) has two or more constituent units derived from a monomer having a radical polymerizable group (hereinafter referred to as "monomer (a1)"). The two or more constituent units included in the macromonomer (a) may be the same as one another, or may be different from one another.

As the radical polymerizable group included in the monomer (a1), a group having an ethylenic unsaturated bond is preferable in the same way as the preferable radical polymerizable group included in the macromonomer (a). That is, the monomer (a1) is preferably a vinyl monomer.

Examples of the monomer (a1) include the following ones.

Hydrocarbon group-containing (meth)acrylate ester such as methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, isoamyl (meth)acrylate, hexyl (meth)acrylate, 2-ethyl hexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, lauryl (meth)acrylate, hexadecyl (meth)acrylate, stearyl (meth)acrylate, isostearyl (meth)acrylate, phenyl (meth)acrylate, benzyl (meth)acrylate, cyclohexyl (meth)acrylate, tetrahydrofurfuryl (meth)acrylate, isobornyl (meth)acrylate, 3,5,5-trimethylcyclohexyl (meth)acrylate, dicyclopentanyl (meth)acrylate, dicyclopentenyl (meth)acrylate, dicyclopentanyloxy ethyl (meth)acrylate, terpene acrylate or derivatives thereof, hydrogenated rosin acrylate or derivatives thereof, and docosyl (meth)acrylate;

hydroxyl group-containing (meth)acrylate ester such as 2-hydroxyethyl (meth)acrylate, 2-hydroxypropyl (meth)acrylate, 2-hydroxybutyl (meth)acrylate, 3-hydroxybutyl (meth)acrylate, 4-hydroxybutyl (meth) acrylate, and glycerol (meth)acrylate;

carboxyl group-containing vinyl monomer such as (meth) acrylic acid, 2-(meth)acryloyloxyethyl hexahydrophthalic acid, 2-(meth)acryloyloxypropyl hexahydrophthalic acid, 2-(meth)acryloyloxyethyl phthalic acid, 2-(meth)acryloyloxypropyl phthalic acid, 2-(meth) acryloyloxyethyl maleic acid, 2-(meth)acryloyloxypropyl maleic acid, 2-(meth)acryloyloxyethyl succinic acid, 2-(meth)acryoyloxypropyl succinic acid, crotonic acid, fumaric acid, maleic acid, itaconic acid, citraconic acid, monomethyl maleate, monoethyl maleate, monooctyl maleate, monomethyl itaconate, monoethyl itaconate, monobutyl itaconate, monooctyl itaconate, monomethyl fumarate, monoethyl fumarate, monobutyl fumarate, monooctyl fumarate, and monomethyl citraconate;

acid anhydride group-containing vinyl monomer such as maleic anhydride and itaconic anhydride;

amide bond-containing vinyl monomer including amide bond-containing linear vinyl monomer such as (meth)acrylamide, N,N-dimethyl (meth)acrylamide, N,N-dimethyl (meth)acrylamide, N-isopropyl (meth)acrylamide, N-t-butyl (meth)acrylamide, N-t-octyl (meth) acrylamide, N-methylol(meth)acrylamide, hydroxyethyl (meth)acrylamide, N-methoxymethyl (meth)acrylamide, N-butoxy methyl (meth)acrylamide, diacetone(meth)acrylamide, N,N-dimethyl aminoethyl (meth)acrylamide, N,N-dimethylaminopropyl (meth) acrylamide, N-vinyl acetoamide, maleic acid amide, and N,N'-methlyene bis(meth)acrylamide, and amino bond-containing cyclic vinyl monomer such as (meth) acryloyl morpholine, N-vinyl pyrrolidone, N-vinyl-ε-caprolactone, and maleimide;

unsaturated dicarboxylic acid diester monomer such as dimethyl malate, dibutyl malate, dimethyl fumarate, dibutyl fumarate, dibutyl itaconate, and diperfluorocyclohexyl fumarate;

epoxy group-containing vinyl monomer such as glycidyl (meth)acrylate, glycidyl α-ethylacrylate, 3,4-epoxybutyl (meth)acrylate, 1,2-epoxy-4-vinyl cyclohexane, and 3,4-epoxycyclohexylmethyl (meth)acrylate;

amino group-containing (meth)acrylic acid ester-based vinyl monomer such as dimethylaminoethyl (meth)acrylate and diethylaminoethyl (meth)acrylate;

multifunctional vinyl monomer such as divinyl benzene, ethyleneglycol di(meth)acrylate, 1,3-butyleneglycol di(meth)acrylate, 1,4-butanediol di(meth)acrylate, 1,6-hexanediol di(meth)acrylate, diethyleneglycol di(meth)acrylate, triethyleneglycol di(meth)acrylate, tetraethyleneglycol di(meth)acrylate, polyethyleneglycol di(meth)acrylate, tripropyleneglycol di(meth)acrylate, neopentylglycol di(meth)acrylate, 1,9-nonanediol di(meth)acrylate, 1,10-decanediol di(meth)acrylate, trimethylolpropane tri(meth)acrylate, pentaerythritol tetra(meth)acrylate, dipentaerythritol hexa(meth)acrylate, allyl (meth)acrylate, triallyl cyanurate, diallyl maleate, and polypropylene glycol diallayl ether;

heterocyclic monomer such as vinyl pyridine, vinyl carbazole, (3-ethylocetane-3-yl)methyl acrylate, 2-methyl-2-ethyl-1,3-dioxolane-4-yl)methyl acrylate, and cyclic trimethylol propane formal acrylate;

glycol ester-based monomer such as polyethyleneglycol (meth)acrylate, polypropyleneglycol (meth)acrylate, methoxyethyl (meth)acrylate, ethoxyethyl (meth)acrylate, n-butoxyethyl (meth)acrylate, isobutoxyethyl (meth)acrylate, t-butoxyethyl (meth)acrylate, ethoxyethoxy ethyl (meth)acrylate, phenoxyethyl (meth)acrylate, nonylphenoxy ethyl (meth)acrylate, 3-methoxybutyl (meth)acrylate, acetoxyethyl (meth)acrylate, "Plexel FM" (caprolactone-added monomer manufactured by Daicel Chemical Industries, Ltd., product name), "Blemmer PME-100" methoxy polyethylene glycol methacrylate (of which ethylene glycol chain is 2) manufactured by Nof Corporation, product name), "Blemmer PME-200 (methoxy polyethylene glycol methacrylate (of which ethylene glycol chain is 4) manufactured by Nof Corporation, product name), "Blemmer PME-400" (methoxy polyethylene glycol methacrylate (of which ethylene glycol chain is 9) manufactured by Nof Corporation, product name), "Blemmer 50POEP-800B" (octoxy polyethylene glycol-polypropylene glycol-methacrylate (of which ethylene glycol chain is 8, and propylene glycol chain is 6) manufactured by Nof Corporation, product name), "Blemmer 20ANEP-600" (nonyl phenoxy (ethylene glycol polypropylene glycol) monoacrylate manufactured by Nof Corporation, product name), "Blemmer AME-100" (manufactured by Nof Corporation, product name), "Blemmer AME-200" (manufactured by Nof Corporation, product name), and "Blemmer 50AOEP-800B" (manufactured by Nof Corporation, product name);

silane coupling agent-containing monomer such as 3-(meth)acryloxy propyl trimethoxy silane, 3-(meth)acryloxy propyl methyl diethoxy silane, 3-(meth)acryloxy propyl triethoxy silane, 3-acryloxypropyl trimethoxy silane, vinyl trimethoxy silane, and vinyl triethoxy silane;

organosilyl group-containing monomer other than a monomer containing a silane coupling agent such as trimethyl silyl (meth)acrylate, triethylsilyl (meth)acrylate, tri-n-propylsilyl (meth)acrylate, tri-n-butylsilyl (meth)acrylate, tri-n-amylsilyl (meth)acrylate, tri-n-hexylsilyl (meth)acrylate, tri-n-octylsilyl (meth)acrylate, tri-n-dodecylsilyl (meth)acrylate, triphenylsilyl (meth)acrylate, tri-p-methylphenylsilyl (meth)acrylate, tribenzylsilyl (meth)acrylate, triisopropylsilyl (meth)acrylate, triisobutylsilyl (meth)acrylate, tri-s-butylsilyl (meth)acrylate, tri-2-methylisopropylsilyl (meth)acrylate, tri-t-butylsilyl (meth)acrylate, ethyldimethylsilyl (meth)acrylate, n-butyldimethylsilyl (meth)acrylate, diisopropyl-n-butylsilyl (meth)acrylate, n-octyl-di-n-butylsilyl (meth)acrylate, diisopropylstearylsilyl (meth)acrylate, dicyclohexylphenylsilyl (meth)acrylate, t-butyldiphenylsilyl (meth)acrylate, lauryldiphenylsilyl (meth)acrylate, triisopropylsilyl methyl malate, triisopropylsilyl amyl malate, tri-n-butylsilyl n-butyl malate, t-butyldiphenylsilyl methyl malate, t-butyldiphenylsilyl n-butyl malate, triisopropylsilyl methyl fumarate, triisopropylsilyl amyl fumarate, tri-n-butylsilyl n-butyl fumarate, t-butyldiphenylsilyl methyl fumarate, t-butyldiphenylsilyl n-butyl fumarate, Silaplane FM-0711 (manufactured by JNC Corporation, product name), Silaplane FM-0721 (manufactured by JNC Corporation, product name), Silaplane FM-0725 (manufactured by JNC Corporation, product name), Silaplane TM-0701 (manufactured by JNC Corporation, product name), Silaplane TM-0701T (manufactured by JNC Corporation, product name), X-22-174ASX (manufactured by Shin-Etsu Chemical Co., Ltd., product name), X-22-174BX (manufactured by Shin-Etsu Chemical Co., Ltd., product name), KF-2012 (manufactured by Shin-Etsu Chemical Co., Ltd., product name), X-22-2426 (manufactured by Shin-Etsu Chemical Co., Ltd., product name), and X-22-2404 (manufactured by Shin-Etsu Chemical Co., Ltd., product name);

halogenated olefin such as vinyl chloride, vinylidene chloride, vinyl fluoride, vinylidene fluoride, and chlorotrifluoroethylene;

isocyanate group-containing monomer such as 2-isocyanateethyl (meth)acrylate;

fluorine-containing monomer such as 2,2,2-trifluoroethyl (meth)acrylate, 2,2,3,3,3-pentafluorophenyl(meth) acrylate, 2-(perfluorobutyl)ethyl (meth)acrylate, 3-(perfluorobutyl)-2-hydroxypropyl (meth)acrylate, 2-(perfluorohexyl)ethyl (meth)acrylate, 3-perfluorohexyl-2-hydroxypropyl (meth)acrylate, 3-(perfluoro-3-methylbutyl)-2-hydroxypropyl (meth)acrylate, 2,2,3,3-tetrafluoropropyl (meth)acrylate, 1H,1H,5H-octafluoropentyl (meth)acrylate, 1H,1H,5H-octafluoropentyl (meth)acrylate, 1H,1H,2H,2H-tridecafluorooctyl (meth)acrylate, 1H-1-(trifluoromethyl)trifluoroethyl (meth)acrylate, 1H,1H,3H-hexafluorobutyl (meth)acrylate, and 1,2,2,2-tetrafluoro-1-(trifluoromethyl)ethyl (meth)acrylate (here, excluding halogenated olefin);

monomer having an acetal structure such as 1-butoxyethyl (meth)acrylate, 1-(2-ethylhexyloxy)ethyl (meth)acrylate, 1-(cyclohexyloxy)ethyl methacrylate, and 2-tetrahydropyranyl (meth)acrylate; and other vinyl monomers such as 4-methacryloyloxy benzophenone, styrene, α-methyl styrene, vinyl toluene, (meth)acrylonitrile, vinyl chloride, vinyl acetate, and vinyl propionate.

One kind of the monomers (a1) may be used alone, or two or more kinds thereof may be used in combination.

At least a portion of the monomers (a1) is preferably a (meth)acrylic monomer.

As the constituent unit derived from the monomer (a1), a constituent unit represented by the following formula (aa) (hereinafter, referred to as "constituent unit (aa)" is preferable. That is, the macromonomer (a) preferably has a radical polymerizable group and has two or more constituent units (aa).

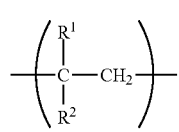

(aa)

(In the formula, $R^1$ represents a hydrogen atom, a methyl group, or $CH_2OH$, $R^2$ represents $OR^3$, a halogen atom, $COR^4$, $COOR^5$, $CN$, $CONR^6R^7$, $NHCOR^8$, or $R^9$, $R^3$ to $R^8$ each independently represent a hydrogen atom, a substituted or non-substituted alkyl group, a substituted or non-substituted alicyclic group, a substituted or non-substituted aryl group, a substituted or non-substituted heteroaryl group, a substituted or non-substituted non-aromatic heterocyclic group, a substituted or non-substituted aralkyl group, a substituted or non-substituted alkaryl group, a substituted or non-substituted organosilyl group, or a substituted or non-substituted (poly)organosloxane group, and substituents substituting these groups each independently represent at least one selected from the group consisting of an alkyl group, an aryl group, a heteroaryl group, a non-aromatic heterocyclic group, an aralkyl group, an alkaryl group, a carboxylic acid group, a carboxylic acid ester group, an epoxy group, a hydroxy group, an alkoxy group, a primary amino group, a secondary amino group, a tertiary amino group, an isocyanate group, a sulfonic acid group, and a halogen atom, $R^9$ represents a substituted or non-substituted aryl group, a substituted or non-substituted heteroaryl group, or a substituted or non-substituted non-aromatic heterocyclic group, and substituents substituting these groups each independently represent at least one selected from the group consisting of an alkyl group, an aryl group, a heteroaryl group, a non-aromatic heterocyclic group, an aralkyl group, an alkaryl group, a carboxylic acid group, a carboxylic acid ester group, an epoxy group, a hydroxy group, an alkoxy group, a primary amino group, a secondary amino group, a tertiary amino group, an isocyanate group, a sulfonic acid group, a substituted or non-substituted olefin group, and a halogen atom.)

A non-substituted alkyl group, a non-substituted alicyclic group, a non-substituted aryl group, a non-substituted heteroaryl group, a non-substituted non-aromatic heterocyclic group, a non-substituted aralkyl group, a non-substituted alkaryl group, a non-substituted organosilyl group, a non-substituted (poly)organosiloxane group in $R^3$ to $R^8$ each independently are the same as those exemplified in R.

In the substituents in $R^3$ to $R^8$ (substituents in an alkyl group of a substituent, a substituted alicyclic group, a substituted aryl group, a substituted heteroaryl group, a substituted non-aromatic heterocyclic group, a substituted aralkyl group, a substituted alkaryl group, a substituted organosilyl group, and a substituted (poly)organosiloxane group), an alkyl group, an aryl group, a heteroaryl group, a non-aromatic heterocyclic group, an aralkyl group, an alkaryl group, a halogen atom each independently are the same as those exemplified in R.

Examples of the carboxylic acid ester group include a group in which $R^{11}$ of the $—COOR^{11}$ is a substituted or non-substituted alkyl group, a substituted or non-substituted alicyclic group, or a substituted or non-substituted aryl group.

Examples of the alkoxy group include a group in which $R^{12}$ of the $—OR^{12}$ is a non-substituted alkyl group.

Examples of the secondary amino group include a group in which $R^{13}$ of the $—NR^{13}R^{14}$ is a hydrogen atom, and $R^{14}$ is a substituted or non-substituted alkyl group, a substituted or non-substituted alicyclic group, or a substituted or non-substituted aryl group.

Examples of the tertiary amino group include a group in which $R^{13}$ and $R^{14}$ of the $—NR^{13}R^{14}$ each independently represent a substituted or non-substituted alkyl group, a substituted or non-substituted alicyclic group, or a substituted or non-substituted aryl group.

A non-substituted aryl group, a non-substituted heteroaryl group, a non-substituted non-aromatic heterocyclic group in $R^9$ each are the same as those exemplified in R.

In the substituents in $R^9$ (substituents in a substituted aryl group, a substituted heteroaryl group, and a substituted non-aromatic heterocyclic group), the alkyl group, the aryl group, the heteroaryl group, the non-aromatic heterocyclic group, the aralkyl group, the alkaryl group, the carboxylic acid group, the carboxylic acid ester group, the alkoxy group, the primary amino group, the secondary amino group, the tertiary amino group, and the halogen atom each are the same as those exemplified in $R^3$ to $R^8$.

Examples of the non-substituted olefin group include an allyl group and the like.

As the substituent in an olefin group having a substituent, the same substituent as the substituent in $R^9$ is exemplified.

The constituent unit (aa) is a constituent unit derived from $CH_2=CR^1R^2$.

Specific examples of $CH_2=CR^1R^2$ include the following.

A hydrophobic group-containing (meth)acrylic acid ester monomer such as a substituted or non-substituted alkyl (meth)acrylate [for example, methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, lauryl (meth)acrylate, stearyl (meth)acrylate, i-stearyl (meth)acrylate, i-decyl (meth)acrylate, n-decyl (meth)acrylate, behenyl (meth)acrylate, 1-methyl-2-methoxyethyl (meth)acrylate, 3-methoxybutyl (meth)acrylate, 3-methyl-3-methoxybutyl (meth)acrylate] a substituted or non-substituted aralkyl (meth)acrylate [for example, behenyl (meth)acrylate, m-methoxy phenyl ethyl (meth)acrylate, p-methoxy phenyl ethyl (meth)acrylate], a substituted or non-substituted aryl (meth)acrylate [for example, phenyl (meth)acrylate, m-methoxyphenyl (meth)acrylate, p-methoxyphenyl (meth)acrylate, o-methoxyphenyl ethyl (meth)acrylate], an alicyclic (meth)acrylate [for example, isobornyl (meth)acrylate, cyclohexyl (meth)acrylate], and halogen atom-containing (meth)acrylate [for example, trifluoroethyl (meth)acrylate, perfluorooctyl (meth)acrylate, perfluorocyclohexyl (meth)acrylate];

- an oxyethylene group-containing (meth)acrylic acid ester monomer such as 2-methoxyethyl (meth)acrylate, 2-ethoxyethyl (meth)acrylate, 2-butoxyethyl (meth)acrylate, butoxydiethyleneglycol (meth)acrylate, methoxytriethyleneglycol (meth)acrylate, methoxypolyethylene glycol (meth)acrylate, phenoxyethyl (meth)acrylate, and 2-(2-ethylhexaoxy)ethyl (meth)acrylate;
- a hydroxyl group-containing (meth)acrylic acid ester monomer such as 2-hydroxyethyl (meth)acrylate, 2-hydroxypropyl (meth)acrylate, 4-hydroxybutyl (meth)acrylate, and glycerol (meth)acrylate;
- a terminal alkoxy allylated polyether monomer such as methoxy polyethyleneglycol allyl ether, methoxypolypropylene glycol allyl ether, butoxypolyethyleneglycol allyl ether, butoxypolypropyleneglycol allyl ether, methoxypolyethyleneglycol-polypropyleneglycol allyl ether, and butoxypolyethyleneglycol-polypropyleneglycol allyl ether;
- an epoxy group-containing vinyl monomer such as glycidyl (meth)acrylate, glycidyl α-ethylacrylate, and 3,4-epoxybutyl (meth)acrylate;
- an amino bond-containing vinyl monomer such as (meth)acrylamide, N,N-dimethyl (meth)acrylate. N,N-dimethyl (meth)acrylamide, N-isopropyl (meth)acrylamide, N-t-butyl (meth)acrylamide, N-t-octyl (meth)acrylamide, N-methylol (meth)acrylamide, hydroxyethyl (meth)acrylamide, N-methoxymethyl (meth)acrylamide, N-butoxymethyl (meth)acrylamide, diacetone (meth)acrylamide, N,N-dimethylaminoethyl (meth)acrylamide, N,N-dimethylaminopropyl (meth)acrylamide, N-vinyl acetoamide, N,N-methylene bis (meth)acrylamide, (meth)acryloylmorpholine, N-vinylpyrrolidone, and N-vinyl-ε-caprolactam;
- a primary or secondary amino group-containing vinyl monomer such as butylaminoethyl (meth)acrylate;
- a tertiary amino group-containing vinyl monomer such as dimethylaminoethyl (meth)acrylate, diethylaminoethyl (meth)acrylate, dimethylaminopropyl (meth)acrylate, dimethylaminobutyl (meth)acrylate, and dibutylaminoethyl (meth)acrylate;
- a heterocyclic basic monomer such as vinyl pyridine, vinyl carbazole, (3-ethyloxetane-3-yl)methyl acrylate, (2-methyl-2-ethyl-1,3-dioxolane-4-yl)methyl acrylate, and cyclic trimethylol propane formal acrylate;
- an organosilyl group-containing vinyl monomer such as trimethyl silyl (meth)acrylate, triethylsilyl (meth)acrylate, tri-n-propylsilyl (meth)acrylate, tri-n-butylsilyl (meth)acrylate, tri-n-amylsilyl (meth)acrylate, tri-n-hexylsilyl (meth)acrylate, tri-n-octylsilyl (meth)acrylate, tri-n-dodecylsilyl (meth)acrylate, triphenylsilyl (meth)acrylate, tri-p-methylphenylsilyl (meth)acrylate, tribenzylsilyl (meth)acrylate, triisopropylsilyl (meth)acrylate, triisobutylsilyl (meth)acrylate, tri-s-butylsilyl (meth)acrylate, tri-2-methylisopropyl silyl (meth)acrylate, tri-t-butylsilyl (meth)acrylate, ethyldimethylsilyl (meth)acrylate, n-butyldimethylsilyl (meth)acrylate, diisopropyl-n-butylsilyl (meth)acrylate, n-octyl-di-n-butylsilyl (meth)acrylate, diisopropylstearylsilyl (meth)acrylate, dicyclohexylphenylsilyl (meth)acrylate, t-butyldiphenylsilyl (meth)acrylate, and lauryldiphenylsilyl (meth)acrylate;
- a carboxylic group-containing ethylenic unsaturated monomer such as methacrylic acid, acrylic acid, vinylbenzoic acid, tetrahydrophthalic acid monohydroxyethyl (meth)acrylate, tetrahydro phthalic acid monohydroxypropyl (meth)acrylate, tetrahydrophthalic acid monohydroxybutyl (meth)acrylate, phthalic acid monohydroxyethyl (meth)acrylate, phthalic acid monohydroxypropyl (meth)acrylate, succinic acid monohydroxyethyl (meth)acrylate, succinic acid monohydroxypropyl (meth)acrylate, maleic acid monohydroxyethyl (meth)acrylate, and maleic acid monohydroxypropyl (meth)acrylate;
- cyano group-containing vinyl monomer such as acrylonitrile and methacrylonitrile;
- vinyl ether monomer such as alkyl vinyl ether [for example, ethyl vinyl ether, propyl vinyl ether, butyl vinyl ether, hexyl vinyl ether, 2-ether hexyl vinyl ether, and the like] and cycloalkyl vinyl ether [for example, cyclohexyl vinyl ether and the like];
- vinyl ester monomer such as vinyl acetate, vinyl propionate, vinyl butyrate, and vinyl benzoate;
- aromatic vinyl monomer such as styrene, vinyl toluene, and α-methyl styrene;
- halogenated olefin such as vinyl chloride and vinyl fluoride; and the like.

The macromonomer (a) may further have other constituent units than the constituent unit (aa). Examples of the other constituent unit include a constituent unit derived from a monomer not corresponding to $CH_2=CR^1R^2$ of the monomer exemplified as an example of the monomer (a1).

Preferable specific examples of the other constituent units include constituent units derived from the following monomers.

Organo silyl group-containing vinyl monomer such as triisopropyl silyl methyl malate, triisopropyl silyl amyl malate, tri-n-butyl silyl-n-butyl malate, t-butyl diphenyl silyl methyl malate, t-butyl diphenyl silyl-n-butyl malate, triisopropyl silyl methyl fumarate, triisopropyl silyl amyl fumarate, tri-n-butyl silyl-n-butyl fumarate, t-butyl diphenyl silyl methyl fumarate, and t-butyl diphenyl silyl-n-butyl fumarate; an acid anhydride group-containing vinyl monomer such as maleic anhydride and itaconic acid anhydride;

- a carboxy group-containing ethylenic unsaturated monomer such as crotonic acid, maleic acid, itaconic acid, maleic acid, citraconic acid, monomethyl maleate, monoethyl maleate, monobutyl maleate, monooctyl maleate, monomethyl itaconate, monoethyl itaconate, monobutyl itaconate, monooctyl itaconate, monomethyl fumarate, monoethyl fumarate, monobutyl fumarate, monooctyl fumarate, and monoethyl citraconate;
- unsaturated dicarboxylic acid diester monomer such as dimethyl maleate, dibutyl maleate, dimethyl fumarate, dibutyl fumarate, dibutyl itaconate, and diperfluorocyclohexyl fumarate;
- halogenated olefin such as vinylidene chloride, vinylidene fluoride, and chlorotrifluoroethylene;

multifunctional monomer such as ethyleneglycol di(meth)acrylate, diethyleneglycol (meth)acrylate, triethyleneglycol di(meth)acrylate, polyethyleneglycol di(meth)acrylate, 1,4-butanediol di(meth)acrylate, 1,6-hexanediol di(meth)acrylate, neopentylglycol di(meth)acrylate, 1,9-nonanediol (meth)acrylate, 1,10-decanediol di(meth)acrylate, trimethylolpropane tri(meth)acrylate, pentaerythritol tetra(meth)acrylate, dipentaerythritol hexa(meth)acrylate, allyl methacrylate, triallyl cyanurate, diallyl maleate, and polypropylene glycol diallyl ether.

The macromonomer (a) preferably includes 50% by mass or more of a constituent unit derived from (meth)acrylic monomer, and more preferably includes 70% by mass or more to a total mass (100% by mass) of all constituent units constituting the macromonomer (a). The upper limit is not limited, and may be 100% by mass.

The constituent unit derived from (meth)acrylic monomer is preferably a constituent unit in which $R^1$ in the formula (aa) is a hydrogen atom or a methyl group, and $R^2$ is $COOR^5$.

The macromonomer (a) is preferably a macromonomer compatible with the epoxy resin (B) and a cured product thereof. With this, adhesion strength of the cured product of the epoxy resin composition is more excellent.

Examples of the macromonomer compatible with the epoxy resin (B) and the cured product thereof include poly methyl methacrylate. In addition, when a constituent unit derived from a vinyl monomer having a polar functional group such as a carboxyl group, a hydroxy group, an amide group, an amino group, and a cyclic ether group (glycidyl group (epoxy group), tetrahydrofurfuryl group, and the like) is further included in the constituent unit derived from methyl methacrylate, compatibility of the epoxy resin (B) and the cured product thereof is more enhanced, and is more preferable. Among these, in a case where a constituent unit derived from a vinyl monomer having a glycidyl group is included, impact strength is excellent, and thus is particularly preferable.

Examples of the cyclic ether group included in the macromonomer (a) include an oxiranyl group, an oxetanyl group, an oxolanyl group, a dioxolanyl group, a dioxanyl group, and the like. One or more kinds of these can be used by being appropriately selected.

Among these, since compatibility between the macromonomer (a) and the epoxy resin is easily improved, the oxiranyl group, the oxetanyl group, and the oxolanyl group are preferable.

Examples of the constituent unit having a cyclic ether group in the macromonomer (a) include a constituent unit derived from one or more monomers selected from the group consisting of glycidyl (meth)acrylate, (3,4-epoxycyclohexyl)methyl (meth)acrylate, β-methylglycidyl (meth)acrylate, (3-ethyloxetane-3-yl)methyl (meth)acrylate, tetrahydrofurfuryl (meth)acrylate, (2-methyl-2-ethyl-1,3-dioxoran-4-yl) (meth)acrylate, and (5-ethyl-1,3-dioxane-5-yl)methyl (meth)acrylate. The cyclic ether group may bind to an alkylene group.

In these monomers, since compatibility between the macromonomer (a) and the epoxy resin is easily improved, glycidyl (meth)acrylate, (3,4-epoxycyclohexyl)methyl (meth)acrylate, β-methylglycidyl (meth)acrylate, (3-ethyloxetane-3-yl)methyl (meth)acrylate, tetrahydrofurfuryl (meth)acrylate are preferable, and glycidyl (meth)acrylate, (3-ethyloxetane-3-yl)methyl (meth)acrylate, tetrahydrofurfuryl (meth)acrylate are more preferable, and glycidyl (meth)acrylate is further more preferable.

As the macromonomer (a), a macromonomer in which a radical polymerizable group is introduced into a terminal of a main chain including two or more constituent units (aa) is preferable, and a macromonomer represented by the following formula (1) is more preferable. By the epoxy resin composition including a copolymer in which the macromonomer (a) is a macromonomer represented by the formula (1), as a copolymer (A), viscosity of the epoxy resin composition can be reduced. At this time, as the copolymer (A), a copolymer in which the macromonomer (a) is a macromonomer other than the macromonomer represented by the formula (1) may be further included.

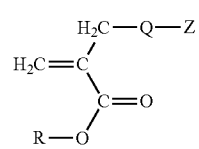

(1)

(In the formula, R represents a hydrogen atom, a substituted or non-substituted alkyl group, a substituted or non-substituted alicyclic group, a substituted or non-substituted aryl group, a substituted or non-substituted heteroaryl group, a substituted or non-substituted non-aromatic heterocyclic group, a substituted or non-substituted aralkyl group, a substituted or non-substituted alkaryl group, a substituted or non-substituted organo silyl group, or a substituted or non-substituted (poly)organosiloxane group, Q represents a main chain portion including two or more constituent units represented by the formula (aa), and Z represents a terminal group.)

In the formula (1), R is the same as R in $CH_2=C(COOR)—CH_2—$, and a preferable aspect is also the same.

Two or more constituent units (aa) included in Q each may be the same as one another, or may be different from one another.

Q may be constituted of only the constituent unit (aa), or may further include other constituent units than the constituent unit (aa).

Q preferably includes a constituent unit in which $R^1$ in the formula (aa) is a hydrogen atom or a methyl group, and $R^2$ is $COOR^5$, as the constituent unit (aa). A proportion of the constituent unit is preferably 50% by mass or more, more preferably 70% by mass or more, and may be 100% by mass, to a total mass (100% by mass) of all constituent units constituting Q.

The number of the constituent units constituting Q is appropriately set considering the number average molecular weight of the macromonomer (a) and the like.

Similar to the terminal group of the polymer obtained by known radical polymerization, as Z, a hydrogen atom, a group derived from a radical polymerization initiator, a radical polymerizable group, and the like are exemplified, for example.

As the macromonomer (a), a macromonomer represented by the following formula (2) is particularly preferable.

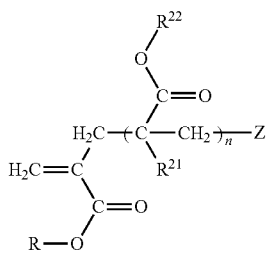

(2)

(In the formula, R and Z each are the same as described above, $R^{21}$ represents a hydrogen atom or a methyl group, $R^{22}$ represents a hydrogen atom, a substituted or non-substituted alkyl group, a substituted or non-substituted alicyclic group, a substituted or non-substituted aryl group, a substituted or non-substituted heteroaryl group, a substituted or non-substituted non-aromatic heterocyclic group, a substituted or non-substituted aralkyl group, a substituted or non-substituted alkaryl group, a substituted or non-substituted organosilyl group, or a substituted or non-substituted (poly)organosiloxane group, a substituent substituting these groups each is at least one selected from the group consisting of an alkyl group, an aryl group, a heteroaryl group, a non-aromatic heterocyclic group, an aralkyl group, an alkaryl group, a carboxylic acid group, a carboxylic acid ester group, an epoxy group a hydroxy group, an alkoxy group, a primary amino group, a secondary amino group, a tertiary amino group, an isocyanate group, a sulfonate group, and a halogen atom, n is a natural number of 2 or more, and Z is a terminal group.)

In the formula (2), each group in $R^{22}$ is the same as those exemplified in $R^5$ of $COOR^5$.

n is a natural number of 2 or more. n is preferably n in which the number average molecular weight (Mn) of the macromonomer (a) is within a range of 500 to 100,000. A preferable range of the number average molecular weight is as described later. n $R^{21}$ each may be the same as one another, or may be different from one another. n $R^2$ each may be the same as one another, or may be different from one another.

In a case where the macromonomer (a) has the addition reactive functional group, and the macromonomer is added with a functional group of a polymer constituted of a constituent unit derived from a vinyl monomer (b), as the macromonomer (a), a macromonomer having one or more addition reactive functional groups and having two or more constituent units (aa) is preferable. As the constituent unit (aa), it is possible to use the same as the case where the macromonomer (a) has a radical polymerizable group.

In addition to the macromonomer (a), it is possible to add a compound having a functional group with the functional group of the polymer constituted of a constituent unit derived from the vinyl monomer (b). Examples of the compound having a functional group include a silicone compound such as X-22-173BX (manufactured by Shin-Etsu Chemical Co., Ltd., product name), X-22-173DX (manufactured by Shin-Etsu Chemical Co., Ltd., product name), X-22-170BX (manufactured by Shin-Etsu Chemical Co., Ltd., product name), X-22-170DX (manufactured by Shin-Etsu Chemical Co., Ltd., product name), X-22-176DX (manufactured by Shin-Etsu Chemical Co., Ltd., product name), X-22-176F (manufactured by Shin-Etsu Chemical Co., Ltd., product name), and X-22-173GX-A (manufactured by Shin-Etsu Chemical Co., Ltd., product name).

The number average molecular weight (Mn) of the macromonomer (a) is preferably 500 to 100,000, more preferably 1,500 to 20,000, and further more preferably 2,000 to 10,000. If the number average molecular weight of the macromonomer (a) is equal to or more than the lower limit of the range, adhesion strength is more excellent. If the number average molecular weight of the macromonomer (a) is equal to or less than the upper limit of the range, viscosity of the epoxy resin composition can be reduced.

The number average molecular weight of the macromonomer (a) is measured by gel permeation chromatography (GPC) using polystyrene as a reference resin.

The glass transition temperature (hereinafter, referred to as "Tga") of the macromonomer (a) is preferably 0° C. to 150° C., more preferably 10° C. to 120° C., and further more preferably 30° C. to 100° C. If Tga is equal to or more than the lower limit of the range, adhesion strength is more excellent. If Tga is equal to or less than the upper limit of the range, viscosity of the epoxy resin composition can be further reduced.

Tga can be measured by differential scanning calorimetry (DSC).

Tga can be adjusted by composition of a monomer forming the macromonomer (a) and the like.

<Vinyl Monomer (b)>

The vinyl monomer (b) is a monomer that has an ethylenic unsaturated bond which is not a macromonomer. The vinyl monomer (b) is not particularly limited, and it is possible to use those the same as the monomer (a1) exemplified to obtain the macromonomer (a). One kind of the vinyl monomer (b) may be used alone, or two or more kinds thereof may be used in combination.

At least a portion of the vinyl monomer (b) is preferably a (meth)acrylic monomer.

The vinyl monomer (b) preferably includes alkyl (meth)acrylate (hereinafter, referred to as "monomer (b1)") having a non-substituted alkyl group having 1 to 30 carbon atoms. The number of carbon atoms of alkyl (meth)acrylate is more preferably 2 to 30, and further more preferably 4 to 20. With the monomer (b1), it is possible to impart excellent toughness to the cured product of the epoxy resin composition, and to express excellent adhesion strength and impact strength.

Specific examples of the monomer (b1) include methyl (meth)acrylate, ethyl (meth)acrylate, n-propyl (meth)acrylate, n-butyl (meth)acrylate, 2-ethylhexyl (meth)acrylate, n-octyl (meth)acrylate, isooctyl (meth)acrylate, nonyl (meth)acrylate, isononyl (meth)acrylate, decyl (meth)acrylate, isodecyl (meth)acrylate, lauryl (meth)acrylate, hexadecyl (meth)acrylate, stearyl (meth)acrylate, isostearyl (meth)acrylate, behenyl (meth)acrylate, and branched nonyl acrylate (for example, product name Viscoat #197, manufactured by Osaka Organic Chemical Industry Ltd.).

The vinyl monomer (b) may further contain vinyl monomers other than the monomer (b1), depending on the necessity. The other vinyl monomers can be appropriately selected from the monomers exemplified above.

Preferable examples of the other vinyl monomers include (meth)acrylic acid, hydroxyethyl (meth)acrylate, hydroxypropyl (meth)acrylate, styrene, isobornyl (meth)acrylate, cyclohexyl (meth)acrylate, benzyl (meth)acrylate, tetrahydrofurfuryl (meth)acrylate, glycidyl (meth)acrylate, (meth)acrylamide, dimethyl (meth)acrylamide, and diethyl (meth)acrylamide.

In the copolymer (A), composition of the constituent unit derived from the macromonomer (a) and composition of the constituent unit derived from the vinyl monomer (b) are preferably different from each other. The vinyl monomer (b) preferably has composition in which difference in polarity between the polymer obtained by polymerizing only the vinyl monomer (b) (hereinafter, referred to as "polymer (b0)") and the macromonomer (a) occurs.

In a case where a macromonomer compatible with the epoxy resin (B) and a cured product thereof is used as the macromonomer (a), composition of the vinyl monomer (b) is preferably composition in which the polymer (b0) has lower polarity than the macromonomer (a).

An example of composition in which difference in polarity occurs includes an example in which the macromonomer (a) includes a constituent unit derived from methyl methacrylate and the vinyl monomer (b) includes a monomer (b1) having two or more carbon atoms of alkyl (meth)acrylate. In this case, since the number of carbon atoms of the alkyl group is greater than that of the methyl group, polarity is lower compared to methyl methacrylate. By setting such composition, difference in polarity between the polymer (b0) and the macromonomer (a) occurs, and the polymer (b0) has lower polarity than the macromonomer (a).

In this example, a proportion of the constituent unit derived from methyl methacrylate to a sum of all constituent units constituting the macromonomer (a) is preferably 50% by mass or more, and more preferably 75% by mass or more. In addition, a proportion of the monomer (b1) to a total amount of the vinyl monomer (b) is preferably 30% by mass or more, and more preferably 40% by mass or more. The greater the proportion of the constituent unit derived from methyl methacrylate in the macromonomer (a) becomes, or the greater the proportion of the monomer (b1) in the vinyl monomer (b) becomes, difference in polarity between the polymer (b0) and the macromonomer (a) becomes great, and micro phase separation becomes easy at the time of curing the epoxy resin composition.

In addition, in the example, from a viewpoint of increasing difference of polarity, the content of the vinyl monomer having a polar functional group such as a carboxyl group, a hydroxy group, an amide group, an amino group, and an epoxy group in the vinyl monomer (b) is preferably 30% by mass or less, more preferably 10% by mass or less, and further more preferably 5% by mass or less, to the total amount of the vinyl monomer (b). The lower limit is not particularly limited, and may be 0% by mass.

Regarding the vinyl monomer (b), a glass transition temperature (TgB) of the polymer obtained by polymerizing only the vinyl monomer (h) is 25° C. or less. TgB is preferably −150° C. to 0° C., and more preferably −150° C. to −10° C. If TgB is within the range, adhesion strength of a cured product of the epoxy resin composition is more excellent.

Here, in a case where there is one kind of the vinyl monomer (b), TgB is a glass transition temperature of a homopolymer of the vinyl monomer, and in a case where there is a plurality of the vinyl monomers (b), TgB means a value calculated by a calculation formula of Fox from the glass transition temperature and the mass fraction of each homopolymer of the plurality of vinyl monomers.

The Fox calculation formula is a calculation formula obtained by the following formula, and can be obtained by using a value described in Polymer Handbook [Polymer HandBook, J. Brandrup, Interscience, 1989] (Tg in the formula corresponds to TgB).

$$1/(273+Tg)=\Sigma(Wi/(273+Tgi))$$

(In the formula, Wi represents a mass fraction of monomer i, and Tgi represents a glass transition temperature (° C.) of homopolymer of monomer i.)

From a viewpoint of capable of sufficiently expressing characteristics of each of the polymer chain derived from the macromonomer (a) and the polymer chain constituted of the constituent unit derived from the vinyl monomer (b), The Tga and TgB preferably have a relationship of the following formula (3). That is, Tga−TgB>0° C. is preferable.

$$Tga>TgB \tag{3}$$

Tga−TgB>50° C. is more preferable, and Tga−TgB>80° C. is most preferable.

<Content of Each Constituent Unit>

The content of the constituent unit derived from the macromonomer (a) in the copolymer (A) is preferably 10% by mass to 80% by mass, and more preferably 20% by mass to 70% by mass, to a total mass of all constituent units constituting the copolymer (A). If the content of the constituent unit derived from the macromonomer (a) is within the range, adhesion strength of a cured product of the epoxy resin composition is more excellent. In addition, if the content of the constituent unit derived from the macromonomer (a) is equal to or more than the lower limit of the range, compatibility between the copolymer (A) and the epoxy resin (B), process suitability and flexibility of mixing of the epoxy resin composition is more excellent.

The content of the constituent unit derived from the vinyl monomer (b) in the copolymer (A) is preferably 20% by mass to 90% by mass, and more preferably 30% by mass to 80% by mass to a total mass of all constituent units constituting the copolymer (A). If the content of the constituent unit derived from the vinyl monomer (b) is within the range, adhesion strength of a cured product of the epoxy resin composition is more excellent.

<Weight Average Molecular Weight>

A weight average molecular weight (Mw) of the copolymer (A) is preferably 10,000 to 500,000, more preferably 10,000 to 200,000, further more preferably 30,000 to 100,000, and most preferably 30,000 to 80,000. If the weight average molecular weight of the copolymer (A) is equal to or more than the lower limit of the range, adhesion strength is more excellent. If the weight average molecular weight of the copolymer (A) is equal to or less than the lower limit of the range, compatibility between the copolymer (A) and the epoxy resin (B), process suitability, and flexibility of mixing are more excellent.

The weight average molecular weight of the copolymer (A) is a value in terms of standard polystyrene measured by gel permeation chromatography (GPC). Specifically, it is measured by a method described in the examples to be described later.

<Copolymer (A) Manufacturing Method>

As a copolymer (A) manufacturing method, for example, the following manufacturing methods (α), (β) are exemplified. The copolymer (A) may be manufactured by the manufacturing method (α), or may be manufactured by the manufacturing method (β). Here, the copolymer (A) manufacturing method is not limited thereto.

Manufacturing method (α): A method of copolymerizing the macromonomer (a) and the vinyl monomer (b), using a macromonomer having a radical polymerizable group, as the macromonomer (a).

Manufacturing method (β): A method of reacting the macromonomer (a) and a polymer constituted of a constituent unit derived from the vinyl monomer (b) including a vinyl monomer having a functional group capable of reacting with the addition reactive functional group, using a macromonomer having the addition reactive functional group as the macromonomer (a).

In these manufacturing methods, it is possible to adjust compatibility between a polymer chain derived from the macromonomer (a) and a polymer chain constituted of a constituent unit derived from the vinyl monomer (b) by adjusting the number average molecular weight of the macromonomer (a), composition of a monomer constituting the macromonomer (a), composition of the vinyl monomer (b), and the like. For example, as described above, difference in polarity between the macromonomer (a) and the polymer (b0) obtained by polymerizing only the vinyl monomer (b) has in influence on the compatibility. The greater the difference in polarity becomes, compatibility is lowered. The lower the compatibility becomes, there is a tendency that a micro phase separation structure at the time of curing the epoxy resin composition is easily formed.

As each of the macromonomer (a) and the vinyl monomer (b), those manufactured by a known method may be used, or commercially available ones may be used.

Examples of the manufacturing method of the macromonomer (a) having a radical polymerizable group include a manufacturing method using a cobalt chain transfer agent, a method of using an α substituted unsaturated compound such as α-methyl styrene dimer as a chain transfer agent, a method of using an initiator, a method of chemically binding a radical polymerizable group to a polymer, a method due to thermal decomposition, and the like.

Among these, as the manufacturing method of the macromonomer (a) having a radical polymerizable group, a manufacturing method of using a cobalt chain transfer agent is preferable from a viewpoint of decreasing the number of manufacturing steps and increasing the number of chain transfer constants of a catalyst to be used. The macromonomer (a) in the case of manufacturing using a cobalt chain transfer agent has a structure represented by the formula (1).

Examples of the manufacturing method of the macromonomer (a) using a cobalt chain transfer agent include a bulk polymerization method, a solution polymerization method, and an aqueous dispersion polymerization method such as a suspension polymerization method and an emulsion polymerization method. From a viewpoint of simplifying a recovery step, the aqueous dispersion polymerization method is preferable.

Examples of the method of chemically binding a radical polymerizable group to a polymer include a manufacturing method of a halogen group of a polymer having a halogen group by substituting thereof with a compound having a radical polymerizable carbon-carbon double bond, a method of reacting a vinyl monomer having an acid group with a vinyl polymer having an epoxy group, a method of reacting the vinyl polymer having an epoxy group with the vinyl monomer having an acid group, and a method of reacting a diisocyanate compound with a vinyl polymer having a hydroxy group to obtain a vinyl polymer having an isocyanate group, thereby reacting the vinyl polymer having an isocyanate group and a vinyl polymer having a hydroxy group, and manufacturing may be done by any method.

The number average molecular weight of the macromonomer (a) can be adjusted by a polymerization initiator or a chain transfer agent.

Examples of the manufacturing method of the macromonomer (a) having an addition reactive functional group such as hydroxyl group, isocyanate group, epoxy group, carboxyl group, acid anhydride group, amino group, amide group, thiol group, and carbodiimide group include a method of copolymerizing a vinyl monomer having the functional group, a method of using a chain transfer agent such as mercaptoethanol, mercaptoacetic acid, and mercaptopropionic acid, and the like. In addition thereto, there is exemplified a method of using an initiator capable of introducing a functional group such as 2,2'-azobis(propane-2-carboxamidine), 4,4'-azobis(4-cyanovaleric acid), 2,2'-azobis[N-(2-carboxy ethyl)-2-methyl propionamidine], 2,2'-azobis[2-[1-(2-hydroxyethyl)-2-imidazoline-2-yl]propane].

As the manufacturing method of the copolymer (A), the manufacturing method (α) is preferable. That is, the copolymer (A) is preferably a copolymer between the macromonomer (a) and the vinyl monomer (b). In the copolymer, a constituent unit derived from the macromonomer (a) and a constituent unit derived from the vinyl monomer (b) are arranged in random. That is, a polymer chain derived from one or more macromonomers (a) binds to the entire main chain of the copolymer (A). Such a polymerization product can be mixed with the epoxy resin composition and has a tendency that viscosity of the epoxy resin composition is low, compared to a case where a constituent unit derived from the macromonomer (a) binds to only a terminal of a polymer chain constituted of a constituent unit derived from the vinyl monomer (b).

A preferable range of composition of a monomer at the time of manufacturing the copolymer (A), that is, the kind of the monomer to be polymerized and the content (% by mass) (incorporation amount) of each monomer to a total mass of all monomers, is the same as the composition of the copolymer (A), that is, the kind of the constituent unit derived from a monomer constituting the copolymer (A) and the content (% by mass) of the each constituent unit to the total mass of all constituent units.

For example, the content of the macromonomer (a) to the total mass (100% by mass) of all monomers to be polymerized is preferably 10% by mass to 80% by mass, and more preferably 20% by mass to 70% by mass.

Polymerization of a monomer may be performed by a known method using a known polymerization initiator. For example, there is exemplified a method of reacting the macromonomer (a) with the vinyl monomer (b) in the presence of a radical polymerization initiator at a reaction temperature of 60° C. to 120° C. for 1 to 14 hours. At the time of polymerization, a chain transfer agent may be used depending on the necessity.

As a polymerization method, a known polymerization method such as solution polymerization method, suspension polymerization method, bulk polymerization method, and emulsion polymerization method can be applied. From a viewpoint of productivity and coating performance, the solution polymerization method is preferable.

The solution polymerization can be performed by supplying a polymerization solvent, a monomer, and a radical polymerization initiator to the inside of a polymerization container, and maintaining the inside of the container at a predetermined reaction temperature. The total amount of the monomer may be incorporated into the polymerization container in advance (before setting the inside of the polymerization container to a predetermined reaction temperature), the monomer may be supplied by being dropped after setting the inside of the polymerization container to a predetermined reaction temperature, or a portion of the monomer may be incorporated into the polymerization container in advance and the residue may be supplied thereto by being dropped.

[Epoxy Resin (B)]

As the epoxy resin, a known epoxy resin can be used, and if the epoxy resin has at least two epoxy bonds in the molecule, the molecular structure, the molecular weight, and the like are not particularly limited.

Examples thereof include a bisphenol A epoxy resin, a bisphenol F epoxy resin, a bisphenol AD epoxy resin, a bisphenol E epoxy resin, a naphthalene epoxy resin, a bisphenol epoxy resin, a dicyclopentadiene epoxy resin, a phenol novolac epoxy resin, an alicyclic epoxy resin, and a glycidyl amine epoxy resin. In addition, the examples include a modified epoxy resin such as a urethane-modified epoxy resin, a rubber-modified epoxy resin, and a chelate-modified epoxy resin.

Examples of the epoxy resin include a copolymer between a prepolymer of the epoxy resin or the epoxy resin such as polyether-modified epoxy resin and silicone-modified epoxy resin and other polymers, an epoxy resin obtained by substituting a portion of the epoxy resin with a reactive diluent having an epoxy group, and the like.

Examples of the reactive diluent include a monoglycidyl compound such as resorcin glycidyl ether, t-butylphenyl glycidyl ether, 2-ethylhexyl glycidyl ether, aryl glycidyl ether, phenyl glycidyl ether, 3-glycidoxypropyl trimethoxysilane, 3-glycidoxypropyl methyl dimethoxysilane, 1-(3-glycidoxypropyl)-1,1,3,3,3-pentamethyl siloxane, and N-glycidyl-N,N-bis[3-(trimethoxysilane)propyl]amine, a monoalicyclic epoxy compound such as 2-(3,4-epoxycyclohexyl)ethyl trimethoxy silane.

One kind of these epoxy resins may be used alone, or two or more kinds thereof may be used in combination.

[Curing Agent (C)]

A curing agent (C) is an agent curing the epoxy resin (B), and is used for adjusting curing properties and curing physical properties of an epoxy resin composition.

As the curing agent (C), an agent known as a curing agent of an epoxy resin can be used, and examples thereof include an acid anhydride, an amine compound, a phenol compound, a latent curing agent, and the like.

Examples of the acid anhydride include phthalic anhydride, methyl tetrahydrophthalic anhydride, methyl hexahydrophthalic anhydride, hexahydrophthalic anhydride, tetrahydrophthalic anhydride, trialkyl tetrahydrophthalic anhydride, anhydrous methyl himic acid, methyl cyclohexene dicarboxylic acid anhydride, trimellitic anhydride, pyromellitic anhydride, benzophenone tetracarboxylic acid anhydride, ethylene glycol bistrimellitate, glycerol tristrimellitate, dodecenyl succinic acid anhydride, polyazelinic anhydride, and poly(ethyl octadecane diacid)anhydride. Among these, for use requiring weather resistance, light resistance, and heat resistance, methyl hexahydrophthalic anhydride and hexahydrophthalic anhydride are preferable. One kind of these may be used alone, or two or more kinds thereof may be used in combination.

Examples of the amine compound include 2,5(2,6)-bis(amino methyl)bicyclo[2,2,1]heptane, isophorone diamine, ethylene diamine, diethylene triamine, triethylene tetramine, tetraethylene pentaamine, diethyl amino propyl amine, bis(4-amino-3-methyl dicyclohexyl)methane, diamino dicyclohexyl methane, bis(amino methyl)cyclohexane, bis(amino methyl)norbornone, bis(4-amino cyclohexyl)methane, methaphenylene diamine, diamino diphenyl methane, diamino diphenyl sulfone, diamino diethyl diphenyl methane, diethyl toluene diamine, diamino diphenyl sulfone such as 3,3'-diamino diphenyl sulfone (3,3'-DDS) and 4,4'-diamino diphenyl sulfone(4,4'-DDS), diamino diphenyl ether (DADPE), bisaniline, dimethyl aniline, triethylene diamine, dimethyl benzyl amine, 2,4,6-tris(dimethyl amino methyl) phenol, benzyl dimethyl aniline, 3,3'-dichloro-4,4'-diamino diphenyl methane (MOCA), 4,4'-diamino diphenyl methane, 2,4'-diamino diphenyl methane, 3,3'-diamino diphenyl methane, 3,4'-diamino diphenyl methane, 2,2'-diamino biphenyl, 3,3'-diamino biphenyl, 2,4-diamino phenol, 2,5-diamino phenol, o-phenylene diamine, m-phenylene diamine, p-phenylene diamine, m-xylylene diamine, 2,3-trilene diamine, 2,4-trilene diamine, 2,5-trilene diamine, 2,6-trilene diamine, 3,4-trilene diamine, methyl thiotoluene diamine, diethyl toluene diamine, and dicyandiamide. One kind of these may be used alone, or two or more kinds thereof may be used in combination.

Examples of the phenol compound include a phenol novolac resin, a cresol novolac resin, bisphenol A, bisphenol F, bisphenol AD, and derivatives of diallylide of the bisphenols. One kind of these may be used alone, or two or more kinds thereof may be used in combination.

The latent curing agent is a solid at normal temperature, and is a compound that is liquefied and acts as a curing agent at the time of heat curing of the epoxy resin composition.

Examples of the latent curing agent include an organic acid hydrazide such as dicyandiamide, carbohydrazide, dihydrazide oxalate, dihydrazide maleate, dihydrazide succinate, dihydrazide imino diacetate, adipic acid dihydrazide, dihydrazide pimelate, dihydrazide suberate, azelaic dihydrazide, dihydrazide sebacate, dodecane dihydrazide, hexadecane dihydrazide, dihydrazide maleate, dihydrazide fumarate, dihydrazide diglycolate, dihydrazide tartrate, dihydrazide malate, dihydrazide isophthalate, dihydrazide terephthalate, 2,6-naphthoic acid dihydrazide, 4,4'-bisbenzene dihydrazide, 1,4-naphthoic acid dihydrazide, amicure VDH and amicure UDH (all product names, manufactured by Ajinomoto Co., Inc. (registered trademark)), and trihydrazide citrate. One kind of these may be used alone, or two or more kinds thereof may be used in combination.

[Curing Accelerator (D)]

As the curing accelerator (D), a known agent used as a heat-curing catalyst of an epoxy resin can be used, and examples thereof include a urea compound such as 3-(3,4-dicyclophenyl)-1,1-dimethyl urea (DCMU), an imidazole compound such 2-methyl imidazole and 2-ethyl-4-methyl imidazole; adducts of an imidazole compound and an epoxy resin; organophosphorus compounds of triphenyl phosphine and the like; borates of tetraphenyl phosphine tetraphenyl borate and the like; and diazabicycloundecene (DBU). One kind of these may be used alone, or two or more kinds thereof may be used in combination.

[Other Components]

Examples of other components that may be included in the epoxy resin composition include an anti-oxidant; a release agent such as silicone oil, natural wax, and synthetic wax; powders such as glass beads, crystalline silica, fused silica, calcium silicate, and alumina; fibers such as a glass fiber and a carbon fiber; a flame retardant such as an antimony trioxide; a halogen trap agent such as hydrotalcite and rare earth oxides; a coloring agent such as carbon black and Bengara; a silane coupling agent; a defoaming agent, a rheological modifier, a flame retardant, a pigment, and a dye.

[Content Proportion of Each Component]

In the epoxy resin composition, the content of the copolymer (A) is preferably 3 to 50 parts by mass, and more preferably 5 to 30 parts by mass, to 100 parts by mass of the epoxy resin (B). If the content of the copolymer (A) is equal to or more than a lower limit of the range, brittleness of the epoxy resin composition is improved, and adhesion strength is more excellent. If the content of the copolymer (A) is equal to or less than an upper limit of the range, hardness of the epoxy resin composition is not impaired, and adhesion strength is more excellent.

In the epoxy resin composition, the content of the curing agent (C) is appropriately selected depending on the kind of the curing agent (C). For example, in a case where the curing agent (C) is dicyandiamide, the content of the curing agent (C) is preferably 3 to 20 parts by mass, and more preferably 3 to 12 parts by mass, to 100 parts by mass of the epoxy resin (B). If the content of the curing agent (C) is equal to or more than a lower limit of the range, adhesion strength after curing is more excellent. If the content of the curing agent (C) is equal to or less than an upper limit of the range, pot life of the epoxy resin composition is more excellent.

In a case where the epoxy resin composition includes a curing accelerator (D), the content of the curing accelerator (D) is preferably 1 to 20 parts by mass, and more preferably 2 to 10 parts by mass, to 100 parts by mass of the epoxy resin (B). If the content of the curing accelerator (D) is equal to or more than a lower limit of the range, a curing rate is more excellent. If the content of the curing accelerator (D) is equal to or less than an upper limit of the range, adhesion strength is more excellent.

[Epoxy Resin Composition Manufacturing Method]

An epoxy resin composition manufacturing method is not particularly limited to the epoxy resin composition manufacturing method of the present embodiment, and a known method can be used. For example, the copolymer (A), the epoxy resin (B), the curing agent (C), and the curing accelerator (D) and other components depending on the necessity may be simultaneously mixed with one another, or some components (for example, the copolymer (A) and the epoxy resin (B)) may be pre-mixed, and the mixture and remaining components may be mixed with each other. The mixing method is not particularly limited, and a known mixer such as a rotary/revolution mixer, a mixing roll such as a triple roll, and a kneader can be used.

[Operative Effect]

Since the epoxy resin composition of the present embodiment includes the copolymer (A), the epoxy resin (B), and the curing agent (C), the epoxy resin composition has low viscosity compared to a case including a triblock copolymer used in the related art instead of the copolymer (A), and thus process suitability and flexibility of mixing are more excellent. In addition, when the epoxy resin composition of the present embodiment is cured, a cured product excellent in adhesion strength is obtained.

In the epoxy resin composition, in general, the copolymer (A) and the epoxy resin (B) are compatible with each other before curing. When curing the epoxy resin composition, in polymer chains of a polymer chain derived from the macromonomer (a) and a polymer chain constituted of a constituent unit derived from the vinyl monomer (b), it is considered that one (preferably polymer chain derived from macromonomer (a)) remains compatible with the epoxy resin (B), and the other is not compatible and separated to form a phase separation structure. It is considered that a polymer chain portion separated from the epoxy resin (B) imparts toughness to a cured product, and a remaining portion without being separated functions as an anchor and excellent adhesion strength and impact strength are obtained.

(Adhesive)

Since the above effect is exhibited, the epoxy resin composition of the present embodiment is useful as an adhesive.

Examples of the adhesive include a structural adhesive of a vehicle such as an automobile, an adhesive for civil engineering/construction, an adhesive for electronic materials, an adhesive for general affairs, a medical adhesive, an industrial adhesive, and the like. Examples of the adhesive for electronic materials include an interlayer adhesive of a multilayer substrate such as a build-up substrate, a die bonding agent, a semiconductor adhesive such as an underfill, and a packaging adhesive such as a BGA reinforcing underfill, an anisotropic conductive film (ACF), and an anisotropic conductive paste (ACP).

(Molding Material)

Since the epoxy resin composition is excellent in the effect, particularly in the impact strength, the epoxy resin composition of the present embodiment is useful as a modifier of a molding material. Examples of the molding material include a sheet, a film, and FRP, and include a molding material for an aircraft, a molding material for an automobile, a molding material for sports equipment, and a molding material for a windmill.

Here, usage of the epoxy resin composition of the present embodiment is not limited to the above description, and can be used for other usages. For example, the epoxy resin composition of the present embodiment can be used for various usage for which a heat-curing resin such as an epoxy resin is used. Examples of such usage include coating, a coating agent, an insulating material (including print substrate, electric wire coating, and the like), and a sealing agent. Examples of the sealing agent include a capacitor, a transistor, a diode, a light emitting diode, potting such as IC and LSI, dipping, transfer mold sealing, potting sealing such as COB, COF, and TAB of IC and LSIs, an underfill such as a flip chip, and sealing at the time of IC package packaging (including a reinforcing underfill) such as QFP, BGA, and CSP.

(Cured Product)

The cured product of the present embodiment cures the epoxy resin composition of the above-described embodiment.

A method of curing the epoxy resin composition of the present embodiment is not particularly limited, a method of curing an epoxy resin composition employed in the related art can be used, and typically, a heat-curing method is used.

Second Embodiment

[Macromonomer Copolymer]

A macromonomer copolymer in the present embodiment is constituted of a constituent unit derived from a macromonomer (a') and a unit derived from a vinyl monomer (b'). Hereinafter, the macromonomer copolymer according to the present embodiment is referred to as "macromonomer copolymer (A')".

The macromonomer copolymer (A') has a structure of a graft copolymer or block copolymer in which a polymer chain derived from the macromonomer (a') binds to a polymer chain constituted of a constituent unit derived from the vinyl monomer (b').

When mixing the macromonomer copolymer (A') with an epoxy resin, the macromonomer (a') has functions of improving compatibility with an epoxy resin, forming a micro phase separation structure, and enhancing strength of interface between a rubber portion and the epoxy resin in the epoxy resin composition and/or the cured product thereof.

When mixing the macromonomer copolymer (A') with an epoxy resin, the vinyl monomer (b') has functions of performing phase separation from the epoxy resin, forming and dispersing a micro phase separation structure in a rubber shape and the like, and improving toughness and impact resistance of the cured product in the epoxy resin composition and/or the cured product thereof.

The polymer chain derived from the macromonomer (a') and the polymer chain constituted of a constituent unit derived from the vinyl monomer (b') is preferably capable of phase separation (micro phase separation).

In general, composition of a monomer constituting the macromonomer (a') is different from composition of the vinyl monomer (b'). Here, the composition represents the kind and the content proportion of the monomers.

<Macromonomer (a')>

The macromonomer (a') of the present embodiment includes a repeating unit represented by the following general formula (1').

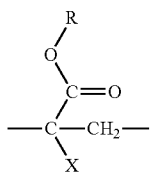

(1')

In the formula, R represents a group having a cyclic ether group. Preferably, R represents a group having a cyclic ether group in a terminal. X represents a hydrogen atom or a methyl group. From a viewpoint of facilitating synthesis, X preferably represents a methyl group.

That is, the macromonomer (a') includes a monomer unit having a group having a cyclic ether group represented by general formula (1'). Hereinafter, this is expressed as "the macromonomer (a') contains a monomer unit having a cyclic ether group".

Since the macromonomer (a') contains a monomer unit having a cyclic ether group, compatibility between the macromonomer (a') unit included in the macromonomer copolymer (A') and the epoxy resin can be enhanced, and can be reacted with a curing agent, similar to the epoxy group of the epoxy resin. From a viewpoint of enhancing compatibility between the epoxy resin and easily reacting with a curing agent, R in the general formula (1') preferably represents a group having a cyclic ether group in the terminal.

If compatibility between the unit derived from the macromonomer (a') included in the macromonomer copolymer (A') and the epoxy resin is enhanced by a predetermined degree or more, a phase separation size of a rubber-like segment (hereinafter, abbreviated to rubber portion) which is a polymer portion constituted of a unit derived from the vinyl monomer (b') of the macromonomer copolymer (A') is reduced, and a micro phase separation structure is obtained. By adjusting compatibility within a range, it is possible to control a micro phase separation structure and it is possible to control properties of the epoxy resin composition or the cured product.

Specifically, the greater the compatibility becomes, a surface area of the rubber portion has a wider phase separation structure, and comes to easily have a micro lamellar structure, a micro linear structure, or a micro co-continuous structure. In addition, at the time of curing, it is possible to improve surface strength between the epoxy resin and the rubber portion and to improve toughness or impact resistance of the cured product by the cyclic ether group reacting with the curing agent along with the epoxy resin.

In the general formula (1'), R represents a group having a cyclic ether group. Preferably, R is an organic group having a cyclic ether group, and as the organic group, an alkyl group, a cycloalkyl group, an aryl group, or a heterocyclic group is preferable. The heterocyclic group having a cyclic ether group may be a cyclic ether group itself, or a heterocyclic group having a cyclic ether structure in a ring.

As the alkyl group, the cycloalkyl group, the aryl group, or the heterocyclic group, the same as described in R and $R^1$ to R" of the general formula (2') to be described later is used. In addition, two or more kinds of the alkyl group, the cycloalkyl group, the aryl group, or the heterocyclic group may be linked to one another. In addition, these may have other substituents within a range not having great influences on the effect of the present invention. As the substituent, the same as that of the general formula (2') to be described above is used.

Preferably, R represents a group having a cyclic ether group in the terminal. This is because it is easy to enhance compatibility between the epoxy resin and to perform reaction with the curing agent.

The cyclic ether group is not particularly limited, and a known cyclic ether group is used. However, from a viewpoint of easily improving compatibility between the macromonomer (a') and the epoxy resin, an oxiranyl group, an oxetanyl group, an oxolanyl group, a dioxolanyl group, a dioxanyl group are preferable. One or more kinds of these can be used by being appropriately selected. Among these, the oxiranyl group, the oxetanyl group, the oxolanyl group are preferable.

Examples of the monomer unit including a group having a cyclic ether group represented by the general formula (1') include glycidyl (meth)acrylate, (3,4-epoxycyclohexyl) methyl (meth)acrylate, β-methylglycidyl (meth)acrylate, (3-ethyloxetane-3-yl)methyl (meth)acrylate, tetrahydrofurfuryl (meth)acrylate, (2-methyl-2-ethyl-1,3-dioxolane-4-yl) (meth)acrylate, (5-ethyl-1,3-dioxane-5-yl)methyl (meth) acrylate, and the like. One or more kinds of these can be used by being appropriately selected. The cyclic ether group may bind to an alkylene group.

Among these, from a viewpoint of easily enhancing compatibility between the macromonomer (a') and the epoxy resin and a preferable glass transition temperature, glycidyl (meth)acrylate, (3,4-epoxycyclohexyl)methyl (meth)acrylate, 3-methylglycidyl (meth)acrylate, (3-ethyl-oxetane-3-yl)methyl (meth)acrylate, tetrahydrofurfuryl (meth)acrylate are preferable, glycidyl (meth)acrylate, (3-ethyloxetane-3-yl)methyl (meth)acrylate, tetrahydrofurfuryl (meth)acrylate are more preferable, and glycidyl (meth)acrylate is further more preferable.

A number average molecular weight (Mn) of the macromonomer (a') is preferably 1,000 or more, more preferably 2,000 or more, and further more preferably 4,000 or more. In addition, the number average molecular weight of the macromonomer (a') is preferably 200,000 or less, more preferably 100,000 or less, and further more preferably 50,000 or less. If the number average molecular weight of the macromonomer (a') is equal to or more a lower limit of the range, compatibility between the macromonomer copolymer (A') and the epoxy resin becomes favorable, a micro phase separation structure is formed in the epoxy resin composition and/or the cured product thereof, and sufficient toughness and adhesion strength is easily obtained. If the number average molecular weight of the macromonomer (a') is equal to or less than the upper limit of the range, since the macromonomer (a') and the vinyl monomer (b') are easily copolymerized, and a polymer constituted of only the vinyl monomer (b') does not occur, the micro phase separation structure is easily controlled and the toughness and adhesion strength of the cured product are improved.

The number average molecular weight and the weight average molecular weight of the macromonomer (a') can be measured by a measurement method of examples to be described later.

The macromonomer (a') contains 10% by mass or more of the repeating unit represented by the general formula (1') in the total mass (100% by mass) of the macromonomer (a'). If the macromonomer (a') is less than 10% by mass, compatibility between the macromonomer copolymer (A') and the epoxy resin is deteriorated, and there is a case where it is not possible to form a macro phase separation structure and obtain sufficient toughness and adhesion strength in the epoxy resin composition and/or the cured product thereof of the present invention. The macromonomer (a') preferably contains 20% by mass or more of the repeating unit represented by the general formula (1'), more preferably contains 25% by mass or more thereof, further more preferably contains 30% by mass or more thereof, and most preferably contains 40% by mass or more thereof.

In the macromonomer (a'), the repeating unit represented by the general formula (1') may be 100% by mass, preferably contains 90% by mass or less, and more preferably contains 80% by mass. By setting the value to be equal to or less than an upper limit, the cyclic ether group hardly causes side reaction with another cyclic ether group or other functional groups in synthesis of the macromonomer (a'), and synthesis is easily performed.

In addition, a unit derived from the macromonomer (a') constituting the macromonomer copolymer (A') is preferably represented by the general formula (2'). That is, the macromonomer (a') preferably has a radical polymerizable unsaturated double bond in an end of poly(meth)acrylate.

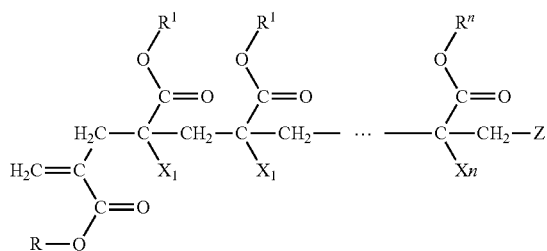

(2')

In the formula, R and $R^1$ to $R''$ each independently represent a hydrogen atom, an alkyl group, a cycloalkyl group, an aryl group, or a heterocyclic group, and at least one of R and $R^1$ to $R''$ represents a group having a cyclic ether group. $X_1$ to $X_n$ each independently represent a hydrogen atom or a methyl group. Z is a terminal group. n is a natural number of 2 to 10,000.

That is, a unit derived from the macromonomer (a') is represented by the general formula (2'), and includes a monomer unit having a group having at least one cyclic ether group. In order not to have an influence on reactivity of the macromonomer, at least one of $R^1$ to $R''$ is preferably a group having a cyclic ether group.

Effect, a preferable structure, and the like of "the group having a cyclic ether group" are the same as described in the above-described general formula (1').

A proportion of a unit having a group having a cyclic ether group in the macromonomer (a') is the same as described in the general formula (1').

[R/$R^1$ to R'']

Hereinafter, R and $R^1$ to $R''$ other than "the group having a cyclic ether group" are described.

In the general formula (2'), R and $R^1$ to $R''$ each independently represent any one of a hydrogen atom, an alkyl group, a cycloalkyl group, an aryl group, or a heterocyclic group.

Examples of the alkyl group include a branched or straight alkyl group having 1 to 20 carbon atoms. Specific examples thereof include a methyl group, an ethyl group, an n-propyl group, an i-propyl group, an n-butyl group, an i-butyl group, a t-butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an icosyl group. Among these, from a viewpoint of easy polymerization and easy acquisition, a methyl group, an ethyl group, an n-propyl group, an i-propyl group, an n-butyl group, a t-butyl group, a pentyl group, a hexyl group, a heptyl group, and an octyl group are preferable, a methyl group, an ethyl group, an n-propyl group, an i-propyl group, an n-butyl group, and a t-butyl group are more preferable, and a methyl group is particularly preferable.

Examples of the cycloalkyl group include a cycloalkyl group having 3 to 20 carbon atoms. Specific examples thereof include a cyclopropyl group, a cyclobutyl group, a cyclopentyl group, a cyclohexyl group, a cycloheptyl group, a cyclooctyl group, a t-butyl cyclohexyl group, an isobornyl group, an adamantyl group, and the like. From a viewpoint of easy polymerization and easy acquisition, a cyclopropyl group, a cyclobutyl group, and an adamantyl group are preferable.

Examples of the aryl group include an aryl group having 6 to 18 carbon atoms. Specific examples thereof include a phenyl group, a benzyl group, a naphthyl group, and the like.

Examples of the heterocyclic group include a heterocyclic group having 5 to 18 carbon atoms. Examples of the hetero atom included in the heterocyclic group include an oxygen atom, a nitrogen atom, a sulfur atom, and the like. Specific examples thereof include an γ-lactone group, an ε-caprolactone group, a morpholine group, a pyrrolidine group, a piperidine group, a thiolan group, and the like.

The alkyl group, the cycloalkyl group, the aryl group, and the heterocyclic group of R and $R^1$ to $R''$ may have a substituent within a range not having a great influence on the effect of the present invention.

Examples of the substituent in R and $R^1$ to $R''$ each independently include an alkyl group, an aryl group, a carboxylic group, an alkoxy carbonyl group (—COOR'), a carbamoyl group (—CONR'R''), a cyano group, a hydroxy group, an amino group, an amide group (—NR'R''), a halogen atom, an allyl group, an epoxy group, an alkoxy group (—OR'), a and a group having hydrophilic properties or ionic properties. R' and R'' each independently represent the same group as R (here, excluding a heterocyclic group).

Examples of the alkoxy carbonyl group as the substituent of R and $R^1$ to $R''$ include a methoxy carbonyl group.

Examples of the carbamoyl group as the substituent of R and $R^1$ to $R''$ include an N-methyl carbamoyl group and an N,N-dimethyl carbamoyl group.

Examples of the halogen atom as the substituent of R and $R^1$ to $R''$ include a fluorine atom, a chlorine atom, a bromine atom, and an iodine atom.

Examples of the alkoxy group as the substituent of R and $R^1$ to $R^a$ can include an alkoxy group having 1 to 12 carbon atoms, and specific examples thereof can include a methoxy group.

Examples of the group having hydrophilic properties and ionic properties as the substituent of R and $R^1$ to $R''$ can include an alkali salt of the carboxy group or an alkali salt of the sulfoxyl group, a poly(alkylene oxide) group such as a polyethylene oxide group and a polypropylene oxide group, and a cationic substituent such as quaternary ammonium salt group.

R and $R^1$ to $R''$ are preferably at least one selected from a alkyl group and a cycloalkyl group, and an alkyl group is more preferable. This is from a viewpoint of compatibility with the epoxy resin, the glass transition temperature of the macromonomer (a'), and easy availability of a monomer.

$X_1$ to $X_n$ each independently represent a hydrogen atom or a methyl group, and a methyl group is preferable. In the macromonomer (a'), from a viewpoint of easy synthesis, more than half of $X_1$ to $X_n$ is preferably a methyl group.

The glass transition temperature (Tga") of the macromonomer (a') is preferably 0° C. or more, more preferably 10° C. or more, and further more preferably 30° C. or more. In addition, the glass transition temperature thereof is preferably 150° C. or less, more preferably 120° C. or less, and further more preferably 100° C. or less. If the glass transition temperature is equal to or more than a lower limit of the range, adhesion strength is more excellent. If the glass transition temperature is equal to or less than an upper limit of the range, it is possible to further reduce the viscosity of the epoxy resin composition. The glass transition temperature can be measured by differential scanning calorimetry (DSC).

The glass transition temperature can be adjusted by composition of a monomer forming the macromonomer (a') and the like.

<Raw Material Monomer of Macromonomer (a')>

As a monomer for obtaining the macromonomer (a') (raw material monomer), a monomer having a cyclic ether group and a monomer other than the monomer are used.

As the monomer having a cyclic ether group, those kinds as described above are used, but preferable examples include the following ones. Examples thereof include glycidyl (meth)acrylate, (3,4-epoxycyclohexyl)methyl (meth)acrylate, (i-methylglycidyl (meth)acrylate, (3-ethyloxetane-3-yl) methyl (meth)acrylate, tetrahydrofurfuryl (meth)acrylate, (2-methyl-2-ethyl-1,3-dioxolane-4-yl) (meth)acrylate, and (5-ethyl-1,3-dioxane-5-yl)methyl (meth)acrylate. One or more kinds of these can be used by appropriately being selected.

Among these, from a viewpoint of easily improving compatibility between the macromonomer (a') and the epoxy resin, glycidyl (meth)acrylate, (3,4-epoxycyclohexyl) methyl (meth)acrylate, β-methylglycidyl (meth)acrylate, (3-ethyloxetane-3-yl)methyl (meth)acrylate, tetrahydrofurfuryl (meth)acrylate are preferable, glycidyl (meth)acrylate, (3,4-epoxycyclohexyl)methyl (meth)acrylate, (3-ethyloxetane-3-yl)methyl (meth)acrylate, tetrahydrofurfuryl (meth) acrylate are more preferable, and glycidyl (meth)acrylate is further more preferable.

As the monomer other than the monomer having a cyclic ether group, various kinds of (meth)acrylic monomer may be used, but the following ones are exemplified, for example.

Hydrocarbon group-containing (meth)acrylate ester such as methyl (meth)acrylate, ethyl (meth)acrylate, n-propyl (meth)acrylate, isopropyl (meth)acrylate, n-butyl (meth) acrylate, isobutyl (meth)acrylate, t-butyl (meth)acrylate, isoamyl (meth)acrylate, hexyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, lauryl (meth)acrylate, hexadecyl (meth)acrylate, stearyl (meth)acrylate, isostearyl (meth)acrylate, phenyl (meth)acrylate, benzyl (meth)acrylate, cyclohexyl (meth)acrylate, tetrahydrofurfuryl (meth)acrylate, isobornyl (meth)acrylate, 3,5,5-trimethylcyclohexyl (meth)acrylate, dicyclopentanyl (meth)acrylate, dicyclopentenyl (meth)acrylate, dicyclopentanyloxyethyl (meth)acrylate, terpene acrylate or derivatives thereof, hydrogenated rosin acrylate or derivatives thereof, and docosyl (meth)acrylate;

hydroxyl group-containing (meth)acrylate ester such as 2-hydroxyethyl (meth)acrylate, 2-hydroxypropyl (meth)acrylate, 2-hydroxybutyl (meth)acrylate, 3-hydroxybutyl (meth)acrylate, 4-hydroxybutyl (meth) acrylate, and glycerol (meth)acrylate;

carboxyl group-containing vinyl monomer such as (meth) acrylic acid, 2-(meth)acryloyloxyethyl hexahydrophthalic acid, 2-(meth)acryloyloxypropyl hexahydrophthalic acid, 2-(meth)acryloyloxyethyl phthalic acid, 2-(meth)acryloyloxypropyl phthalic acid, 2-(meth) acryloyloxyethyl maleic acid, 2-(meth)acryloyloxypropyl maleic acid, 2-(meth)acryloyloxyethyl succinic acid, 2-(meth)acryoyloxypropyl succinic acid, crotonic acid, fumaric acid, maleic acid, itaconic acid, citraconic acid, monomethyl maleate, monoethyl maleate, monooctyl maleate, monomethyl itaconate, monoethyl itaconate, monobutyl itaconate, monooctyl itaconate, monomethyl fumarate, monoethyl fumarate, monobutyl fumarate, monooctyl fumarate, and monomethyl citraconate;

acid anhydride group-containing vinyl monomer such as maleic anhydride and itaconic anhydride;

unsaturated dicarboxylic acid diester monomer such as dimethyl malate, dibutyl malate, dimethyl fumarate, dibutyl fumarate, dibutyl itaconate, and diperfluorocyclohexyl fumarate;

amino group-containing (meth) acrylic acid ester vinyl monomer such as dimethyl aminoethyl (meth)acrylate and diethylaminoethyl (meth)acrylate;

functional vinyl monomer such as ethyleneglycol di(meth)acrylate, 1,3-butyleneglycol di(meth)acrylate, 1,4-butanediol di(meth)acrylate, 1,6-hexanediol di(meth) acrylate, diethyleneglycol di(meth)acrylate, triethyleneglycol di(meth)acrylate, tetraethyleneglycol di(meth)acrylate, polyethyleneglycol di(meth)acrylate, tripropyleneglycol di(meth)acrylate, neopentylglycol di(meth)acrylate, 1,9-nonanediol di(meth)acrylate, 1,10-decanediol di(meth)acrylate, trimethylolpropane (meth)acrylate, pentaerythritol tetra(meth)acrylate, dipentaerythritol hexa(meth)acrylate, allyl (meth)acrylate, diallyl maleate, and the like;

glycol ester monomer such as polyethyleneglycol (meth) acrylate, polypropyleneglycol (meth)acrylate, methoxyethyl (meth)acrylate, ethoxyethyl (meth)acrylate, n-butoxyethyl (meth)acrylate, isobutoxyethyl (meth)acrylate, t-butoxyethyl (meth)acrylate, ethoxyethoxyethyl (meth)acrylate, phenoxyethyl (meth)acrylate, nonylphenoxyethyl (meth)acrylate, 3-methoxybutyl (meth)acrylate, acetoxyethyl (meth)acrylate, "Plexel FM" (caprolactone-added monomer manufactured by Daicel Chemical Industries, Ltd., product name), "Blemmer PME-100" methoxy polyethylene glycol methacrylate (of which ethylene glycol chain is 2) manufactured by Nof Corporation, product name), "Blemmer PME-200 (methoxy polyethylene glycol methacrylate (of which ethylene glycol chain is 4) manufactured by Nof Corporation, product name), "Blemmer PME-400" (methoxy polyethylene glycol methacrylate (of which ethylene glycol chain is 9) manufactured by Nof Corporation, product name), "Blemmer 50POEP-800B" (octoxy polyethylene glycol-polypropylene glycol-methacrylate (of which ethylene glycol chain is 8, and propylene glycol chain is 6) manufactured by Nof Corporation, product name), "Blemmer 20ANEP-600" (nonyl phenoxy (ethylene glycol polypropylene glycol) monoacrylate manufactured by Nof Corporation, product name), "Blemmer AME-100" (manufactured by Nof Corporation, product name), "Blemmer AME-200" (manufactured by Nof Corporation, product name), and "Blemmer 50AOEP-800B" (manufactured by Nof Corporation, product name).

silane coupling agent-containing monomer such as 3-(meth)acryloxypropyl trimethoxysilane, 3-(meth)acryloxypropyl methyl diethoxysilane, 3-(meth)acryloxypropyl triethoxysilane, 3-acryloxypropyl trimethoxysilane;

organosilyl group-containing monomer other than a monomer containing a silane coupling agent such as trimethylsilyl (meth)acrylate, triethylsilyl (meth)acrylate, tri-n-propylsilyl (meth)acrylate, tri-n-butylsilyl (meth)acrylate, tri-n-amylsilyl (meth)acrylate, tri-n-hexylsilyl (meth)acrylate, tri-n-octylsilyl (meth)acrylate, tri-n-dodecylsilyl (meth)acrylate, triphenylsilyl (meth)acrylate, tri-p-methylphenylsilyl (meth)acrylate, tribenzylsilyl (meth)acrylate, triisopropylsilyl (meth)acrylate, triisobutylsilyl (meth)acrylate, tri-s-butylsilyl (meth)acrylate, tri-2-methylisopropylsilyl (meth)acrylate, tri-t-butylsilyl (meth)acrylate, ethyldimethylsilyl (meth)acrylate, n-butyldimethylsilyl (meth)acrylate, diisopropyl-n-butylsilyl (meth)acrylate, n-octyl-di-n-butylsilyl (meth)acrylate, diisopropylstearylsilyl (meth)acrylate, dicyclohexylphenylsilyl (meth)acrylate, t-butyldiphenylsilyl (meth)acrylate, lauryldiphenylsilyl (meth)acrylate;

isocyanate group-containing monomer such as 2-isocyanateethyl (meth)acrylate;

halogen-containing monomer such as 2,2,2-trifluoroethyl (meth)acrylate, 2,2,3,3,3-pentafluorophenyl (meth)acrylate, 2-(perfluorobutyl) (meth)acrylate, 3-(perfluorobutyl)-2-hydroxy propyl (meth)acrylate, 2-(perfluorohexyl)ethyl (meth)acrylate, 3-perfluorohexyl-2-hydroxypropyl (meth)acrylate, 3-(perfluoro-3-methylbutyl)-2-hydroxypropyl (meth)acrylate, 2,2,3,3-tetrafluoropropyl (meth)acrylate, 1H,1H,5H-octafluoropentyl (meth)acrylate, 1H,1H,5H-octafluoropentyl (meth)acrylate, 1H,1H,2H,2H-tridecafluorooctyl (meth)acrylate, 1H-1-(trifluoromethyl)trifluoroethyl (meth)acrylate, 1H,1H,3H-hexafluorobutyl (meth)acrylate, and 1,2,2,2-tetrafluoro-1-(trifluoromethyl)ethyl (meth)acrylate;

monomer having an acetal structure such as 1-butoxyethyl (meth)acrylate, 1-(2-ethylhexyloxy)ethyl (meth)acrylate, 1-(cyclohexyloxy)ethylmethacrylate), and 2-tetrahydropyranyl (meth)acrylate; and other vinyl monomers such as 4-(meth)acryloyloxy benzophenone, styrene, α-methyl styrene, vinyl toluene, (meth)acrylonitrile, (meth)acrylamide, N-vinyl pyrrolidone, vinyl benzene, triallyl cyanurate, vinyl pyrrolidine, vinyl trimethoxy silane, vinyl chloride, vinylidene chloride, vinyl fluoride, vinylidene fluoride, vinyl acetate, and vinyl propionate.

One kind of these may be used alone, or two or more kinds thereof may be used in combination.

Among these, from a viewpoint of compatibility between the epoxy resin, setting the glass transition temperature of the macromonomer (a') to be in an appropriate range, and easy availability of a monomer, a (meth)acrylic monomer is preferable, and a methacrylic monomer is more preferable. Methacrylate (methacrylic acid ester) that may have a substituent is particularly preferable.

Specifically, methyl methacrylate, n-butyl methacrylate, lauryl methacrylate, dodecyl methacrylate, stearyl methacrylate, 2-ethyl hexyl methacrylate, 2-hydroxy ethyl methacrylate, and 4-hydroxy butyl methacrylate are preferable, and methyl methacrylate, n-butyl methacrylate, and 2-ethyl hexyl methacrylate are more preferable.

The content of methacrylate (methacrylate that may have a substituent) of the sum of a raw material monomer for obtaining the macromonomer (a') is not particularly limited, from a viewpoint of compatibility between the epoxy resin, glass transition temperature of the macromonomer (a'), and easiness of polymerization reaction for obtaining the macromonomer (a'), the content of methacrylate is preferably 50% by mass or more, more preferably 60% by mass or more, and further more preferably 80% by mass or more. The content of methacrylate may be 100% by mass.

The amount of the methacrylate unit in all units of the macromonomer (a') is also the same.

<Vinyl Monomer (b')>

The vinyl monomer (b') is a monomer having an ethylenic unsaturated bond and different from the macromonomer (a'). The vinyl monomer (b') is not particularly limited, but it is possible to use the same as the raw material monomer of the macromonomer (a'). One kind of the vinyl monomer (b') may be used alone, or two or more kinds thereof may be used in combination.

At least a portion of the vinyl monomer (b') is preferably a (meth)acrylic monomer.

In a case where the macromonomer (a') is added to a polymer constituted of a constituent unit derived from the vinyl monomer (b'), it is appropriate that the vinyl monomer (b') includes those having a functional group capable of reacting with a functional group of the macromonomer (a').

The vinyl monomer (b') preferably includes alkyl (meth)acrylate having a non-substituted alkyl group having 1 to 30 carbon atoms. The number of carbon atoms of alkyl (meth)acrylate is preferably 2 to 30, and more preferably 4 to 20. With the vinyl monomer (b'), it is possible to impart excellent toughness to a cured product of the epoxy resin composition and to express excellent adhesion strength.

Specific examples of alkyl (meth)acrylate having an alkyl group having 1 to 30 carbon atoms include non-substituted methyl (meth)acrylate, ethyl (meth)acrylate, n-propyl (meth)acrylate, n-butyl (meth)acrylate, 2-ethylhexyl (meth)acrylate, n-octyl (meth)acrylate, isooctyl (meth)acrylate, nonyl (meth)acrylate, isononyl (meth)acrylate, decyl (meth)acrylate, isodecyl (meth)acrylate, lauryl (meth)acrylate, hexadecyl (meth)acrylate, stearyl (meth)acrylate, isostearyl (meth)acrylate, and behenyl (meth)acrylate.

The vinyl monomer (b') may further include other vinyl monomers than alkyl (meth)acrylate having a non-substituted alkyl group having 1 to 30 carbon atoms depending on the necessity. The other vinyl monomers can be appropriately selected from the monomers exemplified as a monomer other than the monomer a cyclic ether group. Preferable examples of the other vinyl monomers include (meth)acrylic acid, hydroxy ethyl (meth)acrylate, hydroxy propyl (meth) acrylate, styrene, isobornyl (meth)acrylate, cyclohexyl (meth)acrylate, benzene(meth)acrylate, tetrahydrofurfuryl (meth)acrylate, glycidyl (meth)acrylate, (meth)acrylamide, dimethyl (meth)acrylamide, and diethyl (meth)acrylamide.

As described above, composition of the vinyl monomer (b') in the macromonomer copolymer (A') is different from composition of a monomer constituting the macromonomer (a').

The vinyl monomer (b') preferably has composition in which difference in polarity between the polymer obtained by polymerizing only the vinyl monomer (b') (hereinafter, referred to as "polymer (b")") and the macromonomer (a') occurs. If there is difference in polarity between the polymer (b") and the macromonomer (a'), when curing a composition, it is easy to perform micro phase separation of a polymer chain of the macromonomer (a') and a polymer chain formed from the polymer (b") and to obtain a cured product having excellent adhesion strength.

In a case where those compatible with the epoxy resin and the cured product thereof are used as the macromonomer (a'), composition of the vinyl monomer (b') is preferably composition in which the polymer (b") has lower polarity than the macromonomer (a').

An example of composition in which there is difference in polarity includes an example in which the macromonomer (a') includes a constituent unit derived from methyl methacrylate and the vinyl monomer (b') includes a vinyl monomer having two or more carbon atoms of alkyl (meth) acrylate. In this case, the number of carbon atoms of the alkyl group is greater than that of the methyl group, the alkyl group has low polarity compared to methyl methacrylate. By setting such composition, difference in polarity between the polymer (b") and the macromonomer (a') occurs, and the polymer (b") has lower polarity than the macromonomer (a').

In this example, a proportion of the constituent unit derived from methyl methacrylate constituting the macromonomer (a') is preferably 20% by mass or more, and more preferably 50% by mass or more, to the total mass of the macromonomer. Here, the proportion of the constituent unit is 90% by mass or less, and preferably 80% by mass or less.

In addition, a proportion of alkyl (meth)acrylate having a non-substituted alkyl group having 1 to 30 carbon atoms to the total mass of the vinyl monomer (b') is preferably 30% by mass or more, and more preferably 40% by mass or more. The greater the proportion of alkyl (meth)acrylate having a non-substituted alkyl group having 1 to 30 carbon atoms in the vinyl monomer (b') becomes, difference in polarity between the polymer (b") and the macromonomer (a') becomes great, and micro phase separation easily occurs at the time of curing the epoxy resin composition.

In addition, from a viewpoint of increasing difference of polarity, the content of the vinyl monomer having a polar functional group such as a carboxyl group, a hydroxy group, an amide group, an amino group, and an epoxy group in the polymer (b") is preferably 30% by mass or less, more preferably 10% by mass or less, and further more preferably 5% by mass or less, to the total amount of the vinyl monomer (b). The lower limit is not limited, and may be 0% by mass.

In the present embodiment, in the vinyl monomer (b'), a glass transition temperature (Tgb") of the polymer (b") constituted of only the vinyl monomer (b') is 25° C. or less. If the glass transition temperature is more than 25° C., flexibility of the vinyl monomer (b') polymer block is low, and toughness or adhesion strength of the epoxy resin composition mixed with the macromonomer copolymer (A') and/or the cured product becomes insufficient. The upper limit of Tgb" is preferably 15° C. or less, preferably −5° C. or less, preferably −15° C. or less, more preferably −30° C. or less, and further more preferably −50° C. or less. By setting Tgb" to be equal to or less than the upper limit, flexibility of the vinyl monomer (b') polymer block is increased, and toughness and adhesion strength of the cured product of the epoxy resin composition is more excellent. The lower limit of Tgb" is not particularly limited, but is preferably −100° C. or more, more preferably −90° C. or more, further more preferably −75° C. or more, and particularly preferably −60° C. or more.

Here, in a case where there is one kind of the vinyl monomer (b'), Tgb" is a glass transition temperature of a homopolymer of the vinyl monomer, and it is possible to use the value described in Polymer Handbook and the like. In a case where there is a plurality of the vinyl monomers (b'), Tgb" means a value calculated by a calculation formula of Fox from the glass transition temperature and the mass fraction of each homopolymer of the plurality of vinyl monomers.

The Fox calculation formula is a calculation value obtained by the following formula, and can be obtained by using a value described in Polymer Handbook [Polymer HandBook 4$^{th}$ Edition, J. Brandrup, Interscience, 1998] (Tg in the formula corresponds to Tgb" of the vinyl monomer (b')).

$$1/(273+Tg)=\Sigma(Wi/(273+Tgi))$$

(In the formula, Wi represents a mass fraction of monomer i, and $Tg_i$ represents a glass transition temperature (° C.) of homopolymer of each monomer i.)

The glass transition temperature of a polymer chain derived from the above-described macromonomer (a') (Tga") and the glass transition temperature of a polymer chain derived from the vinyl monomer (b') (Tgb") preferably have a relationship of Tga">Tgb" in order to sufficiently express properties of each polymer chain. That is, Tga"−Tgb">0° C. is preferable. Tga"−Tgb">50° C. is more preferable, and Tga"−Tgb">80° C. is further more preferable.

<Content of Each Constituent Unit>

The content of a unit derived from the macromonomer (a') in the macromonomer copolymer (A') is preferably 10% by mass or more, more preferably 20% by mass or more, and further more preferably 25% by mass or more, to the total mass of the macromonomer copolymer (A'). In addition, the content of a unit derived from the macromonomer (a') in the macromonomer copolymer (A') is preferably 90% by mass or less, more preferably 80% by mass or less, and further more preferably 60% by mass.

The macromonomer (a') has a function of being compatible with the epoxy resin in the epoxy resin composition and/or the cured product of the present embodiment. By setting the content of the unit derived from the macromonomer (a') in the macromonomer copolymer (A') to be equal to or more than a lower limit of the range, compatibility between the macromonomer copolymer (A') and the epoxy resin becomes favorable, not a macro phase separation structure but an appropriate micro phase separation structure is formed in the epoxy resin composition and/or the cured product thereof, and sufficient toughness and adhesion strength is easily obtained. In addition, by setting the content of the unit derived from the macromonomer (a') in the macromonomer copolymer (A') to be equal to or less than an upper limit of the range, a macromonomer copolymer (A') is prevented from being excessively compatible, an appropriate micro phase separation structure is formed, and high toughness and adhesive strength are easily obtained in the epoxy resin composition and/or the cured product thereof.

<Weight Average Molecular Weight>

A weight average molecular weight (Mw) of the macromonomer copolymer (A') is preferably 10,000 to 1,000,000, more preferably 20,000 to 900,000, further more preferably 30,000 to 800,000, and most preferably 40,000 to 700,000. If the weight average molecular weight of the macromonomer copolymer (A') is equal to or more than the lower limit of the range, the macromonomer copolymer (A') appropriately forms a micro phase separation structure, and toughness and adhesion strength are easily obtained in the epoxy resin composition and/or the cured product thereof. If the weight average molecular weight of the macromonomer copolymer (A') is equal to or less than the upper limit of the range, compatibility between the macromonomer copolymer (A') and the epoxy resin is deteriorated, and it is possible to form a micro phase separation structure, not a macro phase separation, and to obtain sufficient toughness and adhesion strength in the epoxy resin composition and/or the cured product thereof.

The number average molecular weight or the weight average molecular weight of the macromonomer copolymer (A') is a value measured by gel permeation chromatography (GPC) in terms of standard methyl polymethacrylate. Specifically, the value is measured by a method described in examples to be described later.

<Macromonomer Copolymer (A') Manufacturing Method>

The macromonomer copolymer (A') manufacturing method is not particularly limited, and examples thereof include manufacturing methods ($\alpha$), ($\beta$). The macromonomer copolymer (A') may be manufactured by the manufacturing method ($\alpha$), or may be manufactured by the manufacturing method ($\beta$). Here, the macromonomer copolymer (A') manufacturing method is not limited thereto.

Manufacturing method ($\alpha$): A method of copolymerizing a macromonomer and a vinyl monomer using the macromonomer having a radical polymerizable group as a macromonomer.

Manufacturing method ($\beta$): A method of reacting a macromonomer and a polymer including a constituent unit derived from a vinyl monomer having a functional group capable of reacting with the functional group, using a macromonomer having an addition reactive functional group as the macromonomer.

In these manufacturing methods, by adjusting the molecular weight of a macromonomer, composition of a monomer constituting the macromonomer, composition of a vinyl monomer, and the like, it is possible to adjust compatibility between a polymer chain derived from the macromonomer and a polymer chain constituted of a constituent unit derived from the vinyl monomer. For example, as described above, difference in polarity of both polymer chains has influence on the compatibility, and the greater the difference in polarity becomes, compatibility is lowered. The lower the compatibility becomes, there is a tendency that a micro phase separation structure is easily formed at the time of curing the epoxy resin composition.

As each of the macromonomer and the vinyl monomer, those manufactured by a known method may be used, and commercially available ones may be used.

As a manufacturing method of a macromonomer having a radical polymerizable group, for example, a manufacturing method using a cobalt chain transfer agent, a method of using an $\alpha$ substituted unsaturated compound such as $\alpha$-methyl styrene dimer as a chain transfer agent, a method of using a polymerization initiator, a method of chemically binding a radical polymerizable group to a polymer, a method due to thermal decomposition, and the like.

Among these, as the manufacturing method of the macromonomer having a radical polymerizable group, a manufacturing method of using a cobalt chain transfer agent is preferable from a viewpoint of decreasing the number of manufacturing steps and increasing the number of chain transfer constants of a catalyst to be used. The macromonomer in a case of being manufactured by using a cobalt chain transfer agent has a structure (macromonomer (a')) represented by the general formula (2').

As the Examples of the manufacturing method of the macromonomer using a cobalt chain transfer agent include a bulk polymerization method, a solution polymerization method, and an aqueous dispersion polymerization method such as a suspension polymerization method and an emulsion polymerization method. From a viewpoint of simplifying a recovery step, the aqueous dispersion polymerization method is preferable.

Examples of the method of chemically binding a radical polymerizable group to a polymer include a manufacturing method of a halogen group of a polymer having a halogen group by substituting thereof with a compound having a radical polymerizable carbon-carbon double bond, a method of reacting a vinyl monomer having an acid group with a vinyl polymer having an epoxy group, a method of reacting the vinyl polymer having an epoxy group with the vinyl monomer having an acid group, and a method of reacting a diisocyanate compound with a vinyl polymer having a hydroxy group to obtain a vinyl polymer having an isocyanate group, thereby reacting the vinyl polymer having an isocyanate group and a vinyl polymer having a hydroxy group, and manufacturing may be done by any method.

The molecular weight of the macromonomer can be adjusted by a polymerization initiator, a chain transfer agent, or the like.

Examples of a manufacturing method of a macromonomer having an addition reactive functional group such as a hydroxyl group, an isocyanate group, an epoxy group, a carboxyl group, an acid anhydride group, an amino group, an amide group, a thiol group, and a carbodiimide group include a method of copolymerizing a vinyl monomer having the functional group, a method of using a chain transfer agent such as mercapto ethanol, mercapto acetate, and mercapto propionic acid, or the like, for example. In addition thereto, there is exemplified a method of using a polymerization initiator capable of introducing a functional group such as 2,2'-azobis(propane-2-carboxamidine), 4,4'-azobis(4-cyanovaleric acid), 2,2'-azobis[N-(2-carboxy ethyl)-2-methyl propionamidine], 2,2'-azobis[2-[1-(2-hydroxyethyl)-2-imidazoline-2-yl]propane].

As the manufacturing method of the macromonomer copolymer (A'), the manufacturing method ($\alpha$) is preferable. That is, the macromonomer copolymer (A') is preferably a copolymer obtained by copolymerizing a macromonomer having a radical polymerizable group and a vinyl monomer. In the copolymer, a constituent unit derived from the macromonomer and a constituent unit derived from the vinyl monomer are arranged in random. That is, a polymer chain derived from one or more macromonomers binds to the entire main chain of the macromonomer copolymer (A'). In general, the copolymer has a structure in which a polymer chain derived from a plurality of macromonomers binds to the main chain. In the copolymer, there is a tendency that viscosity of the composition is low when being mixed with an epoxy resin composition, compared to a case where a constituent unit derived from a macromonomer binds to only a terminal of the polymer chain constituted of a constituent unit derived from a vinyl monomer, for example, and thus is preferable.

A preferable range of composition of a monomer at the time of manufacturing the macromonomer copolymer (A'), that is, the kind of the monomer to be polymerized and the content (% by mass) (incorporation amount) of each monomer to a total mass of all monomers, is the same as the composition of the macromonomer copolymer (A'), that is, the kind of the constituent unit derived from a monomer constituting the macromonomer copolymer (A') and the content (% by mass) of the each constituent unit to the total mass of all constituent units.

Polymerization of the monomer may be performed by a known method using a known polymerization initiator. For example, there is exemplified a method of reacting the macromonomer (a') with the vinyl monomer (b') in the presence of a radical polymerization initiator at a reaction temperature of 60° C. to 120° C. for 1 to 14 hours. At the time of polymerization, a chain transfer agent may be used depending on the necessity.

As a polymerization method, a known polymerization method such as solution polymerization method, suspension polymerization method, bulk polymerization method, and emulsion polymerization method can be applied. From a viewpoint of productivity and coating performance, the solution polymerization method is preferable.

The solution polymerization can be performed by supplying a polymerization solvent, monomers, and a radical polymerization initiator to the inside of a polymerization container, and maintaining the inside of the container at a predetermined reaction temperature. The total amount of the monomers may be incorporated into the polymerization container in advance (before setting the inside of the polymerization container to a predetermined reaction temperature), the monomer may be supplied by being dropped after setting the inside of the polymerization container to a predetermined reaction temperature, or a portion of the monomer may be incorporated into the polymerization container in advance and the residue may be supplied thereto by being dropped.

[Epoxy Resin]

As the epoxy resin, a known epoxy resin can be used, and if the epoxy resin has at least two epoxy bonds in the molecule, the molecular structure, the molecular weight, and the like are not particularly limited.

Examples thereof include a bisphenol A epoxy resin, a bisphenol F epoxy resin, a bisphenol AD epoxy resin, a bisphenol E epoxy resin, a naphthalene epoxy resin, a biphenol epoxy resin, a dicyclopentadiene epoxy resin, a phenol novolac epoxy resin, an alicyclic epoxy resin, and a glycidyl amine epoxy resin.

Examples of the epoxy resin include a copolymer between a prepolymer of the epoxy resin or the epoxy resin such as polyether-modified epoxy resin and silicone-modified epoxy resin and other polymers, an epoxy resin obtained by substituting a portion of the epoxy resin with a reactive diluent having an epoxy group, and the like.

Examples of the reactive diluent include a monoglycidyl compound such as resorcin glycidyl ether, t-butyl phenyl glycidyl ether, 2-ethyl hexyl glycidyl ether, allyl glycidyl ether, phenyl glycidyl ether, 3-glycidoxy propyl trimethoxy silane, 3-glycidoxy propyl methyl dimethoxy silane, 1-(3-glycidoxy propyl)-1,1,3,3,3-pentamethyl siloxane, and N-glycidyl-N,N-bis[3-(trimethoxy silane)propyl]amine, a monoalicyclic epoxy compound such as 2-(3,4)-epoxy cyclohexyl)ethyl trimethoxy silane. One kind of these epoxy resins may be used alone, or two or more kinds thereof may be used in combination.

As the epoxy resin, an epoxy resin not having a (meth) acrylic acid ester skeleton is preferable. This is because it does not increase compatibility with the macromonomer copolymer (A') too much.

[Curing Agent]

A curing agent is obtained by curing the epoxy resin, and is used for adjusting curing properties and curing physical properties of an epoxy resin composition.

As the curing agent, an agent known as a curing agent of an epoxy resin can be used, and examples thereof include an anhydride, an amine compound, a phenol compound, a latent curing agent, and the like.

Examples of the anhydride include phthalic anhydride, methyl tetrahydrophthalic anhydride, methyl hexahydrophthalic anhydride, hexahydrophthalic anhydride, tetrahydrophthalic anhydride, trialkyl tetrahydrophthalic anhydride, anhydrous methyl himic acid, methyl cyclohexene dicarboxylic acid anhydride, trimellitic anhydride, pyromellitic anhydride, benzophenone tetracarboxylic acid anhydride, ethylene glycol bistrimellitate, glycerol tristrimellitate, dodecenyl succinic acid anhydride, polyazelinic anhydride, and poly(ethyl octadecane diacid)anhydride. Among these, for use requiring weather resistance, light resistance, and heat resistance, methyl hexahydrophthalic anhydride and hexahydrophthalic anhydride are preferable. One kind of these may be used alone, or two or more kinds thereof may be used in combination.

Examples of the amine compound include 2,5(2,6)-bis (amino methyl)bicyclo[2,2,1]heptane, isophorone diamine, ethylene diamine, diethylene triamine, triethylene tetramine, tetraethylene pentaamine, diethyl amino propyl amine, bis (4-amino-3-methyl dicyclohexyl)methane, diamino dicyclohexyl methane, bis(amino methyl)cyclohexane, bis(amino methyl)norbornone, bis(4-amino cyclohexyl)methane, methaphenylene diamine, diamino diphenyl methane, diamino diphenyl sulfone, diamino diethyl diphenyl methane, diethyl toluene diamine, diamino diphenyl sulfone such as 3,3'-diamino diphenyl sulfone (3,3'-DDS) and 4,4'-diamino diphenyl sulfone(4,4'-DDS), diamino diphenyl ether (DADPE), bisaniline, dimethyl aniline, triethylene diamine, dimethyl benzyl amine, 2,4,6-tris(dimethyl amino methyl) phenol, benzyl dimethyl aniline, 3,3'-dichloro-4,4'-diamino diphenyl methane (MOCA), 4,4'-diamino diphenyl methane, 2,4'-diamino diphenyl methane, 3,3'-diamino diphenyl methane, 3,4'-diamino diphenyl methane, 2,2'-diamino biphenyl, 3,3'-diamino biphenyl, 2,4-diamino phenol, 2,5-diamino phenol, o-phenylene diamine, m-phenylene diamine, p-phenylene diamine, m-xylylene diamine, 2,3-trilene diamine, 2,4-trilene diamine, 2,5-trilene diamine, 2,6-trilene diamine, 3,4-trilene diamine, methyl thiotoluene diamine, diethyl toluene diamine, and dicyandiamide. One kind of these may be used alone, or two or more kinds thereof may be used in combination.

Examples of the phenol compound include a phenol novolac resin, a cresol novolac resin, bisphenol A, bisphenol F, bisphenol AD, and derivatives of diallylide of the bisphenols. One kind of these may be used alone, or two or more kinds thereof may be used in combination.

The latent curing agent is a solid at normal temperature, and is a compound that is liquefied and acts as a curing agent at the time of heat curing of the epoxy resin composition.

Examples of the latent curing agent include an organic acid hydrazide such as dicyandiamide, carbohydrazide, dihydrazide oxalate, dihydrazide maleate, dihydrazide succinate, dihydrazide imino diacetate, adipic acid dihydrazide, dihydrazide pimelate, dihydrazide suberate, azelaic dihydrazide, dihydrazide sebacate, dodecane dihydrazide, hexadecane dihydrazide, dihydrazide maleate, dihydrazide fumarate, dihydrazide diglycolate, dihydrazide tartrate, dihydrazide malate, dihydrazide isophthalate, dihydrazide terephthalate, 2,6-naphthoic acid dihydrazide, 4,4'-bisbenzene dihydrazide, 1,4-naphthoic acid dihydrazide, amicure VDH and amicure UDH (all product names, manufactured by Ajinomoto Co., Inc. (registered trademark)), and trihydrazide citrate. One kind of these may be used alone, or two or more kinds thereof may be used in combination.

[Curing Accelerator]

As a curing accelerator, a known agent used as a heat-curing catalyst of an epoxy resin can be used, and examples thereof include a urea compound such as 3-(3,4-dichlorophenyl)-1,1-dimethyl urea (DCMU), an imidazole compound such 2-methyl imidazole and 2-ethyl-4-methyl imidazole; adducts of an imidazole compound and an epoxy resin; organophosphorus compounds of triphenyl phosphine and the like; borates of tetraphenyl phosphine tetraphenyl borate and the like; and diazabicycloundecene (DBU). One kind of these may be used alone, or two or more kinds thereof may be used in combination.

[Other Components]

Examples of other components that may be included in the epoxy resin composition include an anti-oxidant; a release agent such as silicone oil, natural wax, and synthetic wax; powders such as glass beads, crystalline silica, fused silica, calcium silicate, and alumina; fibers such as a glass fiber and a carbon fiber; a flame retardant such as an antimony trioxide; a halogen trap agent such as hydrotalcite and rare earth oxides; a coloring agent such as carbon black and Bengara; a silane coupling agent; a defoaming agent; a rheological modifier, a flame retardant, a pigment, and a dye.

[Content of Each Component]

The content of the macromonomer copolymer (A') in the epoxy resin composition is preferably 3 to 50 parts by mass, and more preferably 5 to 30 parts by mass, to 100 parts by mass of the epoxy resin. If the content of the macromonomer copolymer (A') is equal to or more than a lower limit of the range, brittleness of the epoxy resin composition is improved, and adhesion strength is more excellent. If the content of the macromonomer copolymer (A') is equal to or less than an upper limit of the range, hardness of the epoxy resin composition is not impaired, and adhesion strength is more excellent.

The content of the macromonomer copolymer (A') in the epoxy resin composition is preferably 0.1 to 150 parts by mass, more preferably 1 to 50 parts by mass, and further more preferably 3 to 30 parts by mass, to 100 parts by mass of the epoxy resin. If the content of the macromonomer copolymer (A') is equal to or more than the lower limit of the range, brittleness of the epoxy resin composition is improved, and toughness and adhesion strength are more excellent. If the content of the macromonomer copolymer (A') is equal to or less than the upper limit of the range, hardness of the epoxy resin composition is not impaired, and toughness and adhesion strength are more excellent.

The content of the curing agent in the epoxy resin composition can be appropriately selected depending on the kind of the curing agent. For example, in a case where the curing agent is dicyandiamide, the content of the curing agent is preferably 3 to 20 parts by mass, and more preferably 3 to 12 parts by mass, to 100 parts by mass of the epoxy resin. If the content of the curing agent is equal to or more than the lower limit of the range, adhesion strength after curing is more excellent. If the content of the curing agent is equal to or less than the upper limit of the range, pot life of the epoxy resin composition is more excellent.

In a case where the epoxy resin composition is a curing accelerator, the content of the curing accelerator is preferably 1 to 20 parts by mass, and more preferably 2 to 10 parts by mass to 100 parts by mass of the epoxy resin. If the content of the curing accelerator is equal to or more than a lower limit of the range, curing strength is more excellent. If the content of the curing accelerator is equal to or less than an upper limit of the range, adhesion strength is more excellent.

[Epoxy Resin Composition Manufacturing Method]

A method of manufacturing the epoxy resin composition of the present embodiment is not particularly limited, and it is possible to use a known method. For example, the macromonomer copolymer (A'), the epoxy resin, the curing agent, and the curing accelerator and other components depending on the necessity may be simultaneously mixed with one another, or some components (for example, the macromonomer copolymer (A') and the epoxy resin) may be pre-mixed, and the mixture and remaining components may be mixed with each other. The mixing method is not particularly limited, and a known mixer such as a rotary/revolution mixer, a mixing roll such as a triple roll, and a kneader can be used.

[Operative Effect]

Since the epoxy resin composition of the present embodiment includes the macromonomer copolymer (A'), the epoxy resin, and the curing agent, and has low viscosity compared to a case including a triblock copolymer used in the related art instead of the macromonomer copolymer (A'), process suitability and flexibility of mixing are more excellent. In addition, if the epoxy resin composition of the present invention is cured, a cured product excellent in adhesion strength or toughness, and impact resistance.

In the epoxy resin composition of the present embodiment, it is considered that the following phenomena are caused. A polymer chain derived from any one of a polymer chain derived from the macromonomer (a') and a polymer chain constituted of a unit derived from the vinyl monomer (b') of the macromonomer copolymer (A') is compatible with the epoxy resin, and the other is not compatible and separated to form a micro phase separation structure.

Or, although the macromonomer copolymer (A') and the epoxy resin are compatible before curing, when curing the epoxy resin composition, any one of the polymer chain derived from the macromonomer (a') and the polymer chain constituted of a unit derived from the vinyl monomer (b') remains compatible with the epoxy resin, and the other is not compatible and separated to form a micro phase separation structure.

In either case, it is considered that a polymer chain portion phase-separated from the epoxy resin imparts toughness to a cured product, and a remaining portion without being phase-separated functions as an anchor and excellent adhesion strength is obtained.

Preferably, the polymer chain derived from the macromonomer (a') is compatible with the epoxy resin.

In forming the micro phase separation structure, it is required to stabilize a state in which an area of the interface between the epoxy resin and the rubber portion of the macromonomer copolymer (A') is large, and for this, it is effective that the macromonomer (a') has a cyclic ether group and compatibility with the epoxy resin is improved, with which it is possible to control a phase separation structure of the rubber portion which is the polymer chain constituted of the vinyl monomer (b') unit.

That is, the phase separation structure comes to a state in which the surface area of the rubber portion becomes wider, and thus it becomes easy to obtain a micro spherical structure, a micro lamellar structure, a micro linear structure, or a micro co-continuous structure. At this time, the unit derived from the macromonomer (a') is present on the interface between the rubber portion and the epoxy resin. In addition, at the time of curing, the cyclic ether group included in the unit derived from the macromonomer (a') reacts with the curing agent along with the epoxy resin, and with this, strength of the interface between the epoxy resin and the rubber portion is improved, and adhesion strength or toughness, and impact resistance of the cured product are improved.

(Adhesive)

The epoxy resin composition of the present embodiment exhibits the above effect, and thus is useful as an adhesive.

Examples of the adhesive include a structural adhesive of a vehicle such as an automobile, an adhesive for civil engineering/construction, an adhesive for electronic materials, an adhesive for general affairs, a medical adhesive, an industrial adhesive, and the like. Examples of the adhesive for electronic materials include an interlayer adhesive of a multilayer substrate such as a build-up substrate, a die bonding agent, a semiconductor adhesive such as an underfill, and a packaging adhesive such as a BGA reinforcing underfill, an anisotropic conductive film (ACF), and an anisotropic conductive paste (ACP).

Here, usage of the epoxy resin composition of the present embodiment is not limited to the above, and the epoxy resin composition can be used for other usage. For example, the epoxy resin composition can be used for various usage for which a heat-curable resin such as an epoxy resin is used. Examples of such usage include coating, a coating agent, a molding material (including sheet, film, and FRP), an insulating material (including print substrate, electric wire coating, and the like), and a sealing agent. Examples of the sealing agent include a capacitor, a transistor, a diode, a light emitting diode, potting such as IC and LSI, dipping, transfer mold sealing, potting sealing such as COB, COF, and TAB of IC and LSIs, an underfill such as a flip chip, and sealing at the time of IC package packaging (including a reinforcing underfill) such as QFP, BGA, and CSP.

(Cured Product)

A cured product of the present embodiment is obtained by curing the epoxy resin composition of the present embodiment.

A method of curing an epoxy resin composition of the present embodiment is not particularly limited, it is possible to use a method of curing an epoxy resin composition employed in the related art, and typically a heat-curing method is used.

A cured product obtained by curing the epoxy resin composition of the present embodiment may have a phase separation structure, but from a viewpoint of excellent adhesion strength to an adherend and breaking toughness of a resin cured product, a phase separation structure size is preferably in an appropriate range, and having a micro phase separation structure is preferable. Here, the "macro phase separation structure" described in the present specification is a structure in which a plurality of kinds of different polymer components are not alternately compatible, and are mixedly present in a macro size (in general, 1 to 1,000 μm). On the other hand, the "micro phase separation structure" is a structure in which a plurality of kinds of different polymer components are not alternately compatible, and are mixedly present in a micro size. In a case where the micro size has a spherical structure or a granular structure, the diameter (maximum diameter) is 1 to 1,000 nm, and in a case where the micro size has a lamellar, linear structure, the diameter (maximum diameter) of the linear structure body is 1 nm to 1,000 nm. The micro phase separation structure in a resin cured product is observed by a method described in the section of the following examples using a scanning probe microscope, a scanning electron microscope, a transmission electron microscope, and the like.

In a case where the epoxy resin composition of the present embodiment and/or the cured product thereof has a micro phase separation structure, the micro phase separation structure preferably has a micro spherical structure, a micro lamellar structure, a micro linear structure, a micro co-continuous structure, and a structure in which two or more thereof are mixedly present. With this, an epoxy resin composition and a cured product thereof excellent in adhesion strength to an adherend and breaking toughness are obtained.

As an epoxy resin composition of the present embodiment and/or a cured product thereof, a polymer chain constituted of a constituent unit derived from a vinyl monomer (b') in a (meth)acrylic macromonomer copolymer (A') is preferably micro phase-separated in a matrix. In a case where the micro phase separation structure has a micro spherical structure, a micro lamellar structure, a micro linear structure, or a micro co-continuous structure, the polymer chain may be dispersed in random, or may be dispersed in a state of being oriented in a predetermined direction.

EXAMPLES

Hereinafter, the present invention will be described in further detail by examples, and the following examples do not limit the range of the present invention. In each example below, the "part" indicates "parts by mass". In addition, meaning of abbreviations in the following examples is as follows.

MMA: Methyl methacrylate
MA: Methyl acrylate
GMA: Glycidyl methacrylate
THFMA: Tetrahydrofurfuryl methacrylate
CYM M100: Product name, 3,4-epoxy cyclohexyl methyl mathacrylate, manufactured by Daicel Corporation
MEDOL-10: Product name, (2-methyl-2-ethyl-1,3-dioxolane-4-yl)methyl acrylate, manufactured by Osaka Organic Chemical Industry Limited
OXE-10: Product name, (3-ethyl oxetane-3-yl)methyl acrylate, manufactured by Osaka Organic Chemical Industry Limited
MEDOL-10: Product name, (2-methyl-2-ethyl-1,3-dioxolane-4-yl)methyl acrylate, manufactured by Osaka Organic Chemical Industry Limited
V #200: Product name, cyclic trimethylolpropane formal acrylate, manufactured by Osaka Organic Chemical Industry Limited
Perocta O: Product name, 1,1,3,3-tetramethyl butyl peroxy-2-ethyl hexanoate, manufactured by Nof Corporation
AMBN: 2,2'-azobis(2-methyl butyronitrile)
NYPER-BMT-K40: Product name, benzoyl peroxide, manufactured by Nof Corporation
n-BA: n-butyl acrylate 2-EHA: 2-ethylhexyl acrylate IDAA: Isodecyl acrylate X-22-174ASX: Product name, methacrylic modified silicone oil, manufactured by Shin-Etsu Chemical Co., Ltd.

IBXA: Isobornyl acrylate

TPA: Isopropyl alcohol

MEK: Methyl ethyl ketone

MIBK: Methyl isobutyl ketone

Dicy or DICY: Dicyandiamide (manufactured by Mitsubishi Chemical Corporation)

DCMU: 3-(3,4-dichlorophenyl)-1,1-dimethyl urea jER828: Product name, bisphenol A epoxy resin, manufactured by Mitsubishi Chemical Corporation J-100: Glass beads, manufactured by Potters-Ballotini Co., Ltd.

<Examples of First Embodiment>

A measurement method used in each example is indicated as follows.

<Number Average Molecular Weight of Macromonomer>

As a number average molecular weight (Mn) of macromonomer, a number average molecular weight was calculated under the following conditions in terms of standard polystyrene.

Gel permeation chromatography (GPC) device: Manufactured by Tosoh Corporation, HLC-8320

Column: Column manufactured by Tosoh Corporation (TSK gel Super HZM-MxHZM-MxHZ2000, TSKguardcolumn SuperHZ-L)

Sample solution: 10 μL of 0.2% by mass of tetrahydrofuran (THF) solution of macromonomer Flow rate: 0.35 mL/min Fluent: THF (Stabilizer: butyl hydroxy toluene (BHT))

Column temperature: 40° C.

(Weight Average Molecular Weight of Copolymer)

(1) As a weight average molecular weight (Mw) of a copolymer in copolymer solutions {(A-1 to A-7, A-9 to A-25)}, a weight average molecular weight (Mw) was calculated under the following condition in terms of standard polystyrene.

GPC device: Manufactured by Tosoh Corporation, HLC-8120

Column: Column manufactured by Tosoh Corporation (TSK gel SuperHM-Hx4, TSKguardcolumn SuperH-H)

Sample solution: 20 μL of 0.3% by mass of tetrahydrofuran (THF) solution of copolymer Flow rate: 0.6 mL/min Eluent: THF (stabilizer butyl hydroxy toluene (BHT))

Column temperature: 40° C.

(2) As a weight average molecular weight (Mw) of a copolymer in copolymer solutions {(A-8, A-26 to A-32)}, a weight average molecular weight (Mw) was calculated under the following condition in terms of standard polystyrene.

GPC device: Manufactured by Tosoh Corporation, HLC-8320

Column: Column manufactured by Tosoh Corporation (TSKgel SuperHZM-MxHZ2000, TSKguardcolumn SuperHZ-L)

Sample solution: 10 μL of 0.3% by mass of tetrahydrofuran (THF) solution of a copolymer Flow rate: 0.35 mL/min Fluent: THF (stabilizer butyl hydroxy toluene (BHT))

Column temperature: 40° C.

Synthesis Example 1

(Manufacturing of Dispersant 1)

In a polymerization device with a stirrer, a cooling tube, a thermometer, and a nitrogen gas introducing tube, 900 parts of deionized water, 60 parts of sodium 2-sulfoethyl methacrylate, 10 parts of potassium methacrylate, and 12 parts of methyl methacrylate (MMA) were put and stirred, and the temperature was raised to 50° C. while performing nitrogen substitution in the polymerization device. 0.08 parts of 2,2'-azobis(2-methylpropionamidine) dihydrochloride was added thereto, as a polymerization initiator, and the temperature was further raised to 60° C. After the rise of the temperature, using a dropping pump, MMA was continuously dropped at a rate of 0.24 parts/min for 75 minutes. After a reaction solution was maintained at 60° C. for 6 hours, the reaction solution was cooled to room temperature to obtain a dispersant 1 of 10% by mass of a solid content which is a transparent aqueous solution.

(Manufacturing of Chain Transfer Agent 1)

In a synthesis device with a stirrer, 1.00 g of cobalt (I) acetate tetrahydrate, 1.93 g of phenyl glyoxime, and 80 mL of diethyl ether deoxidized by nitrogen bubbling in advance were put in a nitrogen atmosphere, and stirred at room temperature for 30 minutes. Then, 10 mL of boron trifluoride diethyl ether complex was added thereto, and further stirred for 6 hours. A mixture was filtrated, the solid was washed with diethyl ether, and vacuum-dried for 15 hours to obtain 2.12 g of a chain transfer agent 1 which is a reddish brown solid.

(Manufacturing of Macromonomer)

In a synthesis device with a stirrer, a cooling tube, a thermometer, and a nitrogen gas introducing tube, 145 parts by deionized water, 0.1 parts of sodium sulfate, and 0.25 parts of a dispersant 1 (10% by mass of solid content) were put and stirred to obtain a homogeneous aqueous solution. Subsequently, 100 parts of MMA, 0.0035 parts of the chain transfer agent 1, and 0.4 parts of Perocta O (registered trademark) as a polymerization initiator were added thereto to obtain an aqueous suspension.

Subsequently, since nitrogen substitution was performed in the polymerization device, the temperature was raised to 80° C., reaction was performed for 3.5 hours, and the polymerization rate was further raised, the temperature was raised to 90° C. and maintained for 1 hour. Thereafter, the reaction solution was cooled to 40° C. to obtain an aqueous suspension including a macromonomer. The aqueous suspension was filtered with a filter, residues remaining in the filter was washed with deionized water, dehydrated, and dried at 40° C. for 16 hours to obtain a macromonomer (a-1). The number average molecular weight of the macromonomer (a-1) was 3,000.

Synthesis Examples 2 to 6 and Synthesis Examples 9 to 12

In Synthesis Example 1 (manufacturing of macromonomer), macromonomers (a-2) to (a-6), and (a-9) to (a-12) of the number average molecular weight shown in Table 1 were obtained in the same manner as that of Synthesis Example 1 except that the incorporation amount of the monomer, the chain transfer agent 1, and Perocta O was as shown in Table 1.

Synthesis Example 7

In a four-neck flask with a stirrer, a thermometer, a cooling tube, and a nitrogen gas introducing port, 70 parts of ethyl acetate and 0.0032 parts of the chain transfer agent 1 were added, and the external temperature was raised to 85° C. in nitrogen gas ventilation. After the external temperature reached 85° C. and the internal temperature was stabilized, a mixture constituted of 25 parts of methyl methacrylate, 75 parts of glycidyl methacrylate, and 1 part of AMBN (2,2'-azobis(2-methylbutyronitrile)) which is a polymerization initiator was dropped for 4 hours. After maintaining 1 hour after the completion of dropping, a mixture constituted of 0.4 parts of Perocta O and 20 parts of ethyl acetate was added thereto for 30 minutes. Thereafter, after maintaining two hours, ethyl acetate was added thereto such that the solid content ((proportion of monomer incorporation amount in (incorporation amount of monomer+solvent)) was 50%, and then cooled to room temperature to obtain a macromonomer solution (a-7). The number average molecular weight (Mn) of the macromonomer in the macromonomer solution (a-7) was 3,000.

Synthesis Example 8

In Synthesis Example 7 (manufacturing of macromonomer), a macromonomer (a-8) of the number average molecular weight shown in Table 1 was obtained in the same manner as that of Synthesis Example 7 except that the incorporation amount of the monomer, the chain transfer agent 1, and AMBN was as shown in Table 1.

Manufacturing Example 1

In a four-neck flask with a stirrer, a thermometer, a cooling tube, and a nitrogen gas introducing port, 40 parts of ethyl acetate and 12 parts of isopropyl alcohol (TPA), as an initial incorporation solvent, and 20 parts of macromonomer (a-1) were put, and the external temperature was raised to 85° C. in nitrogen gas ventilation. After the external temperature reached 85° C. and the internal temperature was stabilized, a mixture constituted of 20 parts of ethyl acetate, 80 parts of n-butyl acrylate (n-BA), and 0.13 parts of NYPER-BMT-K40 (manufactured by Nof Corporation, product name, benzoyl peroxide) which is a polymerization initiator was dropped for 4 hours. After maintaining 1 hour after the completion of dropping, a mixture constituted of 0.5 parts of Perocta O and 10 parts of ethyl acetate were added thereto for 1 hour. Thereafter, after maintaining two hours, ethyl acetate was added thereto such that the solid content ((proportion of monomer incorporation amount in (incorporation amount of monomer+solvent)) was 50%, and then cooled to room temperature to obtain a copolymer solution (A-1). The weight average molecular weight (Mw) of the copolymer in the copolymer solution (A-1) is shown in Table 2.

Manufacturing Examples 2 to 4, 6, 7, and 9 to 25

Copolymer solutions (A-2) to (A-4), (A-6), (A-7), and (A-9) to (A-25) were obtained in the same manner as that of Manufacturing Example A-1 except that the initial incorporation solvent, the kind of the macromonomer and monomer, and the use amount of the macromonomer and the monomer were set as shown in Tables 2 to 4, respectively. The weight average molecular weight (Mw) of the copolymer in each copolymer solution is shown in Tables 2 to 4.

Manufacturing Example 5

In a four-neck flask with a stirrer, a thermometer, a cooling tube, and a nitrogen gas introducing port, after performing nitrogen substitution of the inside with a three-way cock, 278 g of toluene, 13.9 g of 1,2-diethoxy ethane, and 19.2 g of a toluene solution containing 40.2 mmol of isobutyl bis(2,6-di-t-butyl-4-methyl phenoxy)aluminum was added, and 1.20 g of a mixture solution containing 6.37 mmol of sec-butyl lithium in cyclohexane and n-hexane was further added thereto. The solution was added with 33.0 g of methyl methacrylate and stirred at room temperature for 1 hour. Thereafter, the internal temperature was cooled to −30° C., 34.0 g of n-butyl acrylate was dropped for 2 hours, and after completion of dropping, stirred for 10 minutes. Thereafter, 33.0 g of methyl methacrylate was added thereto, stirred at room temperature for 18 hours, then the reaction solution was poured into methanol, and white precipitate was precipitated. The precipitate was filtrated and dried, dissolved in ethyl acetate such that the solid content was 50% to obtain a triblock copolymer solution (A-5). The weight average molecular weight of the copolymer in the copolymer solution (A-5) was 73,000.

Manufacturing Example 8

In a separable flask with a stirrer, a cooling tube, and a thermometer, 100 parts of methyl ethyl ketone (MEK) and 50 parts of macromonomer (a-6) were put, stirred at 50° C. for 1 hour to obtain a homogeneous solution. After cooling the resultant product to room temperature, 50 parts of n-butyl acrylate and 0.3 parts of AMBNV59 (manufactured by Wako Pure Chemical Industries, Ltd., AMBN (2,2-azobis (2-methyl butyronitrile), product name) were added thereto and stirred to obtain a homogeneous solution. The atmosphere in the separable flask was nitrogen-substituted by performing nitrogen bubbling for 30 minutes. Subsequently, the temperature was raised to 69° C., polymerization was started, after reaction was proceeded for 6 hours, the resultant product was cooled to room temperature to obtain a polymer solution. After adding MEK thereto such that the solid content (proportion of monomer incorporation amount in (incorporation amount of monomer+solvent) was 25% by mass, the resultant product was cooled to room temperature to obtain a copolymer solution (A-8). The weight average molecular weight (Mw) of the copolymer in the copolymer solution (A-8) is shown in Table 2.

Manufacturing Examples 26 to 32

Copolymer solutions (A-26) to (A-32) were obtained in the same manner as that of Manufacturing Example A-8 except that the initial incorporation solvent, the kind of the macromonomer and the monomer, and the use amount of the macromonomer and the monomer were set as shown in Table 4, respectively. The weight average molecular weight (Mw) of the copolymer in each copolymer solution is shown in Table 4.

(Manufacturing of Premix (Mixture of Copolymer (A) and Epoxy Resin (B)))

When preparing an epoxy resin composition, the copolymer solution and the epoxy resin ("jER828" manufactured by Mitsubishi Chemical Corporation, bisphenol A epoxy resin) were mixed such that the content of the copolymer after removing volatile content was 22% by mass, dried under reduced pressure using a vacuum drier, and subjected to desolation to obtain a premix from which the volatile content was removed.

(Viscosity of Premix)

A viscosity $\eta^*$ (25° C., 0.05 Hz) of the premix obtained described above was measured in the following condition, and using the value as a viscosity of premix, evaluation was performed based on the following determination criteria. The lower the viscosity of premix becomes, process suitability and flexibility of mixing of the epoxy resin composition become excellent.

Device: Rheometer, HAAKE MARS60 (product name manufactured by Thermo Fischer Scientific)
Measurement tool: Cone plate, cone angle 10, cone radius: 35 mm
Measurement temperature: 25° C.
Measurement frequency: 0.05 Hz
"Determination criteria"
A: A viscosity of premix is equal to or less than 800 Pa·s.
B: A viscosity of premix is more than 800 Pa·s and equal to or less than 1500 Pa·s.
C: A viscosity of premix is greater than 1500 Pa·s.

(Peeling Strength 1)

A portion from an end in a length direction to 50 mm of a single surface of a steel sheet of a width of 25 mm×a length of 150 mm×a thickness of 0.5 mm (JIS G 3141 SPCC-SD, manufactured by Engineering Test Service) was left exposed, and the remaining portion was applied with a prepared epoxy resin composition. Another steel sheet of the same size was attached to the epoxy resin composition applied surface, fixed such that the thickness of the epoxy resin composition layer was uniform, heated to 180° C. for 30 minutes, and the epoxy resin composition layer was cured to obtain a laminate. The extrusion of the epoxy resin composition layer on a side surface of the laminate was removed, and the exposed portion of each of two steel sheets was bent by 90° at the right angle toward the outside to obtain a T-shaped test piece. In autograph AG-IS (manufactured by Shimadzu Corporation, Load Cell 1 kN), the obtained exposed portion of the test piece was vertically maintained, the peeling strength was measured in the condition of 100 mm/min, and an average value of the peeling strength obtained by removing the first 25 mm and the last 25 mm was evaluated based on the following determination criteria.

"Determination Criteria"
B: Peeling strength is equal to or more than 25 N/25 mm and less than 35 N/25 mm
C: Peeling strength is less than 25 N/25 mm.

(Peeling Strength 2)

A portion from an end in a length direction to 50 mm of a single surface of a steel sheet of a width of 25 mm×a length of 150 mm×a thickness of 0.5 mm (JIS G 3141 SPCC-SP, manufactured by Engineering Test Service) was left exposed, and the remaining portion was applied with a prepared epoxy resin composition. Another steel sheet of the same size was attached to the epoxy resin composition applied surface, fixed such that the thickness of the epoxy resin composition layer was uniform, heated to 180° C. for 30 minutes, and the epoxy resin composition layer was cured to obtain a laminate. Extrusion of the epoxy resin composition layer on a side surface of the laminate was removed, and the exposed portion of each of two steel sheets was bent by 90° at the right angle toward the outside to obtain a T-shaped test piece.

In autograph, the obtained exposed portion of the test piece was vertically maintained, the peeling strength was measured in the condition of 200 mm/min, and an average value of the peeling strength obtained by removing the first 25 mm and the last 25 mm was evaluated based on the following determination criteria.

"Determination Criteria"
B: Peeling strength is equal to or more than 25 N/25 MM and less than 35 N/25 mm
C: Peeling strength is less than 25 N/25 mm (Impact Strength)

Based on ISO11343 JIS K 6865, a symmetric wedge test piece was prepared and evaluated. A bending processed steel sheet of a thickness of 0.8 mm (JIS G 3141 SPCC-SD, manufactured by Engineering Test Service) was prepared. The prepared epoxy resin composition was applied and attached to a portion to 30 mm, heated to 180° C. for 30 minutes, and the epoxy resin composition layer was cured to obtain a symmetric wedge test piece.

Using a high-speed tensile tester Hydroshot HITS-T10 (manufactured by Shimadzu Corporation, Load Cell 10 kN), a symmetric wedge was driven under a condition of 2 m/sec, and a dynamic splitting resistance value was measured while splitting the epoxy resin composition layer of a width of 20 mm×a length of 30 mm. An average value of a dynamic splitting resistance value was calculated in a range of removing the first 25% and the last 10% of the measured dynamic splitting resistance value.

"Determination criteria"
A: The dynamic splitting resistance value is equal to or more than 0.04 N/20 mm
B: The dynamic splitting resistance value is equal to or more than 0.02 N/20 mm and less than 0.04 N/20 mm
C: The dynamic splitting resistance value is less than 0.02 N/20 mm In the following example, evaluation results of the viscosity of premix, the peeling strength 1, the peeling strength 2, and the impact strength are shown in Tables 5 to 7. "-" indicates unmeasured.

Example 1

8.5 parts of a copolymer solution (A-1) and 15 parts of an epoxy resin ("jER828" manufactured by Mitsubishi Chemical Corporation, bisphenol A epoxy resin) were mixed with each other, dried under reduced pressure at 130° C. for 6 hours using a vacuum drier, and subjected to desolvation to obtain a premix from which the volatile content was removed. The premix, 2.9 parts of dicyandiamide (Dicy) (manufactured by Mitsubishi Chemical Corporation), 1.95 parts of 3-(3,4-dichlorophenyl)-1,1-dimethyl urea (DCMU) (manufactured by Hodogaya Chemical Co., Ltd.), and 23.3 parts of an epoxy resin ("jER828" manufactured by Mitsubishi Chemical Corporation, bisphenol A epoxy resin) were mixed with Awatori Rentaro (manufactured by Thinky Corporation), kneaded with a triple roll (manufactured by AIMEX Corporation), then 0.08 parts of glass beads ("J-100", manufactured by Potters-Ballotini Co., Ltd.) were added thereto, and mixed with Awatori Rentaro to obtain an epoxy resin composition.

Examples 2 to 4, Comparative Example 1

An epoxy resin composition was obtained in the same manner as that of Example 1 except that copolymer solutions (A-2) to (A-5) were used instead of the copolymer solution (A-1).

Comparative Example 2

An epoxy resin composition was obtained in the same manner as that of Example 1 except that the copolymer solution (A-1) was not mixed. A viscosity of premix is a viscosity of only the epoxy resin.

Example 5

20 parts of a copolymer solution (A-6) and 35.5 parts of an epoxy resin ("jER828" manufactured by Mitsubishi Chemical Corporation, bisphenol A epoxy resin) were mixed with each other, dried under reduced pressure using a vacuum drier, and subjected to desolvation to obtain a premix from which the volatile content was removed. The premix, 8 parts of dicyandiamide (Dicy) (manufactured by Mitsubishi Chemical Corporation), 4 parts of 3-(3,4-dichlorophenyl)-1,1-dimethyl urea (DCMU) (manufactured by Hodogaya Chemical Co., Ltd.), and 64.5 parts of an epoxy resin ("jER828" manufactured by Mitsubishi Chemical Corporation, bisphenol A epoxy resin) were mixed with Awatori Rentaro (manufactured by Thinky Corporation), kneaded with a triple roll (manufactured by AIMEX Corporation), then 0.2 parts of glass beads ("J-100", manufactured by Potters-Ballotini Co., Ltd.) were added thereto, and mixed with Awatori Rentaro to obtain an epoxy resin composition.

Example 6, Examples 8 to 17, Examples 19 to 25

An epoxy resin composition was obtained in the same manner as that of Example 5 except that the kinds of the copolymer solutions were as shown in Tables 6 and 7, respectively.

Since no glass transition temperature of homopolymer of IDAA is reported in Polymer Handbook (1989), product catalog value of Miwon Specialty Chemicals Co., Ltd. was employed for a value of TgB in Example 17, Example 22, and Example 23. In addition, for a value of TgB in Example 24 and Example 25, no glass transition temperature of homopolymer of X-22-174ASX is reported in Polymer Handbook (1989) and there is also no description in the catalog of the manufacturer. However, since the homopolymer of X-22-174ASX is in a liquid state at 23° C., the glass transition temperature can be determined to be less than 23° C. For convenience, the glass transition temperature of X-22-174ASX was considered as 23° C.

Example 7

40 parts of a copolymer solution (A-8) and 35.5 parts of an epoxy resin ("jER828" manufactured by Mitsubishi Chemical Corporation, bisphenol A epoxy resin) were mixed with each other, dried under reduced pressure using a vacuum drier, and subjected to desolvation to obtain a premix from which the volatile content was removed. The premix, 8 parts of dicyandiamide (Dicy) (manufactured by Mitsubishi Chemical Corporation), 4 parts of 3-(3,4-dichlorophenyl)-1,1-dimethyl urea (DCMU) (manufactured by Hodogaya Chemical Co., Ltd.), and 64.5 parts of an epoxy resin ("jER828" manufactured by Mitsubishi Chemical Corporation, bisphenol A epoxy resin) were mixed with Awatori Rentaro (manufactured by Thinky Corporation), kneaded with a triple roll (manufactured by AIMEX Corporation), then 0.2 parts of glass beads ("J-100", manufactured by Potters-Ballotini Co., Ltd.) were added thereto, and mixed with Awatori Rentaro to prepare an epoxy resin composition.

Example 18

40 parts of a copolymer solution (A-7) and 46.6 parts of an epoxy resin ("jER828" manufactured by Mitsubishi Chemical Corporation, bisphenol A epoxy resin) were mixed with each other, dried under reduced pressure at 130° C. for 6 hours using a vacuum drier, and subjected to desolvation to obtain a premix from which the volatile content was removed. The premix, 8 parts of dicyandiamide (Dicy) (manufactured by Mitsubishi Chemical Corporation), 4 parts of 3-(3,4-dichlorophenyl)-1,1-dimethyl urea (DCMU) (manufactured by Hodogaya Chemical Co., Ltd.), and 43.3 parts of an epoxy resin ("jER828" manufactured by Mitsubishi Chemical Corporation, bisphenol A epoxy resin) were mixed with Awatori Rentaro (manufactured by Thinky Corporation), kneaded with a triple roll (manufactured by AIMEX Corporation), then 0.2 parts of glass beads ("J-100", manufactured by Potters-Ballotini Co., Ltd.) were added thereto, and mixed with Awatori Rentaro to obtain an epoxy resin composition.

Examples 26 to 30, Comparative Examples 3, 4

An epoxy resin composition was obtained in the same manner as that of Example 7 except that the kinds of the copolymer solutions were as shown in Table 7, respectively.

TABLE 1

|  |  | Synthesis example | | | | | |
| --- | --- | --- | --- | --- | --- | --- | --- |
|  |  | 1 | 2 | 3 | 4 | 5 | 6 |
| Macromonomer |  | a-1 | a-2 | a-3 | a-4 | a-5 | a-6 |
| Monomer (parts by mass) | MMA | 100 | 100 | 100 | 75 | 50 | 75 |
|  | GMA | — | — | — | 25 | 50 | — |
|  | THFMA | — | — | — | — | — | 25 |
|  | CYM M100 | — | — | — | — | — | — |
|  | MEDOL-10 | — | — | — | — | — | — |
| Chain transfer agent (parts by mass) | Chain transfer agent 1 | 0.0035 | 0.0022 | 0.0016 | 0.0022 | 0.004 | 0.0016 |
| Initiator (parts by mass) | Perocta O | 0.4 | 0.25 | 0.2 | 0.6 | 2 | 0.6 |
|  | AMBN | — | — | — | — | — | — |
| Molecular weight | Mn | 3000 | 4000 | 6700 | 4200 | 3500 | 5100 |

TABLE 1-continued

|  |  | Synthesis example | | | | | |
| --- | --- | --- | --- | --- | --- | --- | --- |
|  |  | 7 | 8 | 9 | 10 | 11 | 12 |
| Macromonomer |  | a-7 | a-8 | a-9 | a-10 | a-11 | a-12 |
| Monomer (parts by mass) | MMA | 25 | — | 50 | 75 | 75 | 90 |
|  | GMA | 75 | 100 | 50 | — | — | 10 |
|  | THFMA | — | — | — | — | — | — |
|  | CYM M100 | — | — | — | 25 | — | — |
|  | MEDOL-10 | — | — | — | — | 25 | — |
| Chain transfer agent (parts by mass) | Chain transfer agent 1 | 0.0032 | 0.0035 | 0.0025 | 0.0025 | 0.0159 | 0.0035 |
| Initiator (parts by mass) | Perocta O | 0.4 | 0.4 | 0.9 | 0.9 | 1.5 | 0.6 |
|  | AMBN | 1 | 1 | — | — | — | — |
| Molecular weight | Mn | 3000 | 3400 | 4900 | 4500 | 4900 | 3800 |

TABLE 2

|  |  | Manufacturing example | | | | | | | | | |
| --- | --- | --- | --- | --- | --- | --- | --- | --- | --- | --- | --- |
|  |  | 1 | 2 | 3 | 4 | 6 | 7 | 8 | 9 | 10 | 11 |
| Copolymer solution |  | A-1 | A-2 | A-3 | A-4 | A-6 | A-7 | A-8 | A-9 | A-10 | A-11 |
| Macromonomer (parts by mass) | a-1 | 20 | — | — | 50 | — | — | — | 20 | 20 | 20 |
|  | a-2 | — | 20 | — | — | — | — | — | — | — | — |
|  | a-3 | — | — | 20 | — | — | — | — | — | — | — |
|  | a-4 | — | — | — | — | 50 | — | — | — | — | — |
|  | a-5 | — | — | — | — | — | 20 | — | — | — | — |
|  | a-6 | — | — | — | — | — | — | 50 | — | — | — |
|  | a-7 | — | — | — | — | — | — | — | — | — | — |
|  | a-8 | — | — | — | — | — | — | — | — | — | — |
|  | a-9 | — | — | — | — | — | — | — | — | — | — |
|  | a-10 | — | — | — | — | — | — | — | — | — | — |
|  | a-11 | — | — | — | — | — | — | — | — | — | — |
|  | a-12 | — | — | — | — | — | — | — | — | — | — |
| Vinyl monomer (parts by mass) | n-BA | 80 | 80 | 80 | 50 | 50 | 80 | 50 | 80 | 80 | 80 |
|  | 2EHA | — | — | — | — | — | — | — | — | — | — |
|  | IDAA | — | — | — | — | — | — | — | — | — | — |
|  | X-22-174ASX | — | — | — | — | — | — | — | — | — | — |
|  | IBXA | — | — | — | — | — | — | — | — | — | — |
| Initial incorporation solvent (parts by mass) | Ethyl acetate | 40 | 40 | 40 | 50 | 45 | 40 | — | — | 45 | — |
|  | IPA | 12 | 25 | 30 | — | 5 | 12 | — | 30 | 25 | — |
|  | MEK | — | — | — | — | — | — | 100 | 45 | — | — |
|  | MIBK | — | — | — | — | — | — | — | — | — | 52 |
| Solid content (% by mass) |  | 50 | 50 | 50 | 50 | 50 | 50 | 25 | 50 | 50 | 50 |
| Mw of copolymer (10,000) |  | 9.3 | 4.6 | 4.3 | 7.6 | 15.6 | 10.4 | 14.0 | 2.1 | 4.4 | 12.0 |

TABLE 3

|  |  | Manufacturing example | | | | | | | | | | | |
| --- | --- | --- | --- | --- | --- | --- | --- | --- | --- | --- | --- | --- |
|  |  | 12 | 13 | 14 | 15 | 16 | 17 | 18 | 19 | 20 | 21 | 22 | 23 |
| Copolymer solution |  | A-12 | A-13 | A-14 | A-15 | A-16 | A-17 | A-18 | A-19 | A-20 | A-21 | A-22 | A-23 |
| Macromonomer (parts by mass) | a-1 | 50 | 50 | 80 | 20 | — | — | 20 | — | — | — | — | — |
|  | a-2 | — | — | — | — | — | — | — | — | — | — | — | — |
|  | a-3 | — | — | — | — | 20 | — | — | — | — | — | — | — |
|  | a-4 | — | — | — | — | — | — | — | — | — | — | — | — |
|  | a-5 | — | — | — | — | — | — | — | — | — | 20 | — | 20 |
|  | a-6 | — | — | — | — | — | — | — | — | — | — | — | — |
|  | a-7 | — | — | — | — | — | 40 | — | — | — | 60 | — | 60 |
|  | a-8 | — | — | — | — | — | — | — | 40 | — | — | — | — |
|  | a-9 | — | — | — | — | — | — | — | — | — | — | — | — |

TABLE 3-continued

| | | Manufacturing example | | | | | | | | | | | |
|---|---|---|---|---|---|---|---|---|---|---|---|---|
| | | 12 | 13 | 14 | 15 | 16 | 17 | 18 | 19 | 20 | 21 | 22 | 23 |
| | a-10 | — | — | — | — | — | — | — | — | — | — | — | — |
| | a-11 | — | — | — | — | — | — | — | — | — | — | — | — |
| | a-12 | — | — | — | — | — | — | — | — | — | — | — | — |
| Vinyl monomer (parts by mass) | n-BA | 50 | 50 | 20 | — | — | — | — | — | — | — | — | — |
| | 2EHA | — | — | — | 80 | 80 | 80 | — | 80 | 80 | 70 | — | — |
| | IDAA | — | — | — | — | — | — | 80 | — | — | — | 80 | 70 |
| | X-22-174ASX | — | — | — | — | — | — | — | — | — | — | — | — |
| | IBXA | — | — | — | — | — | — | — | — | — | — | — | — |
| Initial incorporation solvent (parts by mass) | Ethyl acetate | — | 50 | — | 40 | 40 | 45 | 40 | 20 | 55 | 20 | 50 | 17 |
| | IPA | 30 | — | — | 25 | 15 | — | — | — | — | — | — | — |
| | MEK | 45 | — | — | — | — | — | — | — | — | — | — | — |
| | MIBK | — | — | 52 | — | — | — | — | — | — | — | — | — |
| Solid content (% by mass) | | 50 | 50 | 50 | 50 | 50 | 50 | 50 | 50 | 50 | 50 | 50 | 50 |
| Mw of copolymer (10,000) | | 2.2 | 7.6 | 0.8 | 3.1 | 4.5 | 8.3 | 3.1 | 10.7 | 14.5 | 15.8 | 11.9 | 14.3 |

TABLE 4

| | | Manufacturing example | | | | | | | | |
|---|---|---|---|---|---|---|---|---|---|---|
| | | 24 | 25 | 26 | 27 | 28 | 29 | 30 | 31 | 32 |
| Copolymer solution | | A-24 | A-25 | A-26 | A-27 | A-28 | A-29 | A-30 | A-31 | A-32 |
| Macromonomer (parts by mass) | a-1 | — | — | — | — | — | — | — | — | — |
| | a-2 | — | — | — | — | — | — | — | — | — |
| | a-3 | — | — | — | — | — | — | — | — | — |
| | a-4 | — | — | — | — | — | — | — | — | — |
| | a-5 | 20 | 50 | — | — | — | — | — | — | — |
| | a-6 | — | — | — | — | — | — | — | — | — |
| | a-7 | — | — | — | — | — | — | — | — | — |
| | a-8 | — | — | — | — | — | — | — | — | — |
| | a-9 | — | — | — | — | 20 | 20 | 20 | 20 | — |
| | a-10 | — | — | 50 | — | — | — | — | — | — |
| | a-11 | — | — | — | 50 | — | — | — | — | — |
| | a-12 | — | — | — | — | — | — | — | — | 50 |
| Vinyl monomer (parts by mass) | n-BA | — | — | 50 | 50 | 60.8 | 46.8 | 24.8 | 12 | 50 |
| | 2EHA | 70 | 40 | — | — | — | — | — | — | — |
| | IDAA | — | — | — | — | — | — | — | — | — |
| | X-22-174ASX | 10 | 10 | — | — | — | — | — | — | — |
| | IBXA | — | — | — | — | 19.2 | 33.2 | 55.2 | 68 | — |
| Initial incorporation solvent (parts by mass) | Ethyl acetate | — | — | — | — | — | — | — | — | — |
| | IPA | — | — | — | — | — | — | — | — | — |
| | MEK | — | — | 100 | 100 | 100 | 100 | 100 | 100 | 100 |
| | MIBK | — | — | — | — | — | — | — | — | — |
| Solid content (% by mass) | | 50 | 50 | 25 | 25 | 25 | 25 | 25 | 25 | 25 |
| Mw of copolymer (10,000) | | 10.7 | 3.1 | 10.4 | 10.9 | 22.3 | 19.2 | 15.1 | 9.3 | 8.0 |

TABLE 5

| | | Example 1 | Example 2 | Example 3 | Example 4 | Comparative Example 1 | Comparative Example 2 |
|---|---|---|---|---|---|---|---|
| Copolymer solution (parts by mass) | A-1 | 8.5 | — | — | — | — | — |
| | A-2 | — | 8.5 | — | — | — | — |
| | A-3 | — | — | 8.5 | — | — | — |
| | A-4 | — | — | — | 8.5 | — | — |
| | A-5 | — | — | — | — | 8.5 | — |
| | A-6 | — | — | — | — | — | — |
| | A-7 | — | — | — | — | — | — |
| | A-8 | — | — | — | — | — | — |
| | A-9 | — | — | — | — | — | — |
| | A-10 | — | — | — | — | — | — |
| | A-11 | — | — | — | — | — | — |

TABLE 5-continued

|  |  |  |  |  |  |  |  |
|---|---|---|---|---|---|---|---|
| TgB (° C.) |  | −54 | −54 | −54 | −54 | −54 | −54 |
| Viscosity of premix (Pa · s) |  | 240 | 190 | 170 | 680 | 1520 | 10 |
|  |  | A | A | A | A | C | A |
| Curing agent | Dicy (parts by mass) | 2.9 | 2.9 | 2.9 | 2.9 | 2.9 | 2.9 |
| Curing accelerator | DCMU (parts by mass) | 1.95 | 1.95 | 1.95 | 1.95 | 1.95 | 1.95 |
| Epoxy resin | jER828 (pails by mass) (before adding curing agent) | 15 | 15 | 15 | 15 | 15 | 15 |
|  | jER828 (parts by mass) (at the time of adding curing agent) | 23.3 | 23.3 | 23.3 | 23.3 | 23.3 | 23.3 |
| Glass beads | J-100 (parts by mass) | 0.08 | 0.08 | 0.08 | 0.08 | 0.08 | 0.08 |
| Peeling strength 1 (N/25 mm) |  | 56 | 68 | 39 | 31 | 22 | 12 |
|  |  | B | B | B | B | C | C |
| Peeling strength 2 (N/25 mm) |  | — | — | — | — | — | — |
|  |  | — | — | — | — | — | — |
| Impact strength (N/20 mm) |  | 0.02 | — | — | — | — | 0.01 |
|  |  | B | — | — | — | — | C |

|  |  | Example 5 | Example 6 | Example 7 | Example 8 | Example 9 | Example 10 |
|---|---|---|---|---|---|---|---|
| Copolymer solution (parts by mass) | A-1 | — | — | — | — | — | — |
|  | A-2 | — | — | — | — | — | — |
|  | A-3 | — | — | — | — | — | — |
|  | A-4 | — | — | — | — | — | — |
|  | A-5 | — | — | — | — | — | — |
|  | A-6 | 20 | — | — | — | — | — |
|  | A-7 | — | 20 | — | — | — | — |
|  | A-8 | — | — | 40 | — | — | — |
|  | A-9 | — | — | — | 20 | — | — |
|  | A-10 | — | — | — | — | 20 | — |
|  | A-11 | — | — | — | — | — | 20 |
| TgB (° C.) |  | −54 | −54 | −54 | −54 | −54 | −54 |
| Viscosity of premix (Pa · s) |  | 325 | 57 | 1109 | 27 | 53 | 66 |
|  |  | A | A | B | A | A | A |
| Curing agent | Dicy (parts by mass) | 8 | 8 | 8 | 8 | 8 | 8 |
| Curing accelerator | DCMU (parts by mass) | 4 | 4 | 4 | 4 | 4 | 4 |
| Epoxy resin | jER828 (pails by mass) (before adding curing agent) | 35.5 | 35.5 | 35.5 | 35.5 | 35.5 | 35.5 |
|  | jER828 (parts by mass) (at the time of adding curing agent) | 64.5 | 64.5 | 64.5 | 64.5 | 64.5 | 64.5 |
| Glass beads | J-100 (parts by mass) | 0.2 | 0.2 | 0.2 | 0.2 | 0.2 | 0.2 |
| Peeling strength 1 (N/25 mm) |  | 77 | 75 | — | 25 | 35 | 48 |
|  |  | B | B | — | B | B | B |
| Peeling strength 2 (N/25 mm) |  | — | — | 64 | — | — | — |
|  |  | — | — | B | — | — | — |
| Impact strength (N/20 mm) |  | 0.04 | 0.16 | — | — | — | — |
|  |  | A | A | — | — | — | — |

TABLE 6

|  |  | Example 11 | Example 12 | Example 13 | Example 14 | Example 15 | Example 16 |
|---|---|---|---|---|---|---|---|
| Copolymer solution (parts by mass) | A-7 | — | — | — | — | — | — |
|  | A-12 | 20 | — | — | — | — | — |
|  | A-13 | — | 20 | — | — | — | — |
|  | A-14 | — | — | 20 | — | — | — |
|  | A-15 | — | — | — | 20 | — | — |
|  | A-16 | — | — | — | — | 20 | — |
|  | A-17 | — | — | — | — | — | 20 |
|  | A-18 | — | — | — | — | — | — |
|  | A-19 | — | — | — | — | — | — |
|  | A-20 | — | — | — | — | — | — |
|  | A-21 | — | — | — | — | — | — |
|  | A-22 | — | — | — | — | — | — |
| TgB (° C.) |  | −54 | −54 | −54 | −50 | −50 | −50 |
| Viscosity of premix (Pa · s) |  | 145 | 680 | 274 | 140 | 140 | 106 |
|  |  | A | A | A | A | A | A |
| Curing agent | Dicy (parts by mass) | 8 | 8 | 8 | 8 | 8 | 8 |
| Curing accelerator | DCMU (parts by mass) | 4 | 4 | 4 | 4 | 4 | 4 |
| Epoxy resin | jER828 (parts by mass) (before adding curing agent) | 35.5 | 35.5 | 35.5 | 35.5 | 35.5 | 35.5 |
|  | jER828 (pans by mass) (at the time of adding curing agent) | 64.5 | 64.5 | 64.5 | 64.5 | 64.5 | 64.5 |
| Glass beads | J-100 (parts by mass) | 0.2 | 0.2 | 0.2 | 0.2 | 0.2 | 0.2 |
| Peeling strength 1 (N/25 mm) |  | 28 | 31 | 41 | 70 | 31 | 180 |
|  |  | B | B | B | B | B | B |

TABLE 6-continued

| | | | | | | | |
|---|---|---|---|---|---|---|---|
| Peeling strength 2 (N/25 mm) | | — | — | — | — | — | — |
| Impact strength (N/20 mm) | | — | — | — | — | — | 0.14 A |

| | | Example 17 | Example 18 | Example 19 | Example 20 | Example 21 | Example 22 |
|---|---|---|---|---|---|---|---|
| Copolymer solution (parts by mass) | A-7 | — | 40 | — | — | — | — |
| | A-12 | — | — | — | — | — | — |
| | A-13 | — | — | — | — | — | — |
| | A-14 | — | — | — | — | — | — |
| | A-15 | — | — | — | — | — | — |
| | A-16 | — | — | — | — | — | — |
| | A-17 | — | — | — | — | — | — |
| | A-18 | 20 | — | — | — | — | — |
| | A-19 | — | — | 20 | — | — | — |
| | A-20 | — | — | — | 20 | — | — |
| | A-21 | — | — | — | — | 20 | — |
| | A-22 | — | — | — | — | — | 20 |
| TgB (° C.) | | −60 | −54 | −50 | −50 | −50 | −60 |
| Viscosity of premix (Pa · s) | | 850 B | 57 A | 210 A | 79 A | 83 A | 116 A |
| Curing agent | Dicy (parts by mass) | 8 | 8 | 8 | 8 | 8 | 8 |
| Curing accelerator | DCMU (parts by mass) | 4 | 4 | 4 | 4 | 4 | 4 |
| Epoxy resin | jER828 (parts by mass) (before adding curing agent) | 35.5 | 35.5 | 35.5 | 35.5 | 35.5 | 35.5 |
| | jER828 (pans by mass) (at the time of adding curing agent) | 64.5 | 64.5 | 64.5 | 64.5 | 64.5 | 64.5 |
| Glass beads | J-100 (parts by mass) | 0.2 | 0.2 | 0.2 | 0.2 | 0.2 | 0.2 |
| Peeling strength 1 (N/25 mm) | | 25 B | 87 B | 45 B | 158 B | 97 B | 137 B |
| Peeling strength 2 (N/25 mm) | | — | — | — | — | — | — |
| Impact strength (N/20 mm) | | — | — | — | 0.19 A | 0.13 A | — |

TABLE 7

| | | Example 23 | Example 24 | Example 25 | Example 26 | Example 27 | Example 28 |
|---|---|---|---|---|---|---|---|
| Copolymer solution (parts by mass) | A-23 | 20 | — | — | — | — | — |
| | A-24 | — | 20 | — | — | — | — |
| | A-25 | — | — | 20 | — | — | — |
| | A-26 | — | — | — | 40 | — | — |
| | A-27 | — | — | — | — | 40 | — |
| | A-28 | — | — | — | — | — | 40 |
| | A-29 | — | — | — | — | — | — |
| | A-30 | — | — | — | — | — | — |
| | A-31 | — | — | — | — | — | — |
| | A-32 | — | — | — | — | — | — |
| TgB (° C.) | | −60 | <−43 | <−38 | −54 | −54 | −31 |
| Viscosity of premix (Pa · s) | | 142 A | 115 A | 248 A | 1469 B | 1005 B | 1062 B |
| Curing agent | Dicy (parts by mass) | 8 | 8 | 8 | 8 | 8 | 8 |
| Curing accelerator | DCMU (parts by mass) | 4 | 4 | 4 | 4 | 4 | 4 |
| Epoxy resin | jER828 (parts by mass) (before adding curing agent) | 35.5 | 35.5 | 35.5 | 35.5 | 35.5 | 35.5 |
| | jER828 (parts by mass) (at the time of adding curing agent) | 64.5 | 64.5 | 64.5 | 64.5 | 64.5 | 64.5 |
| Glass beads | J-100 (parts by mass) | 0.2 | 0.2 | 0.2 | 0.2 | 0.2 | 0.2 |
| Peeling strength 1 (N/25 mm) | | 121 B | 147 B | 39 B | — | — | — |
| Peeling strength 2 (N/25 mm) | | — | — | — | 98 B | 85 B | 53 B |
| Tmpacl strength (N/20 mm) | | — | 0.32 A | — | — | — | — |

| | | Example 29 | Example 30 | Comparative Example 3 | Comparative Example 4 |
|---|---|---|---|---|---|
| Copolymer solution (parts by mass) | A-23 | — | — | — | — |
| | A-24 | — | — | — | — |
| | A-25 | — | — | — | — |
| | A-26 | — | — | — | — |

TABLE 7-continued

| | | | | | |
|---|---|---|---|---|---|
| | A-27 | — | — | — | — |
| | A-28 | — | — | — | — |
| | A-29 | 40 | — | — | — |
| | A-30 | — | 40 | — | — |
| | A-31 | — | — | 40 | — |
| | A-32 | — | — | — | 40 |
| TgB (° C.) | | −10 | −54 | 30 | 60 |
| Viscosity of premix (Pa · s) | | 788 | 1419 | 855 | 406 |
| | | A | B | B | A |
| Curing agent | Dicy (parts by mass) | 8 | 8 | 8 | 8 |
| Curing accelerator | DCMU (parts by mass) | 4 | 4 | 4 | 4 |
| Epoxy resin | jER828 (parts by mass) (before adding curing agent) | 35.5 | 35.5 | 35.5 | 35.5 |
| | jER828 (parts by mass) (at the time of adding curing agent) | 64.5 | 64.5 | 64.5 | 64.5 |
| Glass beads | J-100 (parts by mass) | 0.2 | 0.2 | 0.2 | 0.2 |
| Peeling strength 1 (N/25 mm) | | — | — | — | — |
| Peeling strength 2 (N/25 mm) | | 36 | 54 | 22 | 12 |
| | | B | B | C | C |
| Tmpacl strength (N/20 mm) | | — | — | — | — |

As a (meth)acrylic copolymer, in Examples 1 to 30 in which a (meth)acrylic copolymer having a constituent unit derived from a macromonomer (a) and a constituent unit derived from a vinyl monomer (b) were mixed with each other, the viscosity of premix was lowered. From this, it was confirmed that process suitability and flexibility of mixing of the epoxy resin compositions in Examples 1 to 30 were excellent. In addition, a cured product of the epoxy resin compositions of Examples 1 to 30 showed excellent adhesion strength. In addition, Example 1, Example 5, Example 6, Example 16, Example 20, Example 21, and Example 24 showed excellent impact strength.

On the other hand, in Comparative Example 1 in which a triblock copolymer not having a constituent unit derived from a macromonomer (a) as a (meth)acrylic copolymer was mixed, the viscosity of premix was high, and process suitability and flexibility of mixing of the epoxy resin composition were deteriorated.

In Comparative Example 2 in which a (meth)acrylic copolymer was not mixed, peeling strength and impact strength of the cured product were deteriorated. In addition, in Comparative Example 3 and Comparative Example 4 in which TgB of a copolymer was higher than 25° C., peeling strength of the cured product was deteriorated.

<Example of Second Embodiment>

A measurement method used in the present example is shown below.

(Molecular Weight Measurement of Macromonomer)

The number average molecular weight (Mn) and the weight average molecular weight (Mw) of a macromonomer [(a'-1) to (a'-9), (a-1)] was calculated under the following condition in terms of standard methyl polymethacrylate.

Gel permeation chromatography (GPC) device: Manufactured by Tosoh Corporation, HLC-8320
Column: Column (TSK-guardcolumn SuperH-H (4.6×35 mm, manufactured by Tosoh Corporation) and two TSKgel Super HM-H (6.0×150 mm, manufactured by Tosoh Corporation) were connected in series
Sample solution: 10 μL of tetrahydrofuran (THF) solution of macromonomer (sample concentration 0.02 g/10 mL)
Flow rate: 0.6 mL/min
Eluent: THF (stabilizer: butyl hydroxy toluene (BHT))
Column temperature: 40° C.

The number average molecular weight and the weight average molecular weight of a macromonomer {(a'-10) to (a'-12)} were calculated under the following condition in terms of standard polystyrene.

Gel permeation chromatography (GPC) device: Manufactured by Tosoh Corporation, HLC-8320
Column: Column manufactured by Tosoh Corporation (TSKgel SuperHZM-MxHZM-MxHZ2000, TSK-guardcolumn SuperHZ-L)
Sample solution: 10 μL of 0.2% by mass of tetrahydrofuran (THF) solution of macromonomer
Flow rate: 0.35 mL/min
Eluent: THF (stabilizer: butyl hydroxy toluene (BHT))
Column temperature: 40° C.

(Molecular Weight Measurement of Macromonomer Copolymer)

The number average molecular weight and the weight average molecular weight of a macromonomer copolymer {(A'-1) to (A'-10), (A-1) to (A-3)} were calculated under the following condition in terms of standard methyl polymethacrylate.

Gel permeation chromatography (GPC) device: Manufactured by Tosoh Corporation, HLC-8320
Column: Column (TSK-guardcolumn SuperH-H (4.6×35 mm, manufactured by Tosoh Corporation) and two TSKgel Super HM-H (6.0×150 mm, manufactured by Tosoh Corporation) were connected in series.
Sample solution: 10 μL of tetrahydrofuran (THF) solution of macromonomer (sample concentration 0.02 g/10 mL)
Flow rate: 0.6 mL/min
Eluent: THF (stabilizer: butyl hydroxy toluene (BHT))
Column temperature: 40° C.

The number average molecular weight and the weight average molecular weight of a macromonomer copolymer {(A'-11) to (A'-14)} were calculated under the following condition in terms of standard polystyrene.

Gel permeation chromatography (GPC) device: Manufactured by Tosoh Corporation, HLC-8320
Column: Column manufactured by Tosoh Corporation (TSKgel SuperHZM-MxHZM-MxHZ2000, TSK-guardcolumn SuperHZ-L)
Sample solution: 10 μL of 0.2% by mass of tetrahydrofuran (THF) solution of macromonomer Flow rate: 0.35 mL/min
Eluent: THF (stabilizer: butyl hydroxy toluene (BHT))
Column temperature: 40° C.

(Manufacturing of Dispersant 1)

In a polymerization device with a stirrer, a cooling tube, a thermometer, and a nitrogen gas introducing tube, 900 parts of deionized water, 60 parts of sodium 2-sulfoethyl methacrylate, 10 parts of potassium methacrylate, and 12 parts of MMA were put and stirred, and the temperature was raised to 50° C. while performing nitrogen substitution in the polymerization device. 0.08 parts of 2,2'-azobis(2-methyl-propionamidine) dihydrochloride was added thereto, as a polymerization initiator, and the temperature was further raised to 60° C. After the rise of the temperature, using a dropping pump, MMA was continuously dropped at a rate of 0.24 parts/min. for 75 minutes. After a reaction solution was maintained at 60° C. for 6 hours, the reaction solution was cooled to room temperature to obtain a dispersant 1 of 10% by mass of a solid content which is a transparent aqueous solution.

(Manufacturing of Chain Transfer Agent 1)

In a synthesis device with a stirrer, 1.00 g of cobalt (II) acetate tetrahydrate, 1.93 g of phenyl glyoxime, and 80 mL of diethyl ether deoxidized by nitrogen bubbling in advance were put in a nitrogen atmosphere, and stirred at room temperature for 30 minutes. Then, 10 mL of boron trifluoride diethyl ether complex was added thereto, and further stirred for 6 hours. A mixture was filtrated, the solid was washed with diethyl ether, and vacuum-dried for 15 hours to obtain 2.12 g of a chain transfer agent 1 which is a reddish brown solid.

Synthesis of Macromonomer

Synthesis Example B1

In a synthesis device with a stirrer, a cooling tube, a thermometer, and a nitrogen gas introducing tube, 145 parts by deionized water, 0.1 parts of sodium sulfate, and 0.25 parts of a dispersant 1 (10% by mass of solid content) were put and stirred to obtain a homogeneous aqueous solution. Subsequently, 50 parts of MMA, 50 parts of GMA, 0.0025 parts of a chain transfer agent 1, and 0.9 parts of Perocta O (registered trademark) as a polymerization initiator were added thereto to obtain an aqueous suspension.

Subsequently, since nitrogen substitution was performed in the polymerization device, the temperature was raised to 80° C., reaction was performed for 3.5 hours, and the polymerization rate was further raised, the temperature was raised to 90° C. and maintained for 1 hour. Thereafter, the reaction solution was cooled to 40° C. to obtain an aqueous suspension including a macromonomer. The aqueous suspension was filtered with a filter, residues remaining on the filter was washed with deionized water, dehydrated, and dried at 40° C. for 16 hours to obtain a macromonomer (a'-1). The number average molecular weight and the weight average molecular weight of the macromonomer (a'-1) are shown in Table 8.

Synthesis Examples B2 to B9, Synthesis Example B12

Macromonomers (a'-2) to (a'-9) and (a-1) were obtained in the same manner as that of Synthesis Example B1 except that the incorporation amount of the monomer, the chain transfer agent, and the polymerization initiator was as shown in Table 8, in Synthesis Example B1. The molecular weight is shown in Table 8.

Synthesis Example B10

In a four-neck flask with a stirrer, a thermometer, a cooling tube, and a nitrogen gas introducing port, 70 parts of ethyl acetate and 0.0032 parts of the chain transfer agent 1 were added, and the external temperature was raised to 85° C. in nitrogen gas ventilation. After the external temperature reached 85° C. and the internal temperature was stabilized, a mixture constituted of 25 parts of MMA, 75 parts of GMA, and 1 part of AMBN which is a polymerization initiator was dropped for 4 hours. After maintaining 1 hour after the completion of dropping, a mixture constituted of 0.4 parts of Perocta O and 20 parts of ethyl acetate was added thereto for 30 minutes. Thereafter, after maintaining two hours, ethyl acetate was added thereto such that the solid content ((proportion of monomer incorporation amount in (incorporation amount of monomer+solvent)) was 50% by mass, and then cooled to room temperature to obtain a macromonomer solution. A molecular weight of the macromonomer (a'-10) in the macromonomer solution is shown in Table 8.

Synthesis Example B11

A macromonomer solution including a macromonomer (a'-11) (50% by mass of solid content) was obtained in the same manner as that of Synthesis Example B10 except that the incorporation amount of the monomer, the chain transfer agent, and the polymerization initiator was as shown in Table 8.

TABLE 8

| | | Synthesis example | | | | | |
|---|---|---|---|---|---|---|---|
| | | B1 | B2 | B3 | B4 | B5 | B6 |
| Macromonomer | | (a'-1) | (a'-2) | (a'-3) | (a'-4) | (a'-5) | (a'-6) |
| Monomer | MMA | 50 | 75 | 90 | 75 | 75 | 75 |
| | GMA | 50 | 25 | 10 | — | — | — |
| | OXE-30 | — | — | — | 25 | — | — |
| | THFMA | — | — | — | — | 25 | — |
| | CYM M100 | — | — | — | — | — | 25 |
| | MEDOL-10 | — | — | — | — | — | — |
| | V#200 | — | — | — | — | — | — |
| Chain transfer agent | Chain transfer agent 1 | 0.0025 | 0.0018 | 0.0018 | 0.0018 | 0.0018 | 0.0025 |

TABLE 8-continued

| | | | | | | | |
|---|---|---|---|---|---|---|---|
| Polymerization initiator | Perocta O | 0.9 | 0.6 | 0.4 | 0.4 | 0.6 | 0.9 |
| | AMBN | — | — | — | — | — | — |
| Number average molecular weight | | 4,900 | 4,200 | 3,800 | 8,100 | 4,200 | 4,500 |
| Weight average molecular weight | | 14,900 | 15,000 | 11,800 | 42,000 | 24,800 | 13,500 |

| | | Synthesis example | | | | | |
|---|---|---|---|---|---|---|---|
| | | B7 | B8 | B9 | B10 | B11 | B12 |
| Macromonomer | | (a'-7) | (a'-8) | (a'-9) | (a'-10) | (a'-11) | (a-1) |
| Monomer | MMA | 75 | 75 | 50 | 25 | — | 95 |
| | GMA | — | — | 50 | 75 | 100 | 5 |
| | OXE-30 | — | — | — | — | — | — |
| | THFMA | — | — | — | — | — | — |
| | CYM M100 | — | — | — | — | — | — |
| | MEDOL-10 | 25 | — | — | — | — | — |
| | V#200 | — | 25 | — | — | — | — |
| Chain transfer agent | Chain transfer agent 1 | 0.0159 | 0.0159 | 0.004 | 0.0032 | 0.0035 | 0.0018 |
| Polymerization initiator | Perocta O | 1.5 | 1.5 | 2.0 | — | — | 0.6 |
| | AMBN | — | — | — | 1 | 1 | 0.6 |
| Number average molecular weight | | 4,900 | 3,700 | 3,500 | 3,000 | 3,400 | 3,600 |
| Weight average molecular weight | | 17,500 | 12,000 | 7,200 | 6,500 | 7,800 | 10,300 |

\* The units of mixture amount are all part by mass.

Manufacturing of Macromonomer Copolymer

Manufacturing Example B1

In a four-neck flask with a stirrer, a thermometer, a cooling tube, and a nitrogen gas introducing port, 100 parts of methyl ethyl ketone and 20 parts of the macromonomer (a'-1), as an initial incorporation solvent, were added, and the external temperature was raised to 85° C. in nitrogen gas ventilation. After the external temperature reached 85° C. and the internal temperature was stabilized, a mixture constituted of 20 parts of ethyl acetate, 80 parts of n-butyl (n-BA) acrylate, and 0.13 parts of NYPER-BMT-K40 which is a polymerization initiator was dropped for 4 hours. After maintaining 1 hour after the completion of dropping, a mixture constituted of 0.5 parts of Perocta O and 10 parts of ethyl acetate were added thereto for 1 hour. Thereafter, after maintaining two hours, 0.5 parts of an anti-oxidant (manufactured by BASF Corporation, product name "Irganox (registered trademark) 1010") was put therein, and ethyl acetate was added thereto such that the solid content ((proportion of monomer incorporation amount in (incorporation amount of monomer+solvent)) was 25% by mass, and then cooled to room temperature to obtain a copolymer (A'-1) solution. The number average molecular weight and the weight average molecular weight of the copolymer are shown in Table 9.

Manufacturing Examples B2 to B10 and B15 to B17

Solutions of copolymers (A'-2) to (A'-10) and (A-1) to (A-3) were obtained in the same manner as that of Manufacturing Example B1 except that the kinds of the macromonomer and the monomer, and a use amount thereof were as shown in Table 9. The number average molecular weight and the weight average molecular weight of the copolymers in the solutions are shown in Tables 9 and 10.

Manufacturing Example B11

In a four-neck flask with a stirrer, a thermometer, a cooling tube, and a nitrogen gas introducing port, 45 parts of ethyl acetate and 20 parts of the macromonomer (a'-10) (40 parts of macromonomer solution) were put as an initial incorporation solvent, and the external temperature was raised to 85° C. in nitrogen gas ventilation. After the external temperature reached 85° C. and the internal temperature was stabilized, a mixture constituted of 20 parts of ethyl acetate, 80 parts of 2-EHA, and 0.13 parts of NYPER-BMT-K40 which is a polymerization initiator was dropped for 4 hours. After maintaining 1 hour after the completion of dropping, a mixture constituted of 0.5 parts of Perocta O and 10 parts of ethyl acetate were added thereto for 1 hour. Thereafter, after maintaining two hours, 0.5 parts of an anti-oxidant (Irganox 1010) was put therein, and ethyl acetate was added thereto such that the solid content ((proportion of monomer incorporation amount in (incorporation amount of monomer+solvent)) was 50% by mass, and then cooled to room temperature to obtain a copolymer (A'-11) solution. The number average molecular weight and the weight average molecular weight of the copolymer in the solution is shown in Table 10.

Manufacturing Example B12

A copolymer (A'-12) solution was obtained in the same manner as that of Manufacturing Example B11 except that the initial incorporation solvent, the kinds of the macromonomer and the monomer, and a use amount thereof were as shown in Table 2, respectively. The number average molecular weight and the weight average molecular weight of the copolymer in the solution is shown in Table 10.

Manufacturing Examples B13 and B14

Solutions of copolymers (A'-13) and (A'-14) were obtained in the same manner as that of Manufacturing Example B1 except that the initial incorporation solvent, the kinds of the macromonomer and the monomer, and a use amount thereof were as shown in Table 10, respectively. The number average molecular weight and the weight average molecular weight of the copolymer in the solution is shown in Table 10.

Since no glass transition temperature of homopolymer of IDAA is reported in Polymer Handbook (1989), product catalog value of Miwon Specially Chemicals Co., Ltd. was employed for a value of Tgb" in Manufacturing Example B13.

In addition, for a value of Tgb" in Manufacturing Example B14, no glass transition temperature of homopolymer of X-22-174ASX is reported in Polymer Handbook (1989) and there is also no description in the catalog of the manufacturer. However, since the homopolymer of X-22-174ASX is in a liquid state at 23° C., the glass transition temperature can be determined to be less than 23° C. For convenience, the glass transition temperature of X-22-174ASX was considered as 23° C.

TABLE 9

| | | Manufacturing example | | | | | | | |
|---|---|---|---|---|---|---|---|---|---|
| | | B1 | B2 | B3 | B4 | B5 | B6 | B7 | B8 |
| Macromonomer copolymer | | (A'-1) | (A'-2) | (A'-3) | (A'-4) | (A'-5) | (A'-6) | (A'-7) | (A'-8) |
| Macromonomer (a') | (a'-1) | 20 | 20 | 20 | — | — | — | — | — |
| | (a'-2) | — | — | — | 50 | — | — | — | — |
| | (a'-3) | — | — | — | — | 50 | — | — | — |
| | (a'-4) | — | — | — | — | — | 50 | — | — |
| | (a'-5) | — | — | — | — | — | — | 50 | — |
| | (a'-6) | — | — | — | — | — | — | — | 50 |
| | (a'-7) | — | — | — | — | — | — | — | — |
| | (a'-8) | — | — | — | — | — | — | — | — |
| | (a'-9) | — | — | — | — | — | — | — | — |
| | (a'-10) | — | — | — | — | — | — | — | — |
| | (a'-11) | — | — | — | — | — | — | — | — |
| | (a-1) | — | — | — | — | — | — | — | — |
| Vinyl monomer (b') | n-BA | 80 | 60.8 | 46.8 | 50 | 50 | 50 | 50 | 50 |
| | IBXA | — | 19.2 | 33.2 | — | — | — | — | — |
| | 2-EHA | — | — | — | — | — | — | — | — |
| | IDAA | — | — | — | — | — | — | — | — |
| | X-22-174ASX | — | — | — | — | — | — | — | — |
| | Tgb" [° C.] | −54 | −31 | −10 | −54 | −54 | −54 | −54 | −54 |
| Solvent | Ethyl acetate | — | — | — | — | — | — | — | — |
| | IPA | — | — | — | — | — | — | — | — |
| | MEK | 100 | 100 | 100 | 100 | 100 | 100 | 100 | 100 |
| Number average molecular weight | | 17,600 | 67,900 | 62,700 | 42,000 | 32,700 | 53,500 | 44,800 | 37,000 |
| Weight average molecular weight | | 161,000 | 222,700 | 192,000 | 174,200 | 80,400 | 135,800 | 139,900 | 103,500 |

*The units of mixture amount are all part by mass.

TABLE 10

| | | Manufacturing example | | | | | | | | |
|---|---|---|---|---|---|---|---|---|---|---|
| | | B9 | B10 | B11 | B12 | B13 | B14 | B15 | B16 | B17 |
| Macromonomer copolymer | | (A'-9) | (A'-10) | (A'-11) | (A'-12) | (A'-13) | (A'-14) | (A-1) | (A-2) | (A-3) |
| Macromonomer (a') | (a'-1) | — | — | — | — | — | — | 20 | 20 | — |
| | (a'-2) | — | — | — | — | — | — | — | — | — |
| | (a'-3) | — | — | — | — | — | — | — | — | — |
| | (a'-4) | — | — | — | — | — | — | — | — | — |
| | (a'-5) | — | — | — | — | — | — | — | — | — |
| | (a'-6) | — | — | — | — | — | — | — | — | — |
| | (a'-7) | 50 | — | — | — | — | — | — | — | — |
| | (a'-8) | — | 50 | — | — | — | — | — | — | — |
| | (a'-9) | — | — | — | — | 20 | 20 | — | — | — |
| | (a'-10) | — | — | 20 | — | — | — | — | — | — |
| | (a'-11) | — | — | — | 20 | — | — | — | — | — |
| | (a-1) | — | — | — | — | — | — | — | — | 35 |
| Vinyl monomer (b) | n-BA | 50 | 50 | — | — | — | — | 24.8 | 12 | 65 |
| | IBXA | — | — | — | — | — | — | 55.2 | 68 | — |
| | 2-EHA | — | — | 80 | 80 | — | 70 | — | — | — |
| | IDAA | — | — | — | — | 80 | — | — | — | — |
| | X-22-174ASX | — | — | — | — | — | 10 | — | — | — |
| | Tgb" [° C.] | −54 | −54 | −50 | −50 | −60 | −43 | 10 | 50 | −54 |
| Solvent | Ethyl acetate | — | — | 45 | 20 | 50 | 50 | — | — | — |
| | IPA | — | — | — | — | — | — | — | — | — |
| | MEK | 100 | 100 | — | — | — | — | 100 | 100 | 100 |

TABLE 10-continued

| | Manufacturing example | | | | | | | | |
|---|---|---|---|---|---|---|---|---|---|
| | B9 | B10 | B11 | B12 | B13 | B14 | B15 | B16 | B17 |
| Number average molecular weight | 42,100 | 35,100 | 13,700 | 15,000 | 17,400 | 16,300 | 53,200 | 38,300 | 39,400 |
| Weight average molecular weight | 108,900 | 83,800 | 83,000 | 106,700 | 118,700 | 107,200 | 150,600 | 92,700 | 102,300 |

* The units of mixture amount are all part by mass.

Preparation of Epoxy Resin Composition

Example B1

10 parts of a macromonomer copolymer (A'-1) (40 parts as macromonomer copolymer solution of 25% by mass of solid content) and 35.5 parts of an epoxy resin (jER828 (product name)) were mixed with each other, dried under reduced pressure using a vacuum drier, and subjected to desolvation to obtain a premix from which the volatile content was removed. The premix, 8 parts of DICY as a curing agent, 4 parts of DCMU as a curing accelerator, and 64.5 parts of an epoxy resin (jER828) were mixed with Awatori Rentaro (manufactured by Thinky Corporation), and kneaded with a triple roll (manufactured by AIMEX Corporation) to prepare an epoxy resin composition (1).

Examples B2 to B10

Epoxy resin compositions (2) to (10) were obtained in the same manner as that of Example B1 except the condition shown in Table 11.

Examples B11 to B14

Epoxy resin compositions (11) to (14) were obtained in the same manner as that of Example B1 except the condition shown in Table 12, using 10 parts of macromonomer copolymers (A'-11) to (A'-14) (20 parts as a macromonomer copolymer solution of 50% by mass of solid content).

Comparative Example B1

An epoxy resin composition (15) was obtained in the same manner as that of Example B1 except that a copolymer premix was not prepared from a copolymer solution, and 100 parts of an epoxy resin was used instead of 122 parts of the epoxy resin composition (1).

Comparative Examples B2 to B4

Epoxy resin compositions (16) to (18) were obtained in the same manner as that of Example B1 except the condition shown in Table 13.

Peeling Strength Evaluation of Epoxy Resin Composition (T-Shaped Peeling Test)

Examples B1 to B10

0.2 parts of glass beads J-100 (manufactured by Potters-Ballotini Co., Ltd.) were added to 122 parts of the obtained epoxy resin compositions (1) to (10) and mixed therewith with Awatori Rentaro (manufactured by Thinky Corporation).

A portion from an end in a length direction to 50 mm was left exposed to a single surface of a steel sheet of a width of 25 mm×a length of 150 mm×a thickness of 0.5 mm (JISG 3141 SPCC-SD, manufactured by Engineering Test Service), and the epoxy resin composition was applied to the other portion. A steel sheet of the same size was attached to the applied surface, fixed such that the thickness of the epoxy resin composition layer was uniform, heated to 180° C. for 30 minutes, and the epoxy resin composition layer was cured to obtain a laminate. The extrusion of the epoxy resin composition layer on a side surface of the laminate was removed, and the exposed portion of each of two steel sheets was bent by 90° at the right angle toward the outside to obtain a T-shaped test piece.

In autograph AG-IS (manufactured by Shimadzu Corporation, Load Cell 1 kN), the obtained exposed portion of the test piece was vertically maintained, the peeling strength was measured by moving the exposed portion at a rate of 200 mm/min, and an average value of the peeling strength obtained by removing the first 25 mm and the last 25 mm was calculated. The result is shown in Table 11.

In addition, this was determined based on the following criteria. The result is shown in Table 11.
B: Peeling strength is equal to or more than 25 N/25 mm
C: Peeling strength is less than 25 N/25 mm Examples B11 to B14

Peeling strength of the epoxy resin compositions (11) to (14) were measured and an average value was calculated in the same condition as that of Example B1 except that a movement rate of the exposed portion was 100 mm/min. In addition, determination was performed based on the same criteria. The result is shown in Table 12.

Comparative Examples B1 to B4

Peeling tests were performed on epoxy resin compositions (15) to (18) and an average value was calculated. In addition, determination was performed based on the same criteria. The result is shown in Table 13.

TEM Observance of Cured Product of Epoxy Resin Composition

Example B1

The epoxy resin composition (1) was vacuumed and degassed while mixing with Awatori Rentaro (manufactured by Thinky Corporation), and then injected into a mold set to have a thickness of 3 mm by a spacer made of Teflon (registered trademark) having a thickness of 3 num. In an oven, the epoxy resin composition was raised to 120° C. from room temperature at 2° C./min, and heated to 120° C. for 1 hour to obtain a resin cured product.

The obtained resin cured product was stained by using osmium tetraoxide ($OsO_4$), and sliced to acquire a transmission electron image under the following condition at a magnification of 100,000 by using a transmission electron microscope (TEM), and presence or absence of a micro phase separation structure and a form of a micro phase separation structure were visually evaluated.

Device: H-7600 transmission electron microscope (manufactured by Hitachi, Ltd.)

Acceleration voltage: 80 kV

As a result, a poly n-BA block in the copolymer (A'-1) in the cured epoxy resin matrix had a micro linear structure and had a dispersed micro phase separation structure.

Example B2

As TEM observance of a resin cured product of the epoxy resin composition (2) was performed in the same manner as that of Example B1, a poly (n-BA/IBXA) block in the copolymer (A'-2) in the cured epoxy resin matrix had a micro spherical structure and a dispersed micro phase separation structure.

Example B3

As TEM observance of a resin cured product of the epoxy resin composition (3) was performed in the same manner as that of Example B1, a poly (n-BA/IBXA) block in the copolymer (A'-3) in the cured epoxy resin matrix had a micro spherical structure and a dispersed micro phase separation structure.

Example B4

As TEM observance of a resin cured product of the epoxy resin composition (4) was performed in the same manner as that of Example B1, a poly n-BA block in the copolymer (A'-4) in the cured epoxy resin matrix had a micro linear structure and a dispersed micro phase separation structure.

TABLE 11

| Example | | Example B1 | Example B2 | Example B3 | Example B4 | Example B5 |
|---|---|---|---|---|---|---|
| Epoxy resin composition | | (1) | (2) | (3) | (4) | (5) |
| Macromonomer copolymer | (A'-1) | 10 | — | — | — | — |
| | (A'-2) | — | 10 | — | — | — |
| | (A'-3) | — | — | 10 | — | — |
| | (A'-4) | — | — | — | 10 | — |
| | (A'-5) | — | — | — | — | 10 |
| | (A'-6) | — | — | — | — | — |
| | (A'-7) | — | — | — | — | — |
| | (A'-8) | — | — | — | — | — |
| | (A'-9) | — | — | — | — | — |
| | (A'-10) | — | — | — | — | — |
| Tgb" [° C.] | | −54 | −31 | −10 | −54 | −54 |
| Epoxy resin (jER828) | Before adding curing agent | 35.5 | 35.5 | 35.5 | 35.5 | 35.5 |
| | At the time of adding curing agent | 64.5 | 64.5 | 64.5 | 64.5 | 64.5 |
| Curing agent | DICY | 8 | 8 | 8 | 8 | 8 |
| Curing accelerator | DCMU | 4 | 4 | 4 | 4 | 4 |
| Peeling strength (200 mm/min) | Average value [N/25 mm] | 69 | 53 | 36 | 71 | 54 |
| | Determination | B | B | B | B | B |

| Example | | Example B6 | Example B7 | Example B8 | Example B9 | Example B10 |
|---|---|---|---|---|---|---|
| Epoxy resin composition | | (6) | (7) | (8) | (9) | (10) |
| Macromonomer copolymer | (A'-1) | — | — | — | — | — |
| | (A'-2) | — | — | — | — | — |
| | (A'-3) | — | — | — | — | — |
| | (A'-4) | — | — | — | — | — |
| | (A'-5) | — | — | — | — | — |
| | (A'-6) | 10 | — | — | — | — |
| | (A'-7) | — | 10 | — | — | — |
| | (A'-8) | — | — | 10 | — | — |
| | (A'-9) | — | — | — | 10 | — |
| | (A'-10) | — | — | — | — | 10 |
| Tgb" [° C.] | | −54 | −54 | −54 | −54 | −54 |
| Epoxy resin (jER828) | Before adding curing agent | 35.5 | 35.5 | 35.5 | 35.5 | 35.5 |
| | At the time of adding curing agent | 64.5 | 64.5 | 64.5 | 64.5 | 64.5 |
| Curing agent | DICY | 8 | 8 | 8 | 8 | 8 |
| Curing accelerator | DCMU | 4 | 4 | 4 | 4 | 4 |
| Peeling strength (200 mm/min) | Average value [N/25 mm] | 98 | 64 | 85 | 56 | 48 |
| | Determination | B | B | B | B | B |

* The units of mixture amount are all part by mass.

TABLE 12

|  |  | Example B11 | Example B12 | Example B13 | Example B14 |
|---|---|---|---|---|---|
|  | Epoxy resin composition | (11) | (12) | (13) | (14) |
| Macromonomer copolymer | (A'-11) | 10 | — | — | — |
|  | (A'-12) | — | 10 | — | — |
|  | (A'-13) | — | — | 10 | — |
|  | (A'-14) | — | — | — | 10 |
|  | Tgb" [° C.] | −50 | −50 | −60 | −43 |
| Epoxy resin (jER828) | Before adding curing agent | 35.5 | 35.5 | 35.5 | 35.5 |
|  | At the time of adding curing agent | 64.5 | 64.5 | 64.5 | 64.5 |
| Curing agent | DICY | 8 | 8 | 8 | 8 |
| Curing accelerator | DCMU | 4 | 4 | 4 | 4 |
| Peeling strength (100 mm/min) | Average value [N/25 mm] | 180 | 45 | 137 | 147 |
|  | Determination | B | B | B | B |

* The units of mixture amount are all part by mass.

TABLE 13

|  |  | Comparative Example B1 | Comparative Example B2 | Comparative Example B3 | Comparative Example B4 |
|---|---|---|---|---|---|
|  | Epoxy resin composition | (15) | (16) | (17) | (18) |
| Macromonomer copolymer | (A-1) | — | 10 | — | — |
|  | (A-2) | — | — | 10 | — |
|  | (A-3) | — | — | — | 10 |
|  | Tgb" (° C.) | — | 30 | 60 | −54 |
| Epoxy resin (jER828) | Before adding curing agent | — | 35.5 | 35.5 | 35.5 |
|  | At the time of adding curing agent | 100 | 64.5 | 64.5 | 64.5 |
| Curing agent | DICY | 8 | 8 | 8 | 8 |
| Curing accelerator | DCMU | 4 | 4 | 4 | 4 |
| Peeling strength (200 mm/min) | Average value [N/25 mm] | 10 | 22 | 12 | 21 |
|  | Determination | C | C | C | C |

* The units of mixture amount are all part by mass.

As shown in Tables 11 and 12, in Examples B1 to B14 in which a macromonomer copolymer (A') having a constituent unit derived from a macromonomer (a') and a constituent unit derived from a vinyl monomer (b') was mixed, as a (meth)acrylic copolymer, the cured product of the epoxy resin composition shows excellent peeling strength.

On the other hand, as shown in Table 13, in Comparative Example B1 in which a (meth)acrylic copolymer was not mixed, peeling strength of the cured product was deteriorated. In addition, in Comparative Examples B2 and B3 in which Tgb" is higher than 0° C., peeling strength of the cured product was deteriorated. In addition, in Comparative Example B4 in which the amount of a repeating unit represented by the general formula (1') in the macromonomer was small (GMA 5% by mass at an incorporation ratio), peeling strength of the cured product was deteriorated.

As understood from examples, the epoxy resin composition according to the invention of the present embodiment can be used as an adhesive.

The invention claimed is:

1. An epoxy resin composition, comprising:
a (meth)acrylic copolymer (A);
an epoxy resin (B); and
a curing agent (C),
wherein the (meth)acrylic copolymer (A) comprises, in polymerized form relative to total (meth)acrylic copolymer (A) weight, a macromonomer (a) and at least 50 wt. % of a vinyl monomer (b) comprising a C4 to C20 (meth)acrylate (b-1),
wherein the macromonomer (a) comprises, in polymerized form relative to total macromonomer (a) weight, 25 to 75 wt. % of a monomer comprising a cyclic ether group and at least 20 wt. % of an alkyl (meth)acrylate,
wherein a glass transition temperature (TgB) of a polymer obtained by polymerizing only the vinyl monomer (b) is 25° C. or less,
wherein the monomer comprising the cyclic ether group comprises glycidyl (meth)acrylate, (3,4-epoxycyclohexyl) methyl (meth)acrylate, β-methylglycidyl (meth)acrylate, (3-ethyloxetane-3-yl)methyl (meth)acrylate, tetrahydrofurfuryl (meth)acrylate, (2-methyl-2-ethyl-1,3-dioxolane-4-yl) (meth)acrylate, and/or (5-ethyl-1,3-dioxane-5-yl)methyl (meth)acrylate, and
wherein the (meth)acrylic copolymer (A) is a graft copolymer derived from the macromonomer (a) and the vinyl monomer (b).

2. The composition of claim 1, wherein a viscosity of a premix obtained by mixing the (meth)acrylic copolymer (A) and the epoxy resin (B) is 1,500 Pa·s or less.

3. The composition of claim 1, wherein the macromonomer (a) has a number average molecular weight in a range of from 500 to 100,000.

4. The composition of claim 1, wherein the (meth)acrylic copolymer (A) comprises, in polymerized form, the macromonomer (a) in a range of from 10 to 50 wt. %, with respect to a total polymerized (meth)aelylic copolymer (A) mass.

5. The composition of claim 1, wherein the macromonomer (a) comprises a radically polymerizable group, and two or more constituent units of formula (aa),

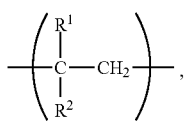

(aa)

wherein, in formula (aa), $R^1$ is H, a methyl group, or $CH_2OH$, $R^2$ is $OR^3$, a halogen atom, $COR^4$, $COOR^5$, CN, $CONR^6R^7$, $NHCOR^8$, or $R^9$, $R^3$ to $R^8$ are each independently H, or an optionally substituted alkyl group, alicyclic group, aryl group, heteroaryl group, non-aromatic heterocyclic group, aralkyl group, alkaryl group, organosilyl group, or (poly)organosiloxane group, a substituent substituting these groups comprising an alkyl group, an aryl group, a heteroaryl group, a non-aromatic heterocyclic group, an aralkyl group, an alkaryl group, a carboxylic acid group, a carboxylic acid ester group, an epoxy group, a hydroxy group, an alkoxy group, a primary amino group, a secondary amino group, a tertiary amino group, an isocyanate group, a sulfonic acid group, and/or a halogen atom, and $R^9$ is an optionally substituted aryl group, heteroaryl group, or non-aromatic heterocyclic group, a substituent substituting these groups comprising an alkyl group, an aryl group, a heteroaryl group, a non-aromatic heterocyclic group, an aralkyl group, an alkaryl group, a carboxylic acid group, a carboxylic acid ester group, an epoxy group, a hydroxy group, an alkoxy group, a primary amino group, a secondary amino group, a tertiary amino group, an isocyanate group, a sulfonic acid group, a substituted or non-substituted olefin group, and/or a halogen atom.

6. The composition of claim 5, wherein the macromonomer (a) is of formula (1):

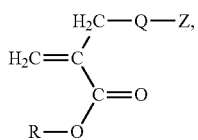

(1)

wherein, in formula (1),

R is H, or an optionally alkyl group, alicyclic group, aryl group, heteroaryl group, non-aromatic heterocyclic group, aralkyl group, alkaryl group, organo silyl group, or (poly)organosiloxane group, Z is a terminal group, and Q is a main chain portion comprising two or more constituent units of formula (aa).

7. The composition of claim 1, wherein the monomer comprising the cyclic ether group is comprised in a range of from 30 to 75% by mass, with respect to a total polymerized macromonomer (a) mass.

8. An adhesive, comprising:
the epoxy resin composition of claim 1.
9. A molding material, comprising:
the epoxy resin composition of claim 1.
10. A cured product, obtained by curing the epoxy resin composition of claim 1.
11. A macromonomer copolymer, comprising, in polymerized form, relative to total macromonomer copolymer weight, of:
a macromonomer (a') comprising a repeating unit of formula (1')

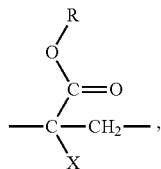

(1')

R being a group comprising a cyclic ether group, and X being H or a methyl group; and at least 50 wt. % of a vinyl monomer (b') capable of being copolymerized with the macromonomer (a'), comprising a C4 to C20 (meth)acrylate (b-1), wherein the macromonomer (a') comprises from 25 to 75% by mass of the repeating unit of formula (1') and at least 20 wt. % of an alkyl (meth)acrylate, with respect to a total polymerized macromonomer (a) mass, wherein a glass transition temperature (Tgb") of a polymer obtained by polymerizing only the vinyl monomer (b') is 25° C. or less, wherein the macromonomer (a') comprises, in polymerized form, glycidyl (meth)acrylate, (3,4-epoxycyclohexyl)methyl (meth)acrylate, β-methylglycidyl (meth)acrylate, (3-ethyloxetane-3-yl)methyl (meth)acrylate, tetrahydrofurfuryl (meth)acrylate, (2-methyl-2-ethyl-1,3-dioxolane-4-yl) (meth)acrylate, and/or (5-ethyl-1,3-dioxane-5-yl)methyl (meth)acrylate, and wherein the macromonomer copolymer is a graft copolymer derived from the macromonomer (a') and the vinyl monomer (b').

12. The macromonomer copolymer of claim 11, wherein the macromonomer (a') is of formula (2'):

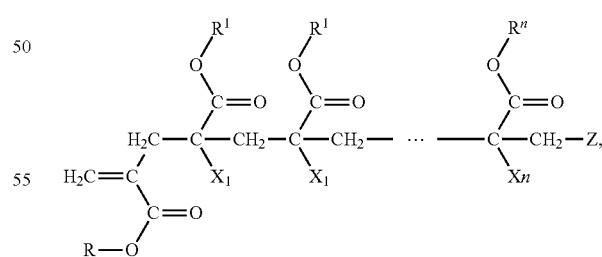

(2')

wherein

R and $R^1$ to $R''$ are each independently H, an alkyl group, a cycloalkyl group, an aryl group, or a heterocyclic group, at least one of R and $R^1$ to $R''$ being the group comprising the cyclic ether group, $X_1$ to $X_n$ are each independently H or a methyl group, Z is a terminal group, and n is a natural number in a range of from 2 to 10,000.

13. The macromonomer copolymer of claim 11, wherein the macromonomer (a') comprises the repeating unit of formula (1') in a range of from 40 to 75% by mass.

14. An epoxy resin composition, comprising:
the macromonomer copolymer of claim 11; and
an epoxy resin having a different structure from that of the macromonomer copolymer.

15. An adhesive, comprising:
the epoxy resin composition of claim 14.

16. A cured product, obtained by curing the epoxy resin composition of claim 14.

17. The composition of claim 1, wherein the (meth)acrylic copolymer (A) comprises at least 50% by mass of the macromonomer (a).

18. The composition of claim 1, The composition of claim 1, wherein the vinyl monomer (b) comprises methyl (meth)acrylate, ethyl (meth)acrylate, n-propyl (meth)acrylate, n-butyl (meth)acrylate, 2-ethylhexyl (meth)acrylate, n-octyl (meth)acrylate, isooctyl (meth)acrylate, nonyl (meth)acrylate, isononyl (meth)acrylate, decyl (meth)acrylate, isodecyl (meth)acrylate, lauryl (meth)acrylate, hexadecyl (meth)acrylate, stearyl (meth)acrylate, isostearyl (meth)acrylate, behenyl (meth)acrylate, and/or branched nonyl acrylate.

* * * * *